United States Patent
Karaki et al.

(10) Patent No.: US 8,424,111 B2
(45) Date of Patent: Apr. 16, 2013

(54) NEAR-FIELD OPTICAL MICROSCOPE, NEAR-FIELD OPTICAL PROBE, AND SAMPLE OBSERVATION METHOD

(75) Inventors: Koichi Karaki, Hino (JP); Kimihiko Nishioka, Hachioji (JP); Yasuo Sasaki, Machida (JP); Takuya Tsukagoshi, Hachioji (JP); Yoshiharu Ajiki, Hachioji (JP); Isao Shimoyama, Tokyo (JP); Kiyoshi Matsumoto, Tokyo (JP); Tetsuro Kan, Tokyo (JP); Yusuke Takei, Musashino (JP); Kentaro Noda, Tokyo (JP)

(73) Assignees: Olympus Corporation, Tokyo (JP); The University of Tokyo, Tokyo (JP)

( * ) Notice: Subject to any disclaimer, the term of this patent is extended or adjusted under 35 U.S.C. 154(b) by 109 days.

(21) Appl. No.: 13/167,172

(22) Filed: Jun. 23, 2011

(65) Prior Publication Data
US 2011/0321204 A1   Dec. 29, 2011

(30) Foreign Application Priority Data

Jun. 23, 2010  (JP) ................... 2010-143193
Jun. 23, 2010  (JP) ................... 2010-143197
Mar. 30, 2011  (JP) ................... 2011-076697

(51) Int. Cl.
*G01Q 60/22*  (2010.01)

(52) U.S. Cl.
USPC ...... 850/32; 850/3; 850/21; 850/30; 250/216; 250/234; 359/342; 359/385; 359/642; 359/558; 359/900; 359/665

(58) Field of Classification Search ............. 850/3, 21, 850/30, 32; 250/216, 234; 359/342, 385, 359/642, 558, 900, 665
See application file for complete search history.

(56) References Cited

U.S. PATENT DOCUMENTS

2009/0303578 A1* 12/2009 Engheta et al. ............ 359/342
2012/0250149 A1* 10/2012 Karaki et al. ............. 359/385

FOREIGN PATENT DOCUMENTS

| JP | 4-5170 | 1/1992 |
| JP | 2002-340771 | 11/2002 |
| JP | 2006-138633 | 6/2006 |

OTHER PUBLICATIONS

English abstract only of Japanese Patent Publication No. 59121310 dated Jul. 13, 1984.
Pendry, J.B., "Negative Refraction Makes a Perfect Lens," Physical Review Letters (Oct. 30, 2000), vol. 85, No. 18, pp. 3966-3969.
Salandrino, Alessandro et al., "Far-field subdiffraction optical microscopy using metamaterial crystals: Theo and simulations," Physical Review B (2006), vol. 74, pp. 075103-1-075103-5.
Taubner, Thomas et al., "Near-Field Microscopy Through a SiC Superlens," Science (2006), vol. 313, p. 1595.

\* cited by examiner

*Primary Examiner* — Jack Berman
*Assistant Examiner* — Meenakshi Sahu
(74) *Attorney, Agent, or Firm* — Scully Scott Murphy & Presser, PC

(57) ABSTRACT

Provided is a scanning near-field optical microscope capable of obtaining, in a highly sensitive manner, optical information having a spatial frequency higher than a spatial frequency corresponding to a wavelength of irradiation light. A scanning near-field optical microscope 100 according to the present invention includes: a light irradiating part 102 for emitting illumination light toward a sample 107; a light receiving part 112 for receiving light; a microstructure for generating or selectively transmitting near-field light, the microstructure being disposed on at least one of an emission side of the light irradiating part 102 and an incident side of the light receiving part 112; and an ultrahigh-wavenumber transmitting medium 108 for transmitting near-field light, the ultrahigh-wavenumber transmitting medium exhibiting anisotropy in permittivity or permeability.

52 Claims, 40 Drawing Sheets

OPTICAL AXIS OF OBJECTIVE (a)

(b)

(a)

(b)

(a)

(b)

(a)

(b)

(c)

(d)

(a)

(b)

NEAR-FIELD OPTICAL MICROSCOPE, NEAR-FIELD OPTICAL PROBE, AND SAMPLE OBSERVATION METHOD

CROSS REFERENCE TO RELATED APPLICATION

The present application claims priority to Japanese Patent Application No. 2011-76697 filed on Mar. 30, 2011, Japanese Patent Application No. 2010-143193 filed on Jun. 23, 2010, and Japanese Patent Application No, 2010-143197 filed on Jun. 23, 2010, the entire disclosure of which is fully incorporated herein by reference.

BACKGROUND OF THE INVENTION

The present invention relates to a near-field optical microscope, a near-field optical probe, and a sample observation method.

RELATED ART

In a scanning near-field optical microscope, a near-field optical probe having a minute aperture has been conventionally used (see, for example, JP 59-121310 A). A near-field optical probe of this type includes a quartz rod having a pointed tip, and an aperture which is formed at the tip through metal coating covering the entire crystal rod except for the tip thereof, the aperture being smaller than the wavelength of light. The near-field optical probe is configured to cause near-field light (hereinafter, also referred to as evanescent light) to enter (leak) thereinto through the minute aperture.

However, in the scanning near-field optical microscope disclosed in JP 59-121310A, the evanescent light that has been leaked in through the aperture at the tip of the near-field optical probe passes through a thick crystal optical filter, an optical fiber, air, and the like before being detected by a photodetector, which is separately configured from the near-field optical probe. Accordingly, there is a fear that the evanescent light that has been leaked into the near-field optical probe be attenuated by such media disposed on the way to the photodetector, making it difficult to perform the detection of the light. It is known that evanescent light is significantly reduced by a factor of $10^4$ to $10^6$ as compared to the intensity of irradiation light for forming the evanescent field. Accordingly, if the evanescent light, which has already been reduced as described above, is further attenuated before reaching the photodetector, the detection of the light becomes difficult.

In view of the above, in recent years, there has been proposed a negative refractive index medium having properties of amplifying evanescent light and suppressing the attenuation thereof (see, for example, J. B. Pendry, Physical Review Letters Vol. 85, p. 3966 to 3969 (2000)). Further, there has been proposed a near-field optical probe in which the above-mentioned negative refractive index medium is disposed between an object and an aperture for allowing the evanescent light from the object to leak in therethrough, to thereby cause the evanescent light to propagate therethrough (see, for example, JP 2006-138633 A).

Meanwhile, when observing a microstructure with optical means, the resolution to be obtained is capped by an upper limit (diffraction limit) which is determined by the wavelength of light and the numerical aperture of the optical system. However, in recent years, there is a demand for a technology which enables observation of an extremely-microscopic structure, and studies have been actively made on optical means capable of improving resolutions so as to exceed the diffraction limit.

There has been proposed optical means which uses, as a lens, a negative refractive index medium, a negative permittivity medium, or a negative permeability medium (see, for example, J. B. Pendry, Physical Review Letters Vol. 85, p. 3966 to 3969 (2000)). Such a lens is generally called superlens. This technology allows imaging at extremely high resolution exceeding the diffraction limit. There has been also proposed a technology of using a medium (anisotropic medium) which is formed by alternately laminating metallic layers and dielectric layers, and has different signs for the effective permittivity depending on the direction, to thereby attain an effect similar to that of the superlens (see, for example, A. Salandrino et al., Physical Review B Vol.74, 075103 (2006)).

Meanwhile, an image to be obtained by the above-mentioned superlens or by the above-mentioned anisotropic medium contains information having a high spatial frequency which turns into an evanescent wave in vacuum, and hence this image cannot be observed with a conventional optical microscope. In order to detect such information having a high spatial frequency without loss, it is necessary to employ, for example, a technology of forming a multilayer film in a curved surface shape (see, for example, A. Salandrino et al., Physical Review B Vol. 74, 075103 (2006)), or a near-field optical microscope (see, for example, JP 2006-138633 A). Further, there has been proposed a configuration for detecting, by using a near-field optical microscope, an image formed by a superlens (see, for example, T. Taubner et al., Science Vol. 313, p. 1595 (2006)).

The near-field optical microscope can be roughly categorized into an illumination type, a scattering type, and a focusing type, according to the element structure for converting near-field light into propagating light (see, for example, JP 2002-340771 A). Here, referring to FIG. 40, a scattering type near-field optical microscope 900 is described in detail.

FIG. 40 is a schematic diagram illustrating a system configuration of a conventional near-field optical microscope. As illustrated in FIG. 40, illumination light emitted from a light source 902 passes through a collimator lens 906 to be converted into substantially parallel light (plane wave), and then passes through a first half mirror 907 to be focused onto a sample 901 by means of an objective 903. Then, the focused light is partially scattered by a probe 904, while bearing optical information on the near-surface region of the sample 901. It should be noted that, on the one hand, the sample 901 is placed on a sample table 914 which is controlled by a computer 921, a sample controller 915, and a sample actuator 916, and on the other hand, the probe 904 is controlled by the computer 921, a controller 919, and a probe actuator 934 so as to be capable of observing a desired position on the sample. A detector 932 detects of the deflection of the probe 904 caused by an interatomic force acting between the sample 901 and the probe 904, and performs atomic force microscope (AFM) control to maintain a constant distance between the tip of the probe 904 and a surface of the sample 901.

The light scattered by the probe 904 passes in part through the focusing lens 928, an imaging lens 929 for detection, and a pinhole 930, so as to be detected by a photomultiplier 931. At this time, the pinhole 930 cuts off any other light than the light from the tip of the probe 904, and hence the light scattered by the tip of the probe 904 can be detected at high S/N ratio. Alternatively, the irradiation light may be time-modulated and the output signal may be subjected to lock-in detection, to thereby further increase S/N ratio. An output signal from the photomultiplier 931 is amplified by a preamplifier such as a lock-in amplifier, and the amplified signal is used to perform image processing by a computer 921.

On the other hand, of the light focused onto the sample 901, light reflected by the sample 901 is caused to enter again the objective 903 to be reflected by a first half mirror 907, to thereby enter an observation optical system S1. The light is then split in two by a second half mirror 908, one of which being imaged onto an imaging element 910 through an imaging lens 909, the other one of which being made visible to the naked eye through an eyepiece lens 911.

In general, the resolution in optical observation performed with a probe is substantially determined by a larger one of the dimension of the probe tip and a distance from the probe tip to the sample. In order to attain a significantly higher resolution as compared to an optical microscope, in the case of using visible light, the distance between the probe tip and the sample needs to be maintained at approximately 100 nm or less. Thus, in the near-field optical microscope, the spacing between the probe tip and the sample requires nanometer-scale control.

Further, the probe tip has a complex nanostructure. In the case of using the probe for a wet sample such as, for example, a cell, when the microstructure such as a probe tip for generating or selectively transmitting near-field light is brought in proximity to the sample, the probe tip comes into contact with the sample due to the surface irregularities of the sample or a vibration of the device, which may result in protein contamination or damage. As a result, deterioration in light transmission and degradation in localization of light are caused, which has been an obstacle to observation at high resolution.

SUMMARY OF THE INVENTION

A near-field optical microscope according to the present invention includes:
- a light irradiating part for emitting illumination light toward a sample;
- a light receiving part for receiving light;
- a microstructure for generating or selectively transmitting near-field light, the microstructure being disposed on at least any one of an emission side of the light irradiating part and an incident side of the light receiving part, and
- an ultrahigh-wavenumber transmitting medium for transmitting near-field light, the ultrahigh-wavenumber transmitting medium exhibiting anisotropy in one of permittivity and permeability.

Further, a sample observation method according to the present invention includes the steps of:
- bringing a ultrahigh-wavenumber transmitting medium for transmitting near-field light into close contact with a sample, the ultrahigh-wavenumber transmitting medium exhibiting anisotropy in permittivity or permeability;
- illuminating the sample with light; and
- receiving light emitted from the ultrahigh-wavenumber transmitting medium which is in close contact with the sample, through a microstructure.

Still further, a near-field optical probe according to the present invention includes:
- a light shielding member having an aperture smaller than a wavelength of irradiation light;
- a light receiving part for receiving light entering through the aperture; and
- an ultrahigh-wavenumber transmitting medium disposed at least between the aperture and the light receiving part, the ultrahigh-wavenumber transmitting medium exhibiting anisotropy in permittivity or permeability.

Yet further, a near-field optical probe according to the present invention includes:
- a light shielding member having an aperture smaller than a wavelength of irradiation light;
- a light receiving part for receiving light entering through the aperture; and
- an ultrahigh-wavenumber transmitting medium disposed at least between the aperture and the light receiving part, the ultrahigh-wavenumber transmitting medium having a negative value for a real part of permittivity or permeability.

BRIEF DESCRIPTION OF THE DRAWINGS

In the accompanying drawings:

FIGS. 19A and 19B each are a schematic view of the near-field optical microscope according to the second embodiment for illustrating an operation of an objective and an optical probe unit thereof, in which FIG. 19A is an overall view and FIG. 19B is an enlarged view of the vicinity of the aperture;

FIGS. 20A and 20B each are a schematic view illustrating an arrangement of the optical probe unit and the sample in the near-field optical microscope according to the second embodiment, in which FIG. 20A illustrates the optical probe unit before being pressed against the sample and FIG. 20B illustrates the optical probe unit pressed against the sample;

DESCRIPTION OF PREFERRED EMBODIMENTS

In the following, embodiments of an inspection device according to the present invention are described in detail with reference to the accompanying drawings.

(First Embodiment)

Figure 1:
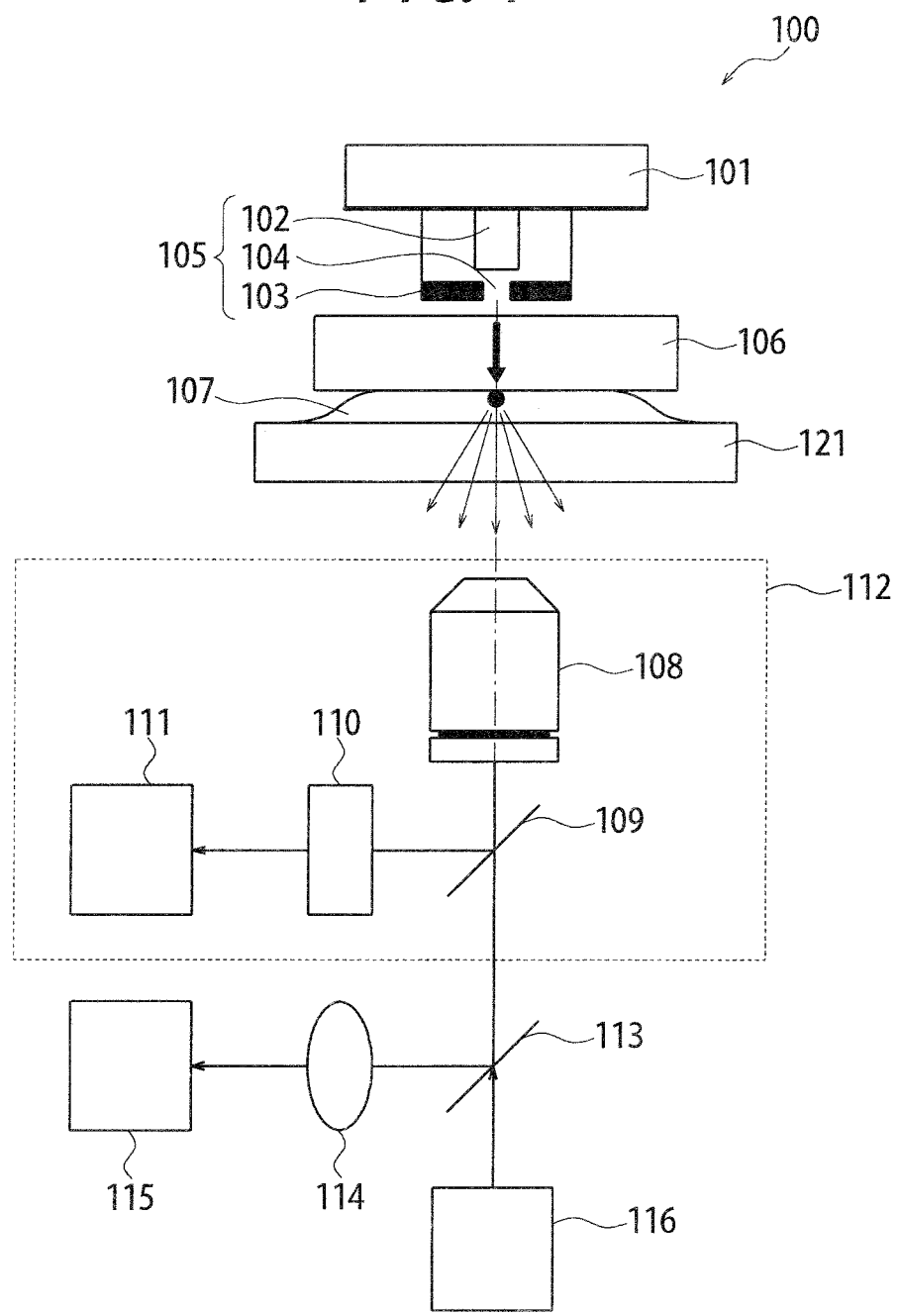
FIG. 1 is a schematic diagram illustrating a system configuration of a near-field optical microscope according to a first embodiment of the present invention.

FIG. 1 illustrates a system configuration of a near-field optical microscope according to a first embodiment of the present invention. The near-field optical microscope 100 includes a scanning part 101, a near-field light source 105, an ultrahigh-wavenumber transmitting medium 106, a light receiving part 112, a half mirror 113, an imaging lens 114, an imaging element 115, and an optical microscope illuminating part (hereinafter, referred to as OM illuminating part) 116. The ultrahigh-wavenumber transmitting medium 106 is disposed between a sample 107 and an aperture 104. The light receiving part 112 includes an objective 108, a dichroic mirror 109, a filter 110, and a light receiving element 111.

A light shielding member 103 is irradiated with light (with a wavelength $E\lambda$) emitted from a light source 102 forming a light irradiating part for emitting illumination light toward the sample 107. The light shielding member 103 has the aperture 104 smaller than the wavelength of light, and hence the light that has passed through the aperture 104 leaks out, as near-field light, to the rear side of the light shielding member 103. In other words, the aperture 104 formed of a microstructure is disposed on an emission side of the light source 102 forming the light irradiating part, and generates near-field light. Hereinafter, the near-field light is referred to as illumination light. In the downstream of the light shielding member 103, the ultrahigh-wavenumber transmitting medium 106 is disposed at a spacing smaller than the wavelength, and the illumination light in part enters the ultrahigh-wavenumber transmitting medium 106.

The ultrahigh-wavenumber transmitting medium 106 exhibits anisotropy in permittivity or permeability, and is configured to transmit near-field light. Optical performance of the ultrahigh-wavenumber transmitting medium is described later. The ultrahigh-wavenumber transmitting medium 106 is capable of transmitting illumination light over a long distance as propagating light, which otherwise becomes near-field light in air, with the result that part of light emitted from the light source 102 can be brought to the sample 107 in the end. In other words, the ultrahigh-wavenumber transmitting medium 106 transmits near-field light generated at the aperture 104 forming a microstructure and emits the light as illumination light toward the sample 107.

Here, the sample 107 is configured to have fluorochrome diffused therein, which generates fluorescence having a wavelength $F\lambda$ when excited by light having a wavelength $E\lambda$. The fluorochrome in the sample 107 is excited by light irradiated from the light source 102 via the aperture 104 and the ultrahigh-wavenumber transmitting medium. The fluorochrome may be directly diffused in the sample 107, or may be processed to the form of fluorescent beads so as to be contained in the sample 107. Alternatively, fluorescent proteins such as green fluorescent proteins (GFP) may be coupled to the sample 107, so that a specific site or function of the sample 107 can be observed. The fluorescence with a wavelength Fλ generated by the fluorochrome passes in part through the objective 108 to be reflected by the dichroic mirror 109, and enters the filter 110.

In general, fluorescence to be generated by using fluorochrome or Quantum dot is very weak in fluorescent intensity with respect to excitation light. For this reason, in the system configuration shown in FIG. 1, excitation light that is higher in intensity than fluorescence is also caused to enter the objective 108, besides fluorescence. However, the filter 110 is designed to filter out excitation light while allowing fluorescence to pass therethrough, and hence only the fluorescence is detected by the light receiving element 111. Light including information (signal) on the sample 107, such as the above-mentioned fluorescence, excitation light, or transmitted light that has passed through the sample, is hereinafter referred to as signal light. The light receiving part 112 is configured to receive light (signal light) from the sample 107.

Illumination light that has been carried to the sample 107 through the ultrahigh-wavenumber transmitting medium 106 forms near-field light in air or in the sample, and hence spreads only in the vicinity of the incident point on the sample 107 without travelling any further. In other words, even if the sample has fluorochrome uniformly dispersed therein, only the fluorochrome in the immediate vicinity of the incident point of the near-field light is excited. As a result, the light receiving part 112 can exclusively detect local information (spatial distribution of the fluorochrome in this case) on a region smaller than the wavelength of the illumination light. Accordingly, the above-mentioned process of signal light detection may be continued for a predetermined time period, so that changes over time of a phenomenon occurring in a micro region on the surface layer of the sample can be investigated.

In particular, while there is no precedent means for performing the above-mentioned local observation with respect to a sample such as a living cell, which is less rigid and unstable in shape, the use of the near-field optical microscope 100 according to the invention enables such observation. Further, response light radiated from the sample 107 corresponds to the fluorescence generated by the fluorochrome in the sample after being excited by reflected light, scattered light, diffracted light, or the illumination light from the sample 107, and hence the response light bears information on optical properties such as a reflectance distribution, a light-scattering coefficient distribution, and a diffraction efficiency distribution in the sample 107, or biochemical information such as a spatial distribution of the fluorochrome in the sample 107. In the following, the information on the optical properties and the biochemical information detectable with optical means are collectively referred to as "optical information".

Next, again with reference to FIG. 1, description is given of a method of obtaining a two-dimensional image of a surface of the sample 107. The light source 102, the light shielding member 103, and the aperture 104 provided to the light shielding member 103 may be configured as a single unit, which is hereinafter referred to as near-field light source 105. The near-field light source 105 constitutes a light irradiating part for emitting illumination light to the sample. The aperture 104 is formed of a microstructure generating near-field light. The scanning part 101 is formed of an electric-powered stage using, for example, a motor-driven micro electro mechanical systems (MEMS) scanner or a piezo element, and capable of changing the position of the near-field light source 105 continuously along the surface of the ultrahigh-wavenumber transmitting medium 106.

At this time, the surface of the sample is irradiated with the illumination light at different positions. Accordingly, the temporal change in the amount of signal light detected by the light receiving element 111 can be associated with each position on the surface of the sample 107, to thereby obtain the fluorochrome distribution on the surface of the sample 107. During the operation of the near-field optical microscope according to this embodiment, the scanning part 101 maintains a distance between the aperture 104 forming a microstructure and the ultrahigh-wavenumber transmitting medium 106 so as to be smaller than the wavelength of illumination light. In this manner, the resolutions at the plurality of the respective observation points are made uniform, and also the receiving part 112 is allowed to detect optical information with accuracy.

In the case where the light source 102 and the aperture 104 are configured separately from each other, both the light source 102 and the aperture 104 may be moved together. However, it is also possible to move only the aperture 104. The reason is as follows. Light emitted from the lightsource 102 and irradiated on the aperture 104 is subjected to restriction under the diffraction limit, and hence the light has spread at least across a region that is as large as the wavelength thereof. Accordingly, even if the aperture 104 is slightly moved within the large region, there is little change in intensity of near-field light (illumination light) leaking out through the aperture 104.

The operation of the near-field optical microscope 100 has been described above by taking fluorescent observation as an example. However, the near-field optical microscope 100 is expected to function similarly so as to perform any other optical process. For example, in a case where the sample 107 has surface irregularities, or a case where the sample 107 has fluctuations in density or composition thereof, the illumination light is scattered across the surface of the sample 107. If the scattering thus caused is a scattering such as Raman scattering, that is accompanied by a change in optical frequency, the illumination light and the scattering light can be separated from each other through the filter 110 as in the case of fluorescence described above. On the other hand, if the scattering is an elastic scattering such as Rayleigh scattering and Mie scattering, the above-mentioned effect of the filter 110 cannot be expected. However, as compared to fluorescence and Raman scattering, elastically scattered light is very high in intensity, and hence illumination light to be detected together with signal light can be treated as noise light of an acceptable level.

On the other hand, irradiation light emitted from the OM illuminating part 116 passes through the half mirror 113 and the dichroic mirror 109 to be irradiated onto the observation region on the sample 107 through the objective 108. Then, light that has acted on the sample 107 is emitted from the sample 107. Part of this light again enters the objective 108, and light of a specific wavelength is reflected by the dichroic mirror 109 so as to be received by the light receiving element 111 after passing through the filter 110. Light that has passed through the dichroic mirror 109 is reflected by the half mirror 113, and imaged onto the imaging element 115 through the imaging lens 114. Although not shown, an output of the imaging element 115 is subjected to image processing in an image processing circuit (not shown), and supplied to, for example, a monitor. In this manner, the state of the sample 107 can be observed in real time. Such an optical observation method as described above is performed similarly to a conventional optical microscope with epi-illumination. In such a case where the sample 107 is transparent, illuminating means for trans-illuminating the sample 107 can be disposed on a side opposite to the optical microscope across the sample 107.

Figure 2:
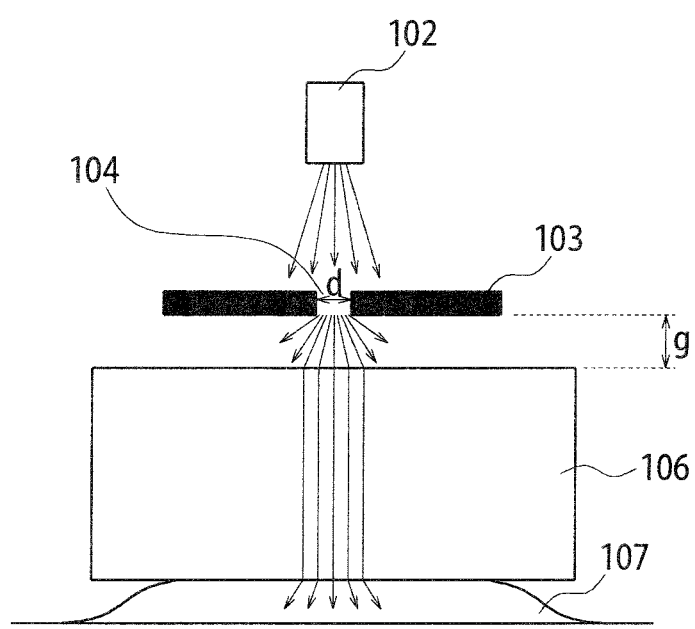
FIG. 2 is an enlarged view illustrating an aperture forming a microstructure of the near-field optical microscope of FIG. 1 and the periphery thereof.

FIG. 2 is an enlarged view illustrating the aperture 104 forming a microstructure according to this embodiment and the periphery thereof. The light shielding member 103 is provided with the aperture 104 in a size d. The aperture 104 may be in any shape, including a cylindrical shape, a cubic shape, or a rectangular parallelepiped shape. The size d represents a largest length of the aperture 104 when viewed from the light source side. That is, for example, in the case where the aperture 104 is in a cylindrical shape, the size d may be a diameter, of the cylinder, and in the case where the aperture 104 is in a cubic shape, the size d may be a diagonal of a square forming the cube. The size d is set to be smaller than the wavelength Eλ of light emitted from the light source 102, and hence the light emitted from the light source 102 is not high in energy efficiency when passing through the aperture 104. Nevertheless, a trace amount of light leaks out, as near-field light, to the rear side of the light shielding member 103 and serves as illumination light.

Near-field light includes a propagating light component capable of propagating in air and an evanescent wave component that exponentially attenuates in air. The ratio of the evanescent wave component increases as the size d of the aperture decreases as compared to the wavelength. Though the evanescent wave component exponentially attenuates as the distance from the light shielding member 103, the evanescent wave component still can reach the ultrahigh-wavenumber transmitting medium 106 with a certain amount of intensity as long as a spacing g between the light shielding member 103 and the ultrahigh-wavenumber transmitting medium 106 is smaller than the wavelength Eλ. Accordingly, for favorable operation of the near-field optical microscope 100 of this embodiment, the size d of the aperture 104 and the spacing g between the light shielding member 103 and the ultrahigh-wavenumber transmitting medium 106 are both required to be smaller than the wavelength Eλ of the illumination light.

Other than the above-mentioned aperture 104, a scattering probe, a bull's-eye structure, or a C-shaped aperture may be employed as a microstructure for generating near-field light. The scattering probe has a pointed tip to be irradiated with light, so as to generate near-field light. As for a conventional near-field optical microscope, there have been proposed different types of systems such as an illumination mode, a focusing mode, and a scattering mode. Of these modes, the illumination mode and the scattering mode can be employed as means for generating near-field light in the near-field optical microscope 100 according to the present invention. The bull's-eye structure is a microstructure in which a concentric groove is formed around the aperture 104 to thereby strongly excite surface Plasmon, so that strong near-field light is generated on a side opposite to a surface to be illuminated. The C-shaped aperture produces a similar effect.

Figure 3:
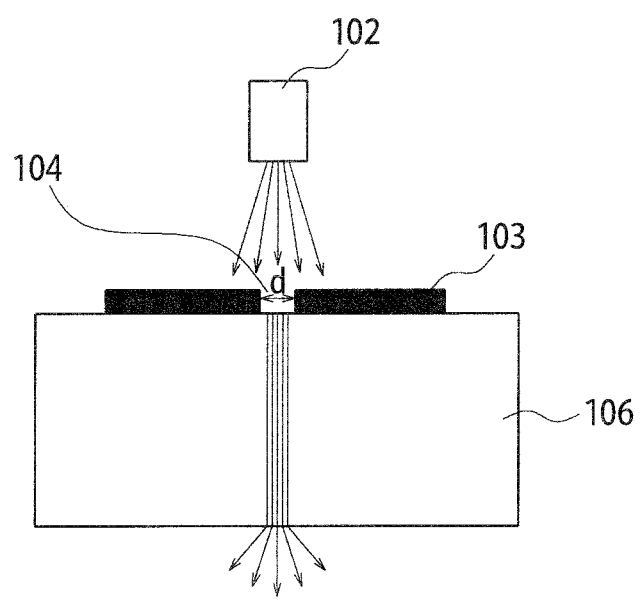
FIG. 3 is an enlarged view illustrating the aperture forming the microstructure of the near-field optical microscope of FIG. 1 and the periphery thereof.

The resolution of the microscope increases as the size d of the aperture 104 decreases. However, light emitted from the light source 102 is filtered out in large part, and hence only a dark image can be obtained. On the other hand, the smaller spacing g is advantageous in terms of increasing both resolution and brightness. FIG. 3 is an enlarged view illustrating again the aperture 104 and the periphery thereof, where the spacing g in FIG. 2 is set to zero, that is, the ultrahigh-wavenumber transmitting medium 106 is arranged as being in contact with the light shielding member 103. This may be the best conceivable configuration in view of reducing the influence of the spacing g on the optical performance as described above.

However, in practice, the formation of slight surface irregularities is unavoidable in the ultrahigh-wavenumber transmitting medium 106 or the light shielding member 103 no matter how hard it is tried to make them flat, and hence it is difficult to always keep the aperture 104 in perfect contact with the ultrahigh-wavenumber transmitting medium 106. In view of this, in order to minimize the spacing g that unavoidably occurs due to the slight surface irregularities or the intrusion of dust, the light shielding member 103 may preferably be pressed against the ultrahigh-wavenumber transmitting medium 106 for operation. Alternatively, the light shielding member 103 provided with an aperture and the ultrahigh-wavenumber transmitting medium 106 may be integrally formed so as to always ensure that the spacing g is zero in a strict sense, to thereby completely overcome the above-mentioned problem. Further, in a case where a two-dimensional image is desired to be obtained by using such a configuration, the ultrahigh-wavenumber transmitting medium 106 itself, instead of the aperture 104 or the near-field light source 105, may be scanned in turn against the sample.

Figure 4:
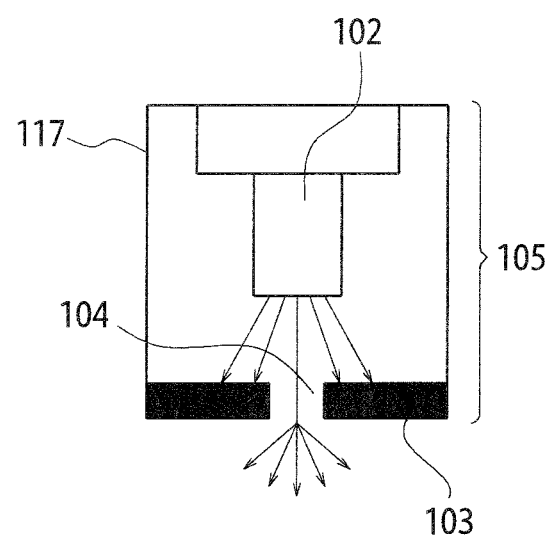
FIG. 4 is a view illustrating a configuration of a near-field light source in which a light source and a light-shielding member having an aperture are integrally formed.

FIG. 4 is a view illustrating a configuration of the near-field light source 102 in which the light source 102 and the light-shielding member 103 having an aperture 104 are integrally formed. The near-field optical microscope 100 is a device for observing a microscopic structure on the sample 107, and hence, changes in the positional relation between the light source 102 and the aperture 104 due to vibration or convection during the operation may lead to changes in intensity or spatial distribution of near-field light leaking out of the aperture 104 toward the ultrahigh-wavenumber transmitting medium side, which results in a fear that an image to be obtained, for example, may suffer significant degradation in optical quality.

However, with the configuration of the near-field light source as illustrated in FIG. 4, in which the light source 102 and the light shielding member 103 are fixed to a common housing 117, the above-mentioned performance degradation can be suppressed, which allows satisfactory observation to be performed. For efficient use of optical energy from the light source 102, it is effective to provide a condenser lens (not shown) between the light source 102 and the light shielding member 103 so that condensed light is irradiated toward the aperture 104. In this configuration, light is condensed within a small region in the vicinity of the aperture 104, and therefore advanced positional control is required in order to always maintain the position of the minute aperture 104 at the center (point at which the light intensity becomes maximum) of the region. Furthermore, the intensity of illumination light that leaks out of the aperture 104 significantly varies when the position of the aperture 104 is changed due to vibration and the like. In other words, it is particularly advantageous to integrally form the light source 102 and the light shielding member 103 into the near-field light source, in the case where the condenser lens (not shown) is provided for the purpose of enhancing energy efficiency.

Figure 5:
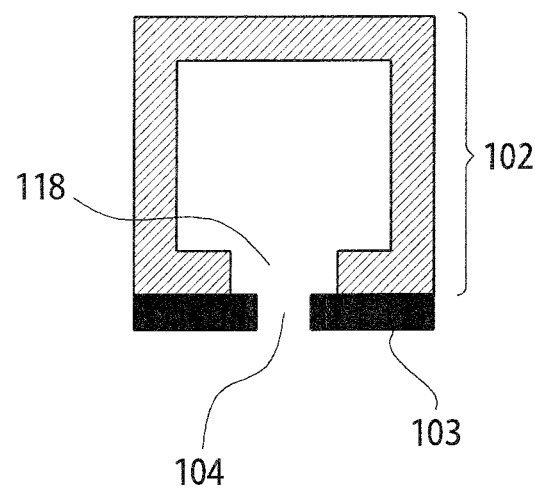
FIG. 5 is a view illustrating a configuration of a near-field light source having an aperture provided directly to the light source.

It is needless to say that, as illustrated in FIG. 5, the aperture 104 may be directly provided to the light source 102. As the light source 102, various types of light sources, including a light emitting diode (LED), a laser diode (LD), a halogen lamp, a xenon lamp, and a mercury lamp can be employed. These types of light sources each have a region for emitting light, and the region is hereinafter referred to as emitting part. The light shielding member 103 is arranged so as to cover the emitting part 118, and the aperture 104 that is smaller than the wavelength is formed in part of the light shielding member 103. In the near-field light source 105 configured as described above, the positional relation between the emitting part 118 and the aperture 104 remains unchanged regardless of any external environmental change such as vibration or thermal expansion, with the result that and stable near-field light can thus be generated.

Figure 6:
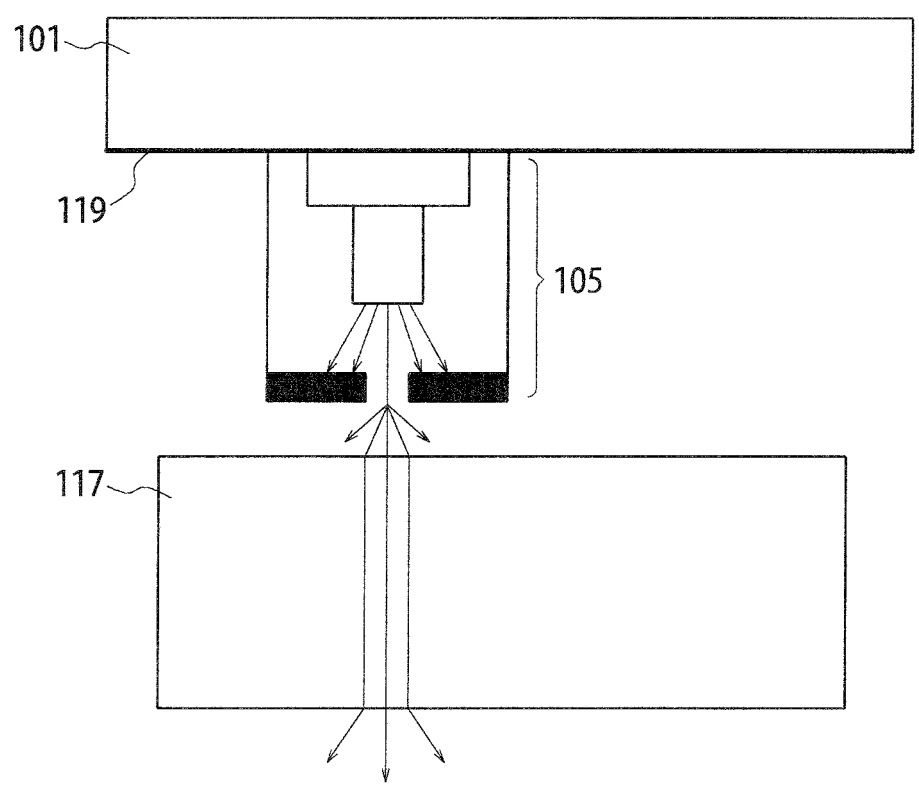
FIG. 6 is a schematic view for illustrating a scanning part of the near-field optical microscope of FIG. 1.

FIG. 6 is a schematic view for illustrating the scanning part 101. The near-field light source is connected to the scanning part 101 via an interface 119, and is capable of moving along the interface 119 in a single axial direction or a biaxial direction in response to an electric signal. The near-field light source 105 irradiates the sample (not shown) with illumination light while moving as described above, and the light receiving part 112 is used to detect signal light scattered by the sample or signal light (fluorescence) generated by excited fluorochrome in the sample, to thereby obtain one-dimensional or two-dimensional spatial information on the surface of the sample. For smooth movement of the near-field light source 105, a lubricant may be filled in or beads may be dispersed between the near-field light source 105 and the ultrahigh-wavenumber transmitting medium 106.

Figure 7:
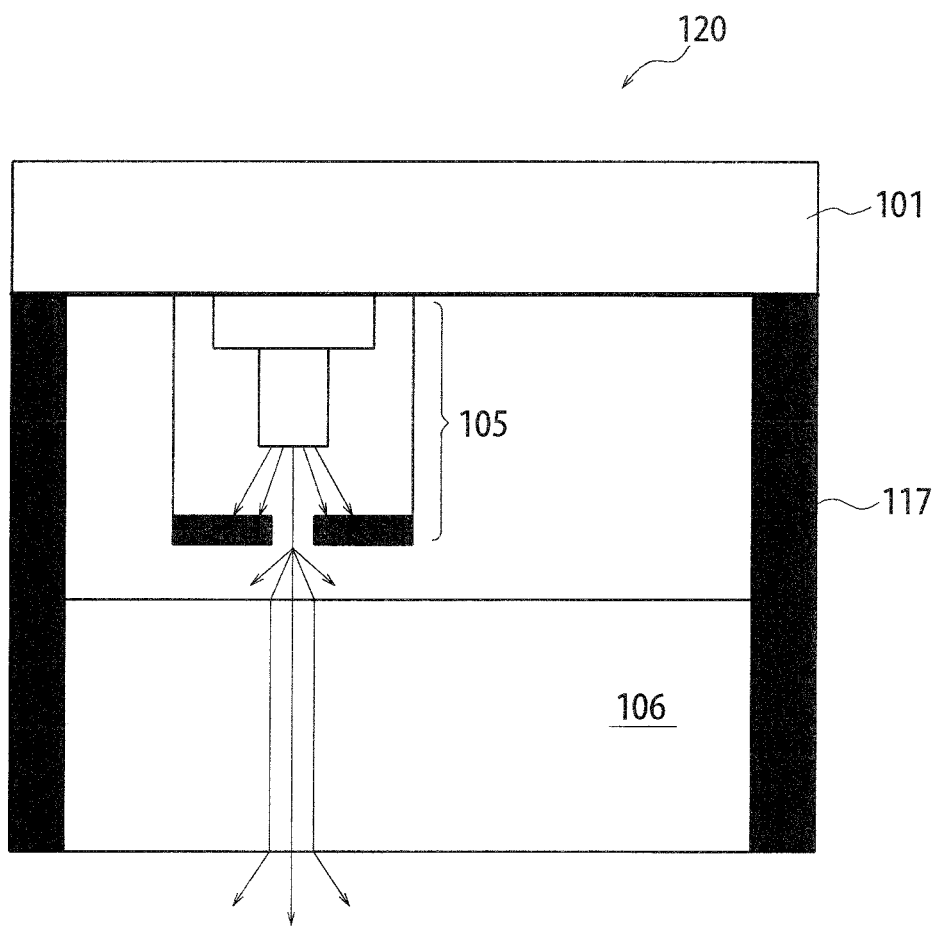
FIG. 7 is a schematic diagram illustrating an example of a schematic configuration of a near-field excitation unit of the near-field optical microscope of FIG. 1.

Alternatively, as in the case of a flying head to be used for a hard disk drive (HDD) of a personal computer, a hydrodynamic force may be acted on so to keep a constant spacing between the near-field light source 105 and the ultrahigh-wavenumber transmitting medium 106 during scanning. Further, as illustrated in FIG. 7, the scanning part 101, the near-field light source 105, and the ultrahigh-wavenumber transmitting medium 106 may be fixed to or incorporated into the common housing 117 so as to be integrally formed as a near-field excitation unit 120. This configuration is preferred because it improves the mechanical precision between the near-field light source 105 and the ultrahigh-wavenumber transmitting medium 106 or the sample (not shown). The configuration is also preferred in terms of optical performance because it can reduce the effect of noise light leaking thereinto from outside.

Figure 8:
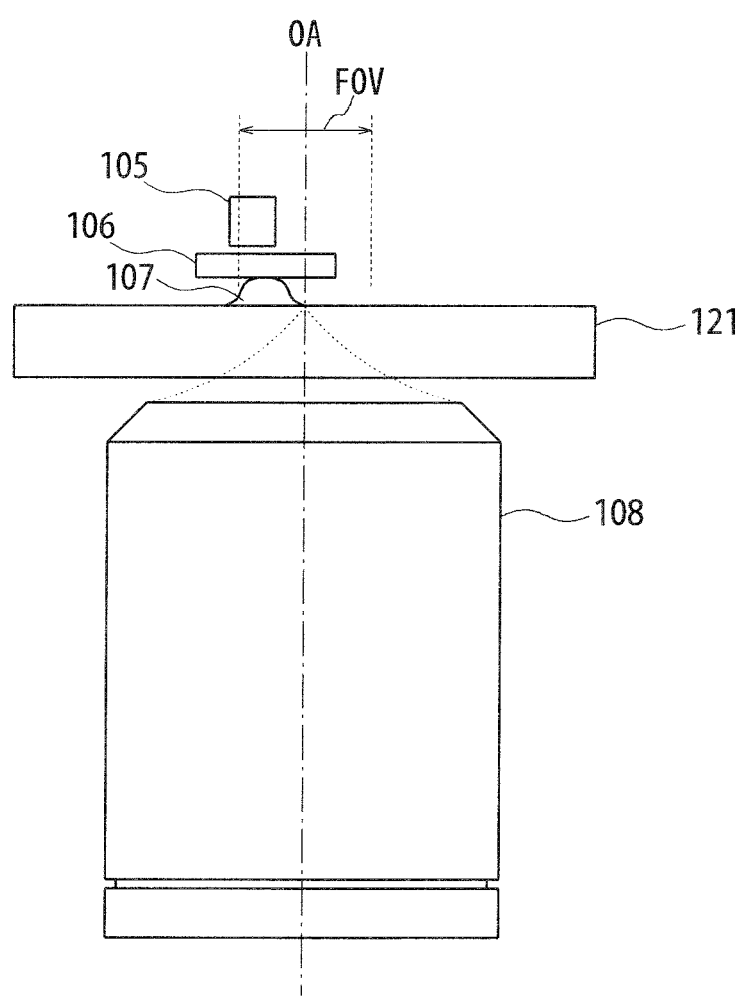
FIG. 8 is a schematic view for illustrating a function of an objective in the near-field optical microscope of FIG. 1.

FIG. 8 is a schematic view for illustrating a function of the objective 108 in the near-field optical microscope 100 according to this embodiment. As already described above, the objective 108 forms part of the light receiving part 112, and has a function of collecting, as much as possible, signal light emitted from the surface layer of the sample. On the other hand, as also illustrated in FIG. 1, the near-field optical microscope 100 can be arranged on the optical microscope, to thereby share the objective 108 in common. Specifically, as illustrated in FIG. 8, the sample 107 is placed via a glass slide 121 above the objective 108 of the optical microscope, and the ultrahigh-wavenumber transmitting medium 106 and the near-field light source 105 are respectively arranged above a surface 107a of the sample. To observe a living cell, a cultured cell placed within a Petri dish or a glass bottom dish is often used, and accordingly, the glass slide 121 of FIG. 8 in this case corresponds to the bottom face of a Petri dish or a glass bottom dish.

FIG. 8 shows an optical axis OA and a field of vision FOV of the objective 108. As illustrated in the drawing, in a configuration where the aperture 104 and the ultrahigh-wavenumber transmitting medium 106 fall within, at least in part, the field of vision FOV of the optical microscope, the near-field optical microscope 100 can also be used to observe the sample 107 located within the field of vision FOV, so that the observation images of the sample each obtained by the optical microscope and by the near-field optical microscope, respectively, can both be provided. In particular, in a case where the near-field optical microscope 100 has a small observable region (viewing field), an image obtained by the optical microscope can be used as a finder, to thereby specify or move the observation region smoothly, which contributes to improvement in operability. In the microscopic observation performed by using the optical microscope and the near-field optical microscope 100, it is preferred to use light sources of different wavelengths (light sources that are different in excitation light and fluorescence, in the case of using fluorescence) so as to be able to separately detect the observation images to be obtained by these two microscopes. However, in a case where the light sources of the same wavelength are desired to be used because of the properties of the sample, for example, the observations by these two microscopes may be performed in a time-dividing manner.

Figure 9:
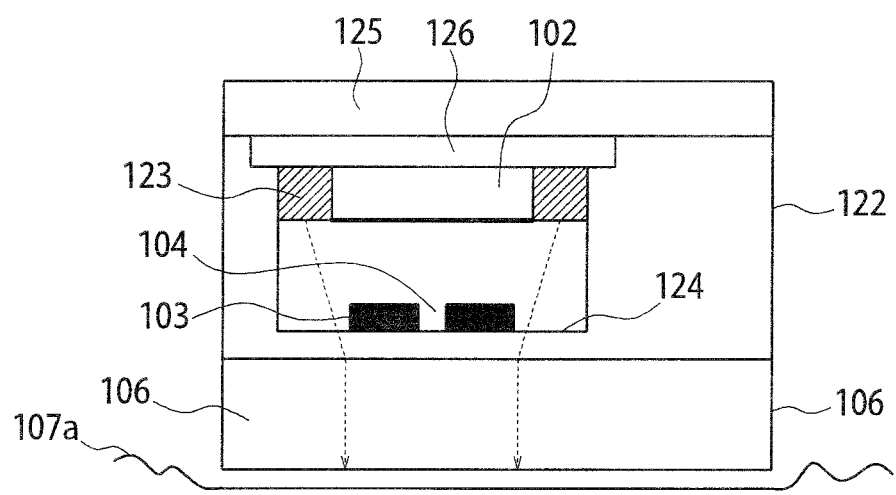
FIG. 9 is a schematic view illustrating an example of a configuration of a near-field excitation unit provided with a trans-illumination for optical microscopic observation.

FIG. 9 is a schematic view illustrating a near-field excitation unit 122 provided with a trans-illumination for optical microscopic observation. In observing a transparent (translucent) sample such as a living cell, a trans-illumination is often used so as to utilize a phase difference or differential interference. With this in view, the near-field excitation unit 122 renders a configuration in which an OM illuminating part formed of a light emitting element 123 for use in a trans-illumination may be provided to a scanner moving part 126 that is movable with respect to a scanner holding part 125 (that is, provided on the opposite side of the above-mentioned optical microscope across the sample 107), to thereby perform trans-illumination of the optical microscope. Though the operation as the near-field optical microscope is not described again, the necessary functions may be fulfilled as long as the light source 102, the light shielding member 103, the aperture 104, and the ultrahigh-wavenumber transmitting medium 106 are provided.

On the other hand, trans-illumination light emitted from the light emitting element 123 is irradiated onto the surface 107a of the sample via a transmission region 124 and the ultrahigh-wavenumber transmitting medium 106. The transmission region 124 is provided on a surface facing the ultrahigh-wavenumber transmitting medium 106, and transmits illumination light (trans-illumination light) generated by the OM illuminating part. It is sufficient that the transmission region 124 and the ultrahigh-wavenumber transmitting medium 106 are configured to be transparent only with respect to the wavelength of the trans-illumination light or to be capable of guiding only the wavelength of the trans-illumination light. As illustrated in FIG. 9, the light source 102 to be used as the near-field light source and the OM illuminating part formed of the light emitting element 123 to be used for trans-illumination of the microscope may be arranged in the same plane. In this case, the light source 102 and the light emitting element 123 can be formed on the same substrate in a semiconductor process, which can improve productivity.

Figure 10:
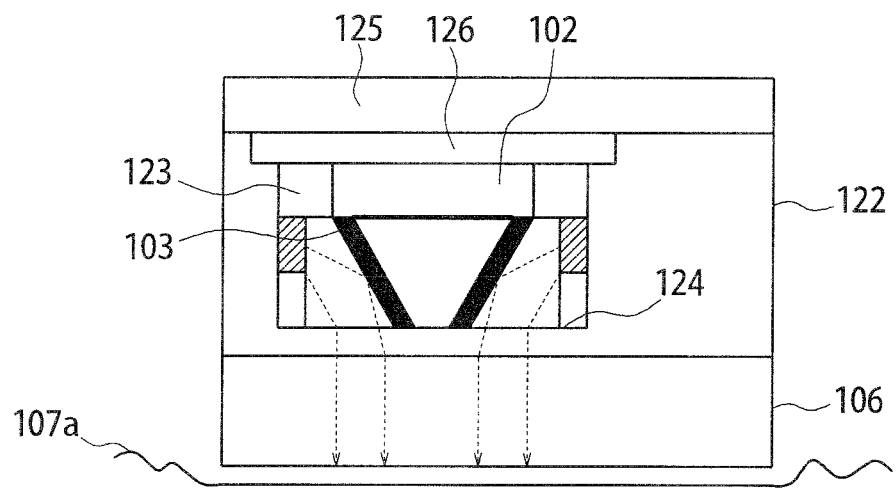
FIG. 10 is a schematic view illustrating another example of a configuration of the near-field excitation unit provided with a trans-illumination for optical microscopic observation.

Further, as illustrated in FIG. 10, the light shielding member 103 may be configured to separate a region operating as the near-field light source and a region as trans-illumination, so as to prevent trans-illumination light for the optical microscope from being mixed into the illumination light for the near-field optical microscope 100, to thereby suppress degradation in optical performance. Further, the light shielding member 103 can be used as a reflecting surface for performing trans-illumination more efficiently. In FIGS. 9 and 10, the OM illuminating part is provided to the scanner moving part. However, the OM illuminating part may be provided to the scanner holding part. Although not shown, a shielding part can be provided between the light source 102 and the light emitting element 123 forming the OM illuminating part, so as to shield illumination light from the light emitting element 123. With this configuration, illumination light from the light emitting element 123 and illumination light from the light source 102 can be separated from each other, so that noise during observation can be reduced, with the result that an image with improved S/N ratio can be obtained.

Figure 11:
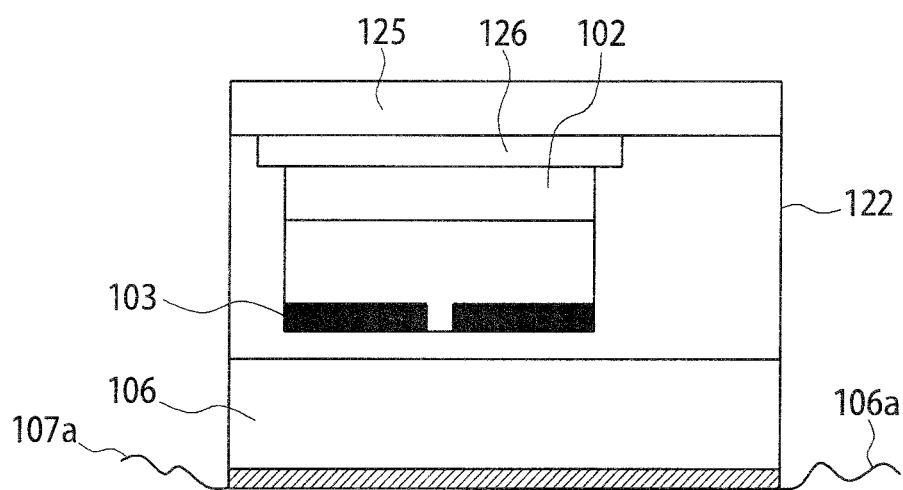
FIG. 11 is a schematic view illustrating a near-field excitation unit having a treated surface that has been subjected to a treatment for enhancing adhesion to a sample.

FIG. 11 is a schematic view illustrating the near-field excitation unit 122 in which a treated surface that has been subjected to a treatment for enhancing adhesion to the sample 107 is provided to a sample-side surface of the ultrahigh-wavenumber transmitting medium 106. According to the near-field optical microscope 100 of this embodiment, illumination light is irradiated onto a very small region on the surface of the sample 107, to thereby attain higher resolution than a conventional optical microscope. Accordingly, an unpredictable change occurring in the relative position between the ultrahigh-wavenumber transmitting medium 106 and the sample 107 leads to degradation in optical performance. In view of this, the sample-side surface of the ultrahigh-wavenumber transmitting medium 106 is subjected to treatment for enhancing adhesion to the sample 107, to thereby prevent degradation in optical performance. For example, in observing a living cell, the sample-side surface of the ultrahigh-wavenumber transmitting medium 106 may be coated with polylysine, to thereby enhance adhesion to the living cell.

Figure 12:
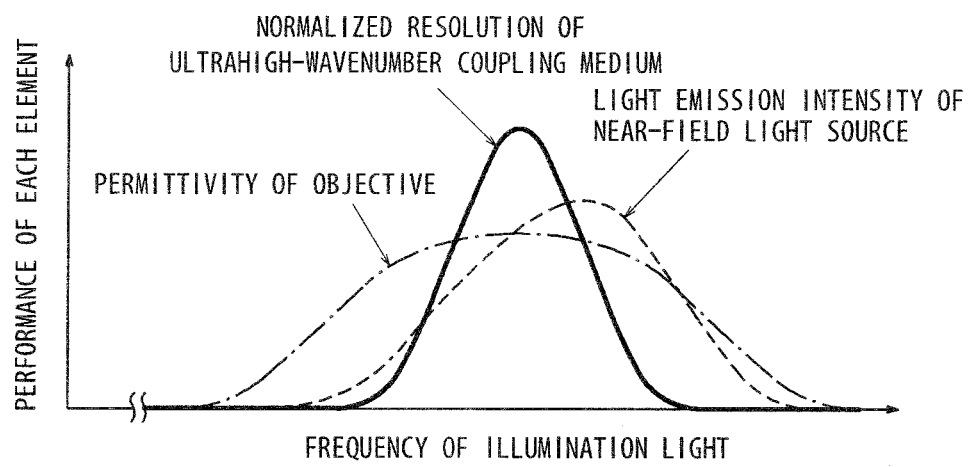
FIG. 12 is a graph showing performance of an ultrahigh-wavenumber transmitting medium, a near-field light source, and an objective, with respect to the frequency of illumination light.

FIG. 12 is a graph showing performance of the ultrahigh-wavenumber transmitting medium 106, the near-field light source 105, and the objective 108 (light receiving part), with respect to the frequency of illumination light. The normalized resolution of the ultrahigh-wavenumber transmitting medium 106, the illumination intensity of the near-field light source 105, and the transmittance of the objective are respectively used to define the performance of each element. The normalized resolution is a value obtained by dividing the maximum spatial frequency transmittable through the ultrahigh-wavenumber transmitting medium 106 by a spatial frequency corresponding to the wavelength of illumination light in vacuum. As is apparent in the graph, the frequencies of illumination light that allow the respective devices to deliver high performance do not necessarily fall within the same range. However, as long as the light emission band of the near-field light source 105 overlaps with at least part of an operating band in which the ultrahigh-wavenumber transmitting medium 106 exhibits high resolution, at least part of illumination light generated by the near-field light source 105 can be kept focused to a size of the aperture 104 while illuminating the surface 107a of the sample, to thereby attain high resolution as a near-field optical microscope. Further, as long as the band in which the optical system of the objective 108 exhibits high transmittance overlaps with at least part of the operating band in which the ultrahigh-wavenumber transmitting medium 106 exhibits high resolution, signal light generated by the surface 107a of the sample can be detected with high efficiency, to thereby attain high resolution as a near-field optical microscope.

Figure 13:
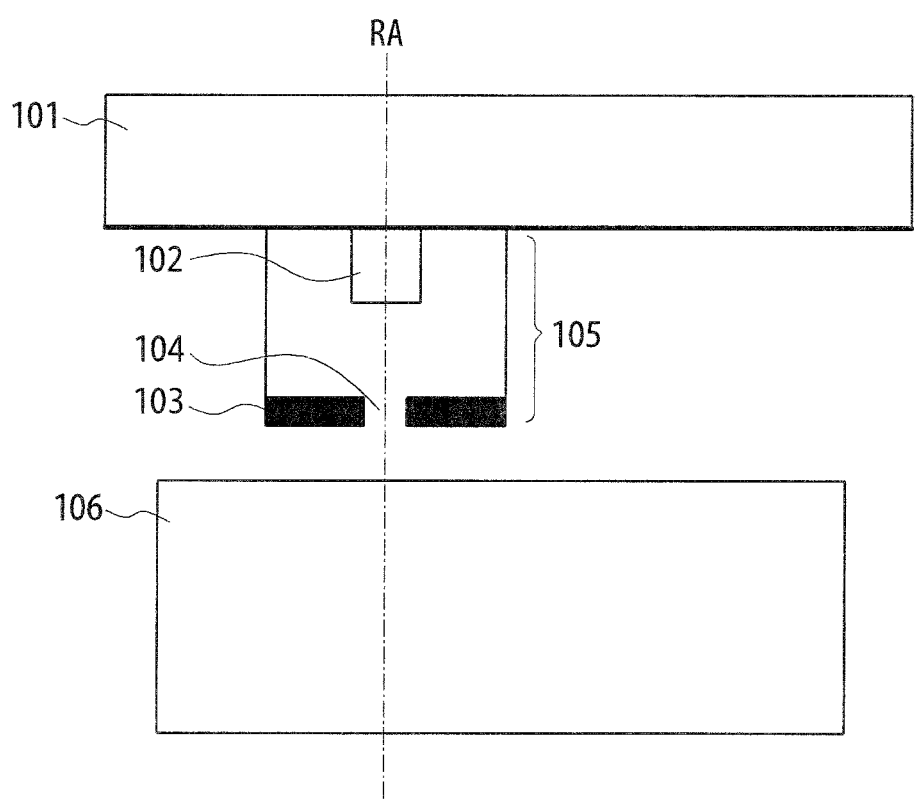
FIG. 13 is a schematic view for illustrating a near-field optical microscope according to a first embodiment in which a near-field light source is configured to be rotatable.

FIG. 13 is a schematic view for illustrating the near-field optical microscope 100 in which the near-field light source 105 is configured to be rotatable. The near-field light source 105 is configured to be rotatable around a rotational axis RA defined by a straight line connecting between the light emitting region of the light source 102 and the aperture 104. In operation of the near-field optical microscope 100, the near-field light source 105 is caused to rotate, with respect to the ultrahigh-wavenumber transmitting medium 106, around the rotational axis RA defined by a straight line connecting between the aperture 104 and an observation point on the sample 107. For example, in a case where the light source 102 is formed by a device such as a laser diode that involves induced emission of light, light to be emitted often becomes coherent having the same wavelength and the same wave front, and forms linearly-polarized light in many cases.

On the other hand, a sub-wavelength imaging element (material) such as a meta-material can be employed as the ultrahigh-wavenumber transmitting medium 106. Many of those elements have strong polarization dependence, and exhibit a high resolution in the polarization direction, while exhibiting a relatively low resolution in a direction orthogonal thereto. In view of this, with the near-field light source 105 for emitting linearly-polarized light being configured as rotatable around the rotational axis RA as illustrated in FIG. 13, signal light obtained by averaging signal light polarized in different directions can be detected during operation, which can cancel out the polarization dependence of the ultrahigh-wavenumber transmitting medium 106, to thereby obtain an excellent image. In consideration of the purpose of the rotating operation as described above, it is needless to say that only the light source 102 may be rotated, without rotating the near-field light source 105.

In the case of rotating the near-field light source or the light source, in order to obtain the effect of the rotation, it is necessary to detect light integrated over a period of time taken for at least ¼ rotation, that is, a period of time taken for ¼ cycle or more of the rotation of the near-field light source 105. Accordingly, the light receiving part 112 further includes a signal light detecting part (not shown). Then, in the case where the rotational speed of the near-field light source 105 (light source 102) is lower than the response speed of the signal light detecting part (formed by a detector such as, for example, a photo diode or a photomultiplier), the detector side may perform an operation of integration of the like.

Figure 14:
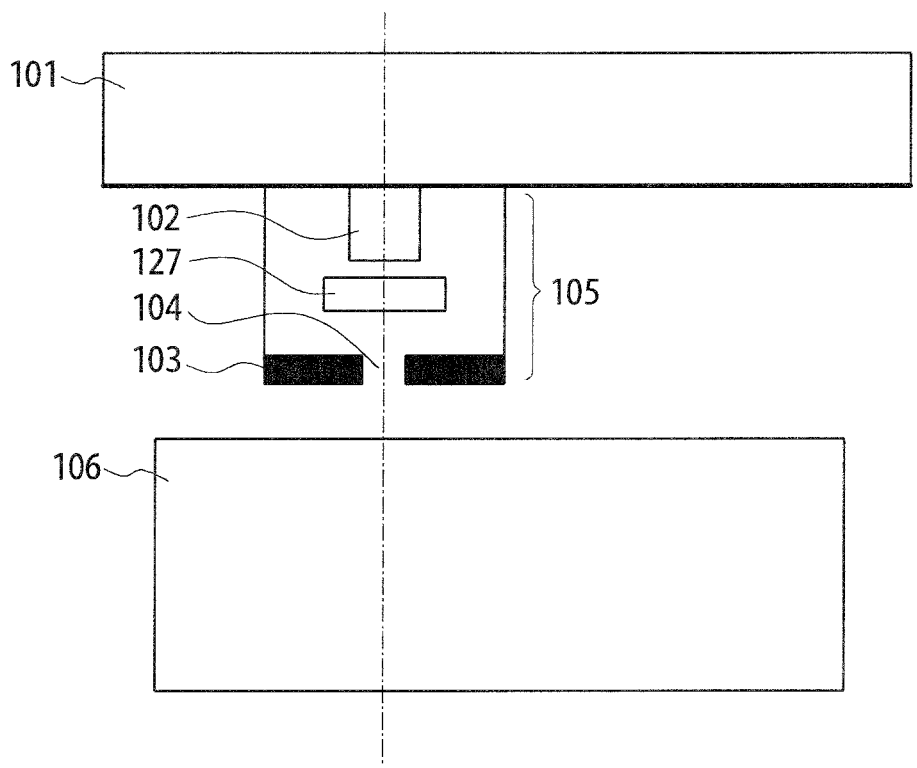
FIG. 14 is a schematic diagram illustrating an example of a schematic configuration of a near-field light source provided with polarization converting means.

Alternatively, as illustrated in FIG. 14, polarization converting means 127 for converting linearly-polarized light into circularly-polarized light or elliptically-polarized light may be provided inside the near-field light source 105, which can also produce the same effect. For the polarization converting means 127, an optical crystal or a liquid crystal device which shows an electro-optical effect can be employed. The optical properties of the optical crystal or the liquid crystal device as a material change in response to electric signals, to thereby change the polarization state. In other words, such devices perform no operation of mechanical rotation, which eliminates a fear of exerting an influence of vibration or reducing the rotational speed. Further, the polarization state may be adjusted during operation, to thereby optimize an image to be obtained.

Figure 15:
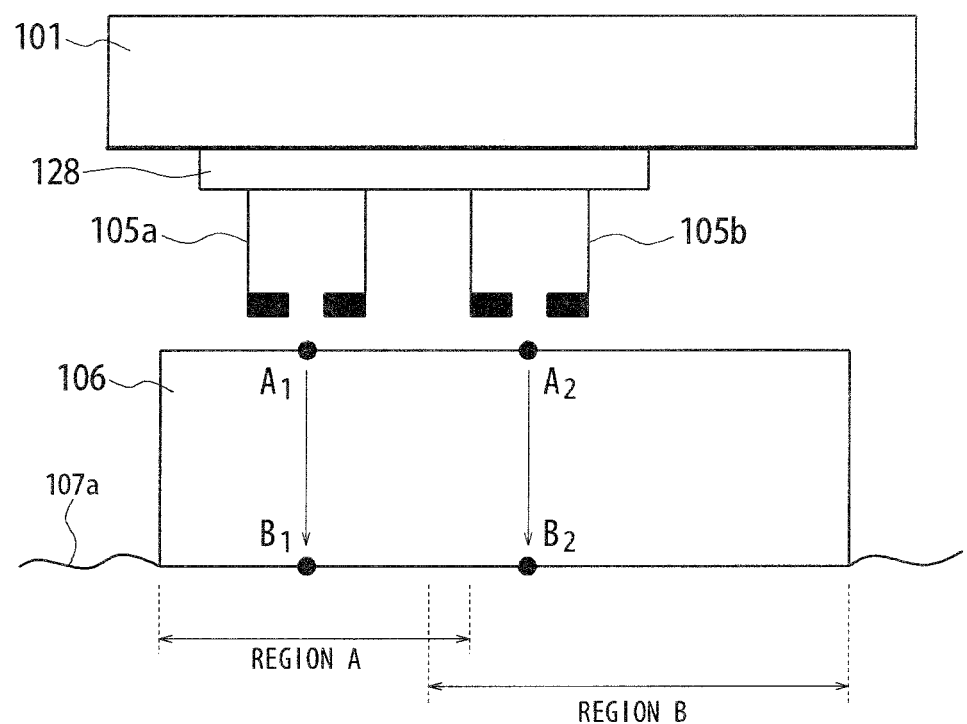
FIG. 15 is a schematic view illustrating a main part of a near-field optical microscope provided with two near-field light sources.

FIG. 15 is a schematic view illustrating a main part of a near-field optical microscope including two near-field light sources, namely, the near-field light sources 105a and 105b. The two near-field light sources 105a and 105b are fixed to a base 128 shared in common. When the base 128 is moved together with the scanning part 101, the near-field light source 105a and the near-field light source 105b each illuminate points $A_1$ and $A_2$, respectively, to thereby scan corresponding points $B_1$ and $B_2$ on the surface 107a of the sample, respectively. Signal light from the point $B_1$ and signal light the point $B_2$ are both detected by a signal light detecting part 112, and each light can be distinguished from each other based on the wavelength or the polarization state. Alternatively, the distinction may be made through a time-splitting method or lock-in detection. The near-field excitation unit 122 is a very small device, and hence a scannable region thereof may be limited due to the design of the scanning part 101, the mechanical strength of the ultrahigh-wavenumber transmitting medium 106, or the requirements for the operation speed.

With the configuration of FIG. 15, the near-field light source 105a and the near-field light source 105b each scan a region A and a region B, respectively. In this manner, it is sufficient that a region to be scanned by the scanning part 101 is substantially half as compared to the case where only one near-field light source 105 is employed, which enables to secure a wide field of view despite such limitations.

Figure 16:
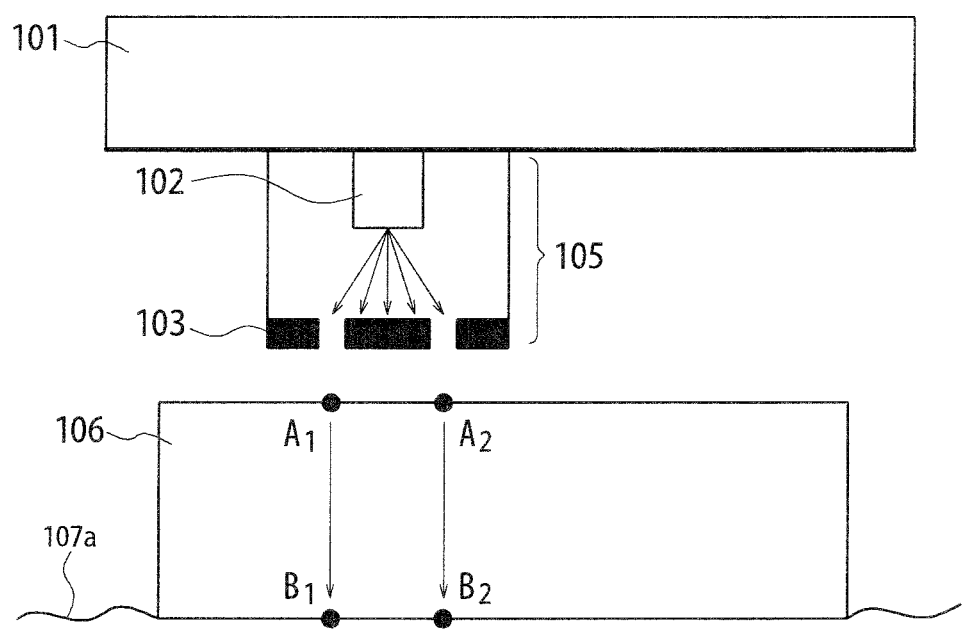
FIG. 16 is a schematic view illustrating a main part of a near-field optical microscope provided with two apertures.

Further, electric control for causing the two near-field light sources 105a and 105b to emit light alternately, that is, at different timings, can be performed at extremely high speed, and hence the operation speed can be increased by reducing the scanning area. FIG. 15 illustrates a case where two near-field light sources are provided. It is needless to say, however, that three or more near-field light sources may also be provided. As the number of the near-field light sources increases, there may be a greater effect of reducing the scanning area and increasing operation speed. Further, at least two openings may be provided as illustrated in FIG. 16 in order to provide similar effects as those in the case of using two near-field light sources. In this configuration, only one light source is necessary, which leads to a reduction in manufacturing cost of the near-field optical microscope.

Figure 17:
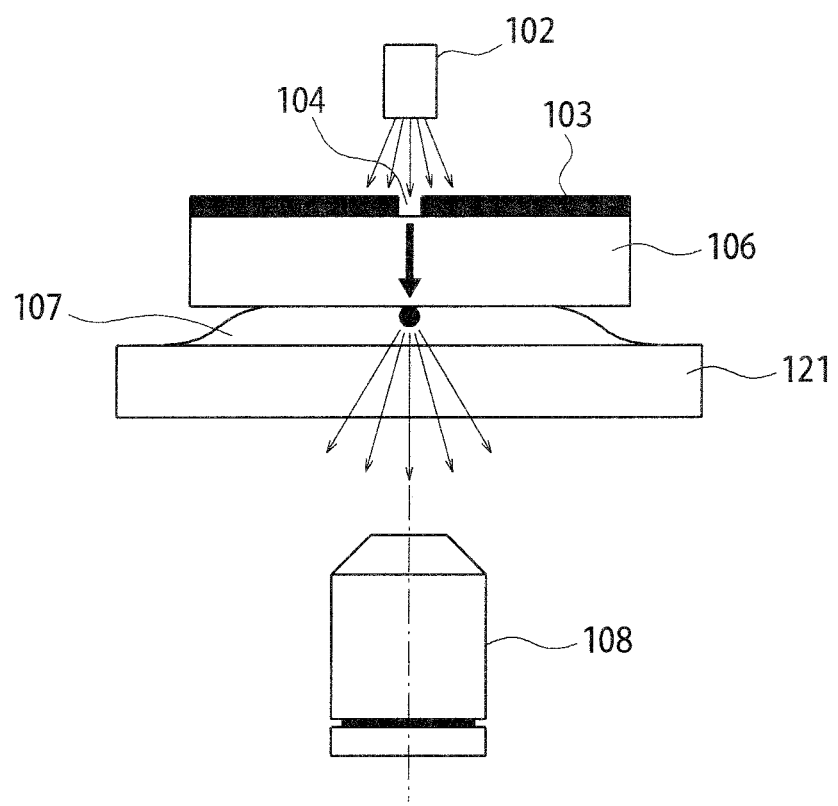
FIG. 17 is a schematic view illustrating a structure in which a microstructure and an ultrahigh-wavenumber transmitting medium are integrally formed.

FIG. 17 is a schematic view illustrating a structure in which a microstructure (aperture) and an ultrahigh-wavenumber transmitting medium are integrally formed. The aperture 104 forming a microstructure, which is illuminated by the light source 102, forms a light spot smaller than the wavelength, and the light passes through the ultrahigh-wavenumber transmitting medium 106 with substantially unscattered to be is transmitted to a surface of the sample 107. The light thus transmitted causes fluorescence or scattered light to be generated at a surface of the sample 107, which enters in part the objective 108, and is detected by detecting means (not shown). In this configuration, no gap is formed between the microstructure, the ultrahigh-wavenumber transmitting medium 106, and the sample 107, and hence the illumination area on the surface of the sample can be reduced to extremely small, which makes it possible to detect optical information on a further minute region.

Further, the integral structure of the microstructure and the ultrahigh-wavenumber transmitting medium 106 can be moved with respect to the sample 107, to thereby also obtain a two-dimensional image of the surface of the sample 107. At this time, the light source 102 is fixed to the same position, and hence it is possible to filter out various noise factors (such as power fluctuations due to vibration) which are otherwise caused by the movement of the light source 102. Further, the ultrahigh-wavenumber transmitting medium 106 is generally a small device that is 100 μm in width and several μm in thickness, and hence very lightweight. Accordingly, moving such a small device to perform scanning offers a number of mechanical advantages (such as downsizing and speeding up of the scanner).

The positional relation between the ultrahigh-wavenumber transmitting medium 106 and the sample 107 is configured substantially common to the above-mentioned embodiment. In the conventional probe microscope (such as a near-field optical microscope or an atomic force microscope), it is necessary to scan the probe in close proximity to the sample 107 to be observed, and hence it is impossible to observe a sample, such as a living cell, which is extremely less rigid and unstable in shape, or it may still be possible but only with an extremely sophisticated control technology. However, in the system configuration of the near-field optical microscope 100 according to this embodiment, the ultrahigh-wavenumber transmitting medium 160 also functions as a so-called cover glass, which is pressed against the sample 107, to thereby maintain the surface 107a of the sample in a flattened state. In terms of the conventional practice, a cover glass and a probe microscope are considered as incompatible. The reason is as follows. In the probe microscope, it is necessary to bring the probe in close proximity (to a distance substantially equal to the resolution) to the sample in order to attain a certain level of resolution, whereas the cover glass needs to have a considerably large thickness (at least equal to or more than several μm) as compared to the resolution in order to serve its function (of flattening the surface 107a of the sample).

The ultrahigh-wavenumber transmitting medium 106 used in this embodiment is capable of transmitting a light spot, which is considerably smaller than the wavelength of light, over a distance of several μm or more, and hence the use of the ultrahigh-wavenumber transmitting medium 106 as a cover glass can eliminate the above-mentioned limitations of the probe microscope. In other words, in the near-field optical microscope 100 according to this embodiment, the ultrahigh-wavenumber transmitting medium functions as a key device that combines high resolution of a probe microscope and mechanical strength of a cover glass. According to the configuration disclosed herein, the near-field light source 105 or the microstructure (the aperture 104) is changed in position, to thereby scan the sample 107. However, in practice, the scanning is actually performed on the hard and flat ultrahigh-wavenumber transmitting medium 106, rather than the sample 107. Accordingly, it is sufficient enough to change the position of the near-field light source 105 or the microstructure with respect to the ultrahigh-wavenumber transmitting medium 106 by following a predetermined procedure, and there is no need to identify the position during operation. In other words, unlike the conventional probe microscope, there is no need to provide any means (such as an interatomic force detecting means, an optical lever, or a resonator) to identify a relative position of the probe with respect to the sample, making it possible to provide a dramatic reduction in size and cost and a dramatic increase in speed of the microscope system.

(Second Embodiment)

Figure 18:
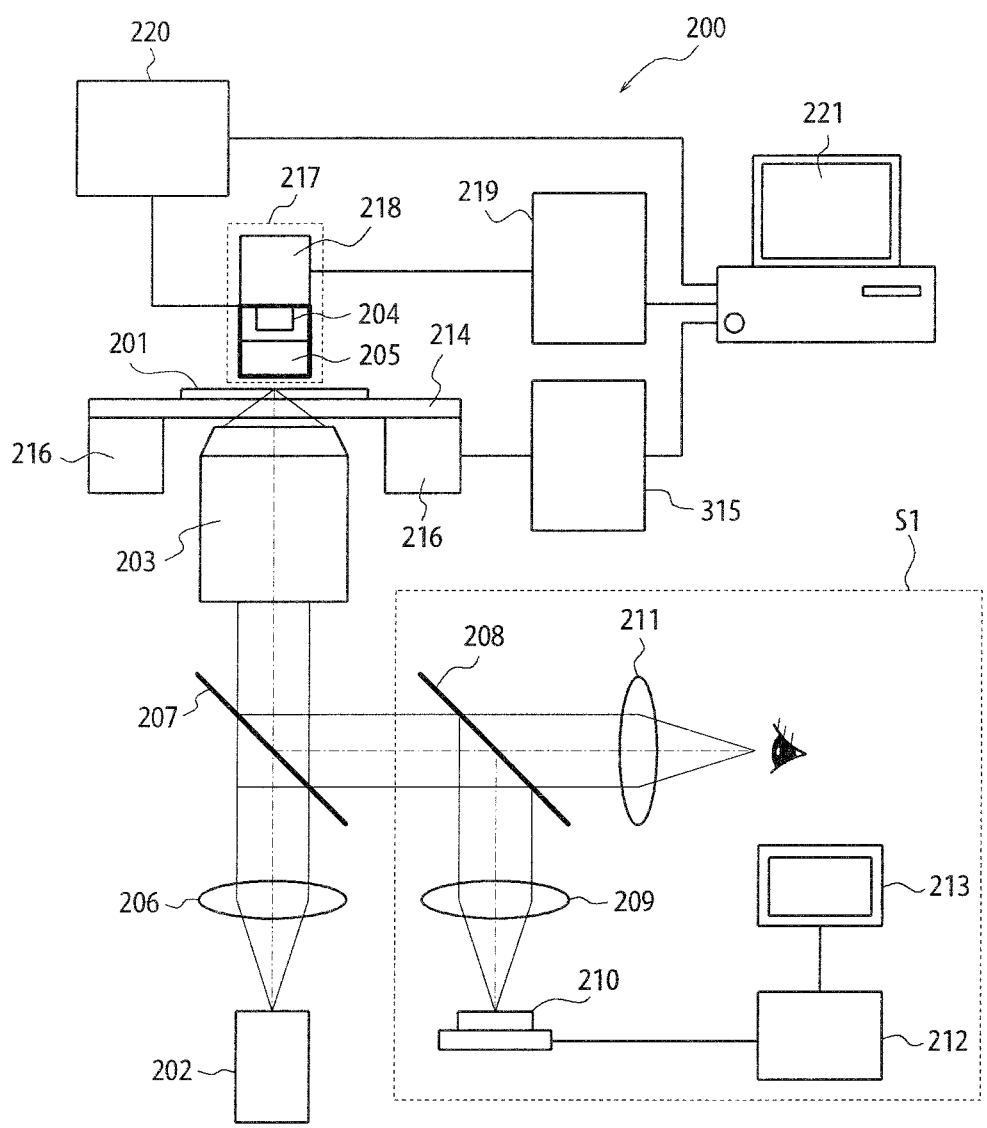
FIG. 18 is a schematic diagram illustrating a system configuration of a near-field optical microscope according to a second embodiment.

FIG. 18 illustrates an example of a system configuration of a near-field optical microscope according to a second embodiment of the present invention. In FIG. 18, the near-field optical microscope 200 includes an optical system including a light source 202 forming a light irradiating part for emitting illumination light toward the sample 201 and an objective 203, a near-field optical probe 204, and an ultrahigh-wavenumber transmitting medium 205 disposed between a sample 201 and the near-field optical probe 204 including a microstructure 223. It should be noted that the near-field optical microscope 200 employs the optical probe 204, and may also be referred to as optical probe microscope.

The irradiation light emitted from the light source 202 passes through a collimating lens 206 to be converted into substantially parallel light, and then passes through a first half mirror 207 to be focused onto an observation region on the sample 201 by the objective 203. As a result, response light is radiated from a predetermined position on the sample 201.

Part of the response light radiated from the sample 201 is caused to enter again the objective 203 to be reflected by the first half mirror 207, and then enters the observation optical system S1. Further, the light is split in two by a second half mirror 208, one of which being imaged onto an imaging element 210 through an imaging lens 209, the other one of which being made visible to the naked eye through an eyepiece lens 211.

An output of the imaging element 210 is subjected to image processing in an image processing part 212, and then supplied to an optical microscope observation monitor 213. As a result, an image of the sample 201 obtained by the optical microscope is displayed on the optical microscope observation monitor 213, which allows real-time observation of the state of the sample 201. Similarly to the first embodiment, the optical observation method as described is similar in operation to the conventional microscope with epi-illumination, and hence, in such a case where the sample 201 is transparent, an illuminating part for trans-illuminating the sample 201 can be arranged on a side opposite to the optical microscope across the sample 201.

A sample stage 214 for supporting the sample 201 can be moved freely by an actuator 216 controlled by a sample controller 215. Accordingly, a light source (such as a laser diode) having excellent monochromaticity can be used, to thereby adapt the present invention to a laser scanning microscope, a confocal microscope, or a fluorescence microscope.

Of the response light radiated from the sample 201, response light radiated to the opposite side of the objective 203 with respect to the sample 201 is subjected to detection by the near-field optical probe 204 so that near-field light making part thereof can be detected and converted into an electric signal. Further, the near-field optical microscope 200 illustrated in FIG. 18 further includes a scanner 218 for forming a scanning part which causes the microstructure 223 and a light receiving part 224 to move integrally so as to change the position of the near-field optical probe 204 with respect to the ultrahigh-wavenumber transmitting medium 205. Further, the near-field optical probe 204, the ultrahigh-wavenumber transmitting medium 205, and the above-mentioned scanner 218 together form an optical probe unit 217, which is illustrated by a dashed line in the drawing.

The operation of the optical probe unit 217 is described later in detail. Meanwhile, the optical probe unit 217 is an imaging device capable of detecting, without directly scanning the sample 201, optical information (such as a reflectance distribution, a transmittance distribution, a scattering intensity distribution, a diffraction efficiency distribution, a concentration distribution of fluorescent protein) on a surface of the sample 201 with sub-wavelength accuracy, the sub-wavelength having a spatial distribution more minute than the wavelength of the irradiation light. The scanner 218 scans a surface of the ultrahigh-wavenumber transmitting medium 205 under the control of a probe controller 219. In this manner, a two-dimensional image signal can be obtained from the light receiving part 224. The image signal from the light receiving part 224 is amplified by a preamplifier 220, and then transmitted to a control/display computer 221.

Referring to FIGS. 19A and 19B, operations of the objective 203 and the optical probe unit 217 are described. It should be noted that the constituent elements similar to those of FIG. 18 are denoted by the same reference symbols, and the description thereof is omitted. As illustrated in FIG. 19A, irradiation light passes through a slide glass 222 to be irradiated onto the sample 201. The ultrahigh-wavenumber transmitting medium 205 has a probe surface 205a and a sample surface 205b, the surfaces each being a rigid plane which is large in area. The probe surface 205a and the sample surface 205b are each arranged so as to oppose to the near-field optical probe 204 and to the sample 201, respectively. The ultrahigh-wavenumber transmitting medium 205 is capable of transmitting optical information on the sample surface 205b, that is, optical information in proximity to the surface 201a of the sample 201, to the probe surface 205a with high accuracy. Here, the term "with high accuracy" means "with resolution that exceeds optical resolution determined by the diffraction unit". The optical information transmitted to the probe surface 205a includes information on the optical properties and the microstructure of the surface 201a of the sample 201, and the information is to be detected by the near-field optical probe 204. The near-field optical probe 204 has the light receiving part 224 and the microstructure 223. The microstructure 223 is disposed on the incident side of the light receiving part 224, and has an aperture 223a, which is provided to the light shielding member 223b, for selectively transmitting near-field light. Further, the light receiving part 224 detects near-field light that has been caused to transmit through the microstructure 223.

FIG. 19B is an enlarged view illustrating a configuration on the periphery of the aperture 223a of FIG. 19A, in which the diameter $\phi$ of the aperture 223a, and a distance $\delta$ from the aperture 223a to the probe surface 205a are smaller than the wavelength of the irradiation light. In a case where visible light is used as irradiation light, the diameter $\phi$ of the aperture 223a may preferably be set to about 20 nm to 200 nm. Further, the distance $\delta$ between the aperture 223a and the probe surface 205a may preferably be set equal to or smaller than 200 nm.

Only light in close proximity to the aperture 223a can leak in through the aperture 223a of the microstructure 223 to be detected by the light receiving part 224 having a light receiving surface 224a, and hence the near-field optical probe 204 is capable of observing the probe surface 205a, that is, the surface 201a of the sample 201 with very high resolution. It should be noted that the light receiving part 224 may be configured as a light receiving element formed of a known high-sensitive semiconductor light receiving element such as, for example, an avalanche photodiode, a PIN photodiode, or a Schottky photodiode.

Figure 25:
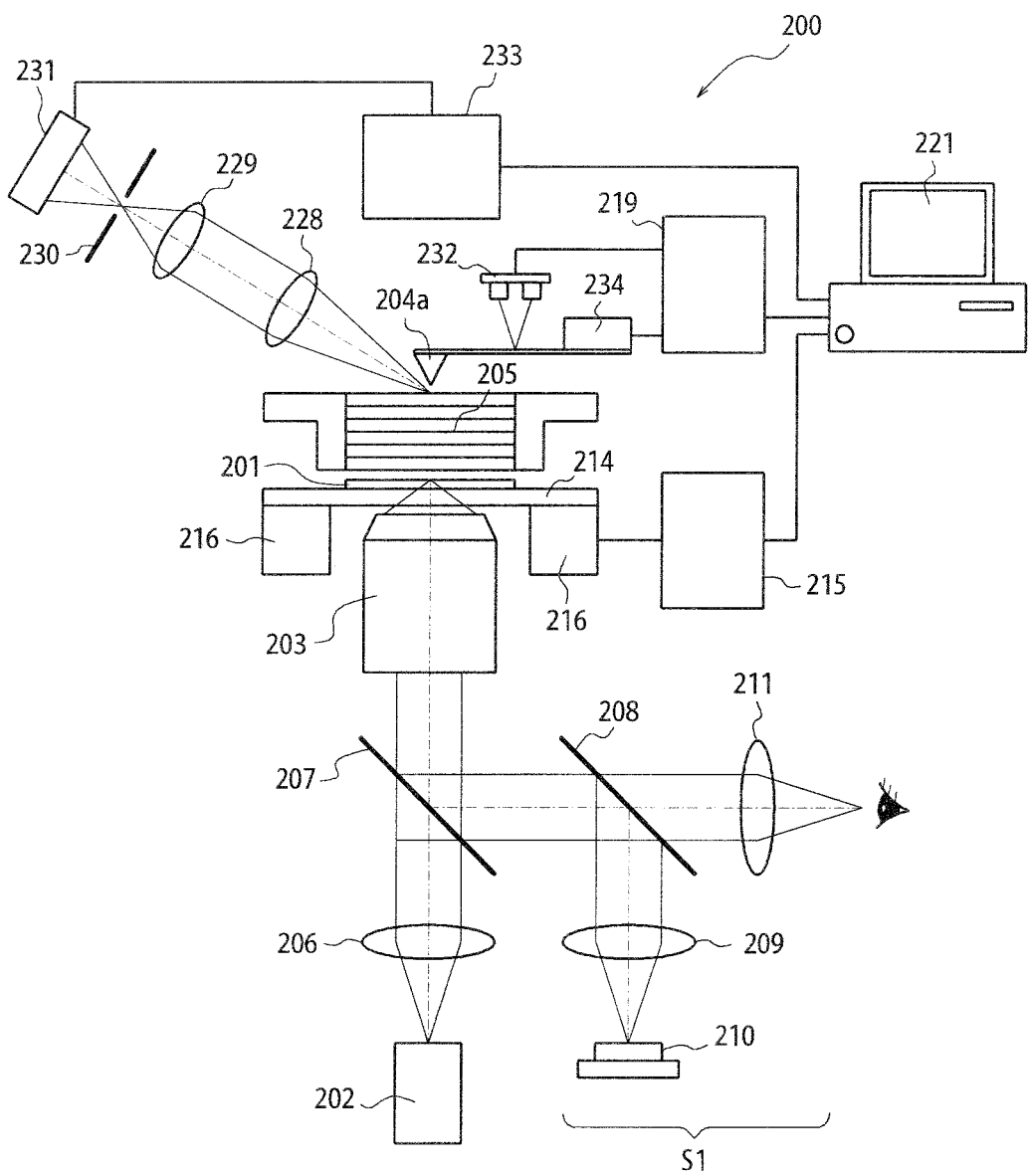
FIG. 25 is a schematic diagram illustrating another system configuration of the near-field optical microscope according to the second embodiment.
Figure 40:
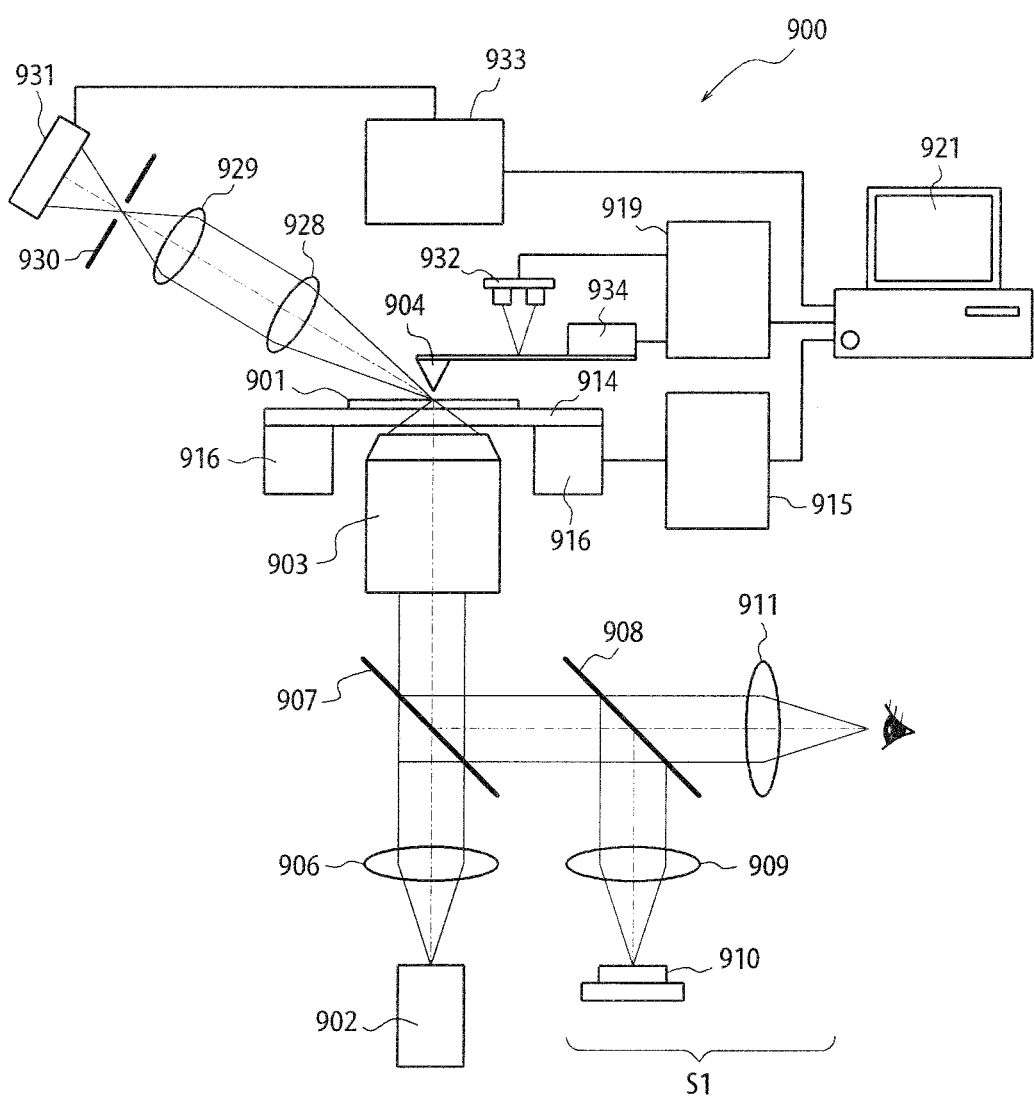
FIG. 40 is a schematic diagram illustrating a system configuration of a conventional near-field optical microscope.

Here, the light receiving part 224 may not necessarily be formed integrally with the aperture 223a. As illustrated in FIG. 25, the light receiving part 224 may be arranged at a position capable of detecting light from the aperture 223a, or may be disposed on an extension guided by, for example, an optical system or a waveguide. Further, as illustrated in FIG. 25, the near-field optical probe may not need to be an aperture-type, and there may be employed a scattering-type probe 204a for scattering light with the assistance of a acute tip end or microparticles with high scattering efficiency. It should be noted that, in FIG. 25, constituent elements similar to those of FIG. 40 described above are denoted by reference numerals, each being obtained by subtracting 700 from the reference numerals of FIG. 40. Further, the aperture 223a and the ultrahigh-wavenumber transmitting medium 205 are arranged, at least in part, within the viewing field the optical microscope.

As described above, the ultrahigh-wavenumber transmitting medium 205, the near-field optical probe 204 having the microstructure 223 and the light receiving part 224, and a scanner 218 serving as a scanning part are integrally formed as the optical probe unit 217. The scanner 218 is formed by including a stationary part 225 and a movable part 226. The movable part 226 is configured to be capable of changing the position with respect to the stationary part 225, under the control of the probe controller 219. The ultrahigh-wavenumber transmitting medium 205 is fixed to the stationary part 225, and the near-field optical probe 204 is fixed to the movable part 226. Then, through the control of the scanner 218 by the controller 219, the near-field optical probe 204 can be changed in position with respect to the ultrahigh-wavenumber transmitting medium 205. As for the configuration of the optical probe unit 217, the ultrahigh-wavenumber transmitting medium 205, the near-field optical probe 204, and the scanner 218 may be accommodated in a single housing, or may be fixed to a common columnar support. In either case, it is necessary, in terms of mechanical operation, that the ultrahigh-wavenumber transmitting medium 205 and the stationary part 225 of the scanner 218 are fixed to each other via a housing or a columnar support, and that the near-field optical probe 204 and the movable part 226 of the scanner 218 are fixed to each other.

Next, a scanning method is specifically described. As described above, what is important for optical observation is to maintain the distance δ between the aperture 223a forming the microstructure 223 and the probe surface 205a equal to or smaller than the wavelength of the illumination light. If the distance changes during scanning, not only varies the resolution depending on the site to be observed, but also optical information formed on the probe surface 205a cannot be detected with accuracy. The scanner 218 is configured to allow the stationary part 225 and the movable part 226 to be changed in position only in a plane (xy plane) parallel to the probe surface 205a, and fixed in a direction of a normal (z-axis) of the plane. Further, the distance between the light shielding member 223b of the near-field optical probe 204 and the probe surface 205a of the ultrahigh-wavenumber transmitting medium 205 is set such that the near-field optical probe 204 can give the best performance (in terms of light receiving sensitivity or resolution). Further, the near-field optical probe 204 actually scans the probe surface 205a of the ultrahigh-wavenumber transmitting medium 205, which is an extremely flat surface, rather than the surface 201a of the sample 201. Therefore, irrespective of the shape of the surface 201a of the sample 201 or the observation environment, the scanning can be performed while maintaining high detection performance. According to the conventional near-field optical microscope, it has been necessary to perform positional control with ultrahigh precision in the z-axis direction in view of the surface irregularities of the sample 201. In contrast, in the configuration of FIG. 19, there is no need to perform such positional control, and the scanning can be mechanically performed in the xy plane.

Figure 20:
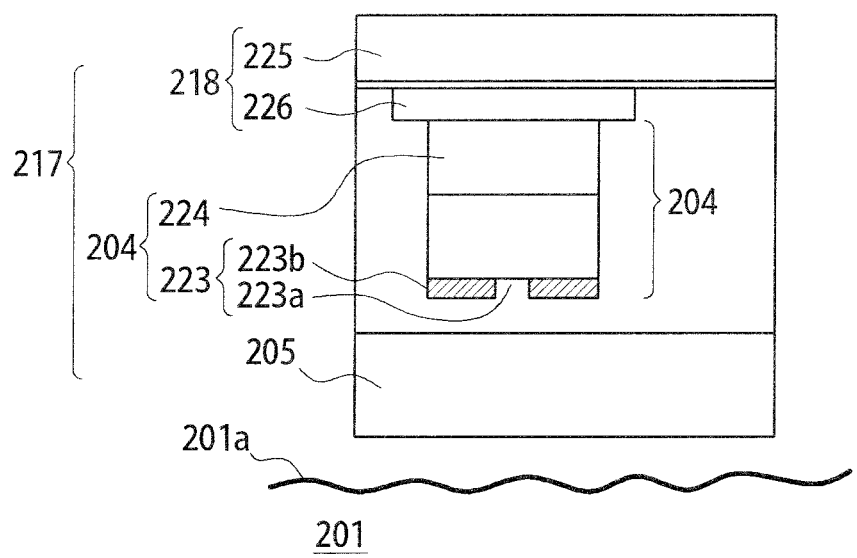
Figure 20:
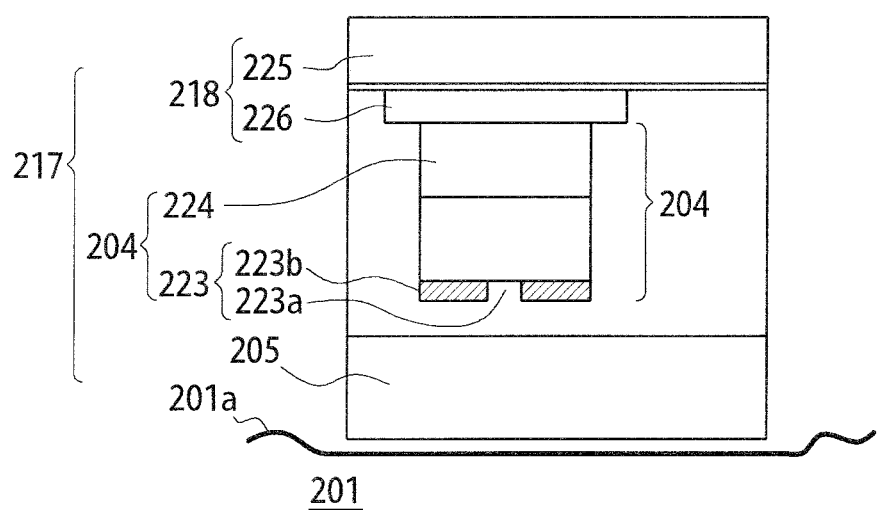

FIGS. 20A and 20B each are a schematic view illustrating an arrangement of the optical probe unit 217 and the sample 201. As illustrated in FIG. 20A, in the case of observing biological tissue such as a living cell alive, the surface 201a of the sample 201 is soft and unstable in shape, which makes it difficult to perform observation with the near-field optical probe 204. The optical probe unit 217 according to the present invention has a bottom face which is rigid and large in area, and hence the bottom face can be pressed against the surface 201a of the sample 201 without causing any damage thereto. Further, the bottom face is planar in shape, which can be pressed against the sample 201 so as to be in close contact therewith, to thereby deform the surface 201a of the sample 201 to be observed into a substantially planar shape. As for the optical function, the ultrahigh-wavenumber transmitting medium 205 is capable of transmitting a high-definition image from the sample surface 205b to the probe surface 205a, the surfaces both being planar surfaces, and hence optical information on the surface 201a of the sample 201 can be observed by scanning the probe surface 205a with the near-field optical probe 204. Further, the bottom face of the optical probe unit 217 can be brought into close contact with the sample 201 so as to reduce the thickness of an air layer that reduces near-field light, with the result that a loss of weak near-field light is further reduced, enabling observation with high resolution.

Figure 19:
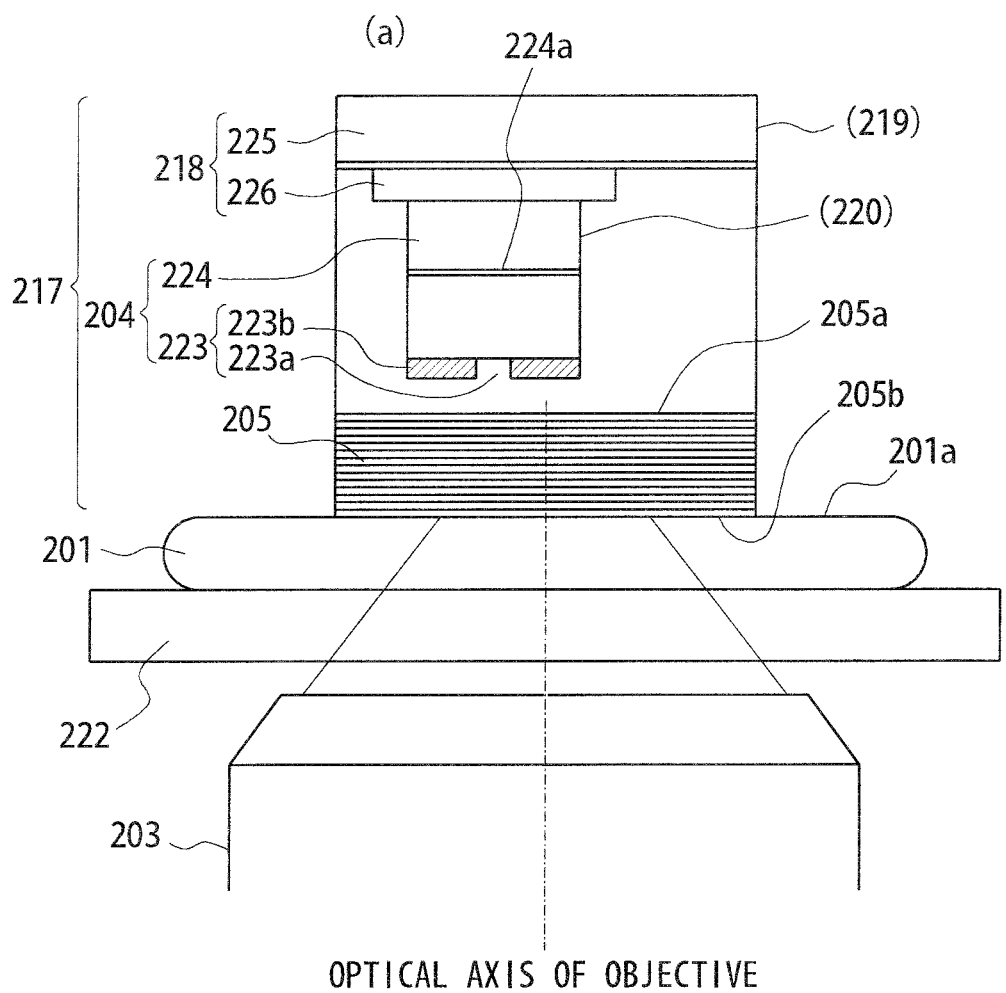
Figure 19:
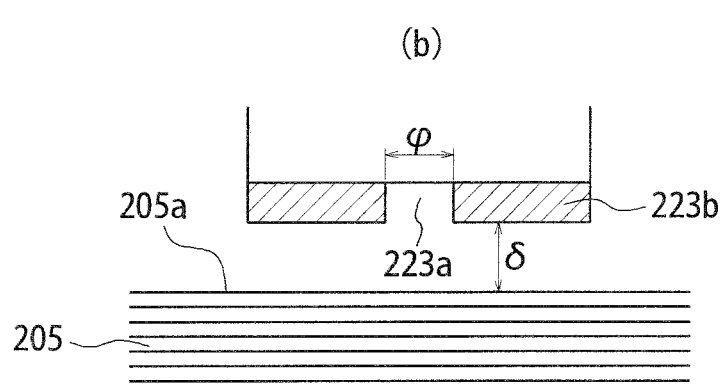
Figure 21:
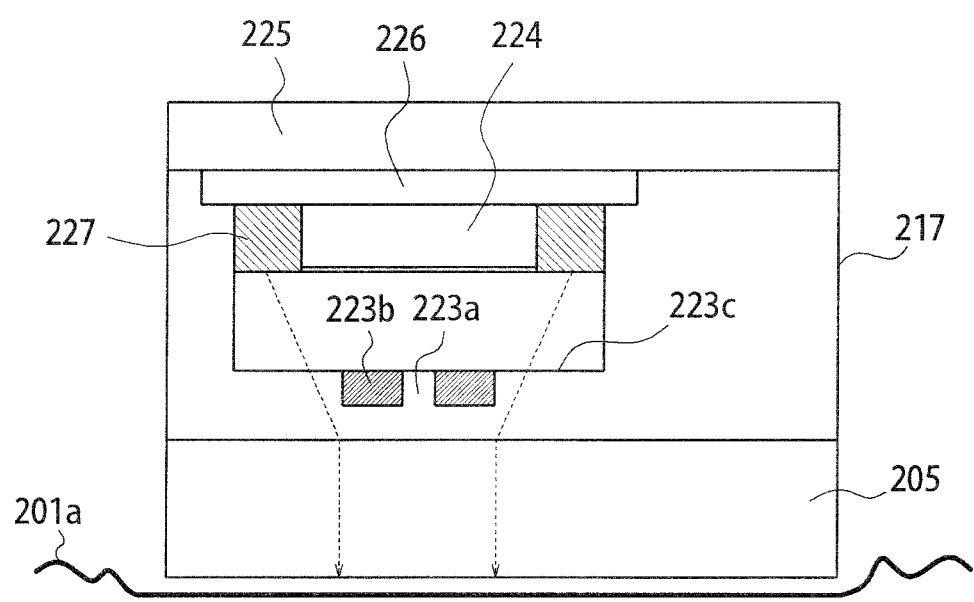
FIG. 21 is a schematic view illustrating a configuration of the near-field optical microscope according to the present invention, for performing illumination in an optical microscope.

FIG. 21 is a schematic view illustrating another configuration of the optical probe unit 217 illustrated in FIG. 19. Basically, the optical probe 204 in the configuration of FIG. 19 is provided with a light emitting element 227 in FIG. 21. Illustrated in FIG. 18 is a system configuration in which the near-field optical probe 204 and the optical microscope with epi-illumination are used in combination. However, in the case of observing a transparent sample such as biological tissue, trans-illumination is often performed. In the configuration illustrated in FIG. 21, disposed inside the optical probe unit 217 is the light emitting element 227 serving as an illuminating part for trans-illuminating the sample 201. Furthermore, the optical probe unit 217 having the light emitting element 227 disposed therein is positioned in close proximity to the observation region on the sample 201, and hence, as compared to the conventional light source for microscope illumination, the illumination efficiency can be significantly improved. It should be noted that, although not shown, a shielding part can be provided between the light receiving part 224 and the light emitting element 227 in order to shield illumination light. With this configuration, illumination light entering the light receiving part 224 is blocked, so that noise can be reduced, with the result that an image with improved S/N ratio can be obtained.

Further, the near-field optical probe 204 has, on a surface on a side facing the ultrahigh-wavenumber transmitting medium 205, a transmitting region 223c for transmitting illumination light from the illuminating part 227. In this manner, the bottom face of the near-field optical probe 204 is not covered by the light shielding member 223b, as being provided in part with the transmitting region 223c for transmitting illumination light, which enables efficient trans-illumination of the optical microscope. The transmission region 223c can be provided as described above, because the ultrahigh-wavenumber transmitting medium 205 in a finite thickness is disposed between the near-field optical probe 204 and the sample 201. It should be noted that the light emitting element 227, which is an illuminating part for the optical microscope, may also serve as an illuminating part for the near-field optical probe 204.

In FIG. 21, the light receiving part 224 and the illuminating part 227 are arranged on the same plane. With this configuration, when forming the light receiving part 224 on the substrate through a semiconductor process, the light emitting element 227 on the same plane can be formed simultaneously. The near-field optical probe 204 is a minute device, and hence integral formation of a plurality of elements leads to a significant reduction in manufacturing cost.

Figure 22:
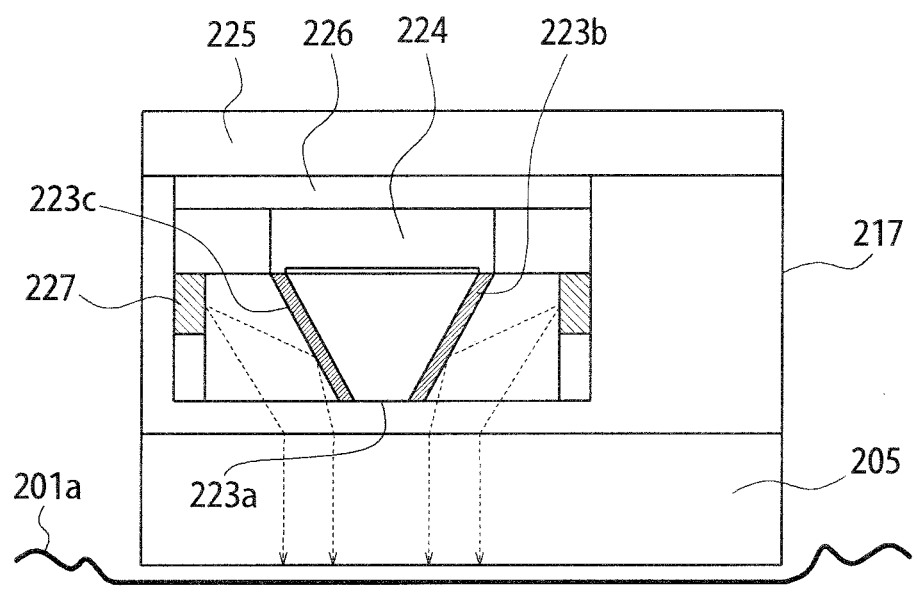
FIG. 22 is a schematic view illustrating another configuration of the near-field optical microscope according to the present invention, for performing illumination for an optical microscope.

FIG. 22 is a schematic view illustrating further another configuration of the optical probe unit 217 illustrated in FIG. 19. In FIG. 22, basically, the light emitting element 227 in the configuration of FIG. 21 is moved to a side surface of the near-field optical probe 204. The light shielding member 223b has an illumination reflecting surface 223c for reflecting illumination light from the light emitting element 227 toward the observation region on the sample 201. In this manner, the light shielding member 223b can be devised in shape, so as to allow the surface 223c thereof to be used as an illumination reflecting surface. The light shielding member 223b is generally formed of metal, which exhibits high reflectance with respect to visible light, and hence illumination can be performed with high efficiency even via the illumination reflecting surface 223c. In addition to the direct illumination from the light emitting element 227, reflected light from the illumination reflecting surface 223c is also used, which is expected to improve illumination efficiency, while allowing greater flexibility in design of the arrangement of the light emitting element 227. It should be noted that, as described with reference to FIG. 21, a shielding part for shielding illumination light may also be provided between the light receiving part 224 and the light emitting element 227.

Figure 23:
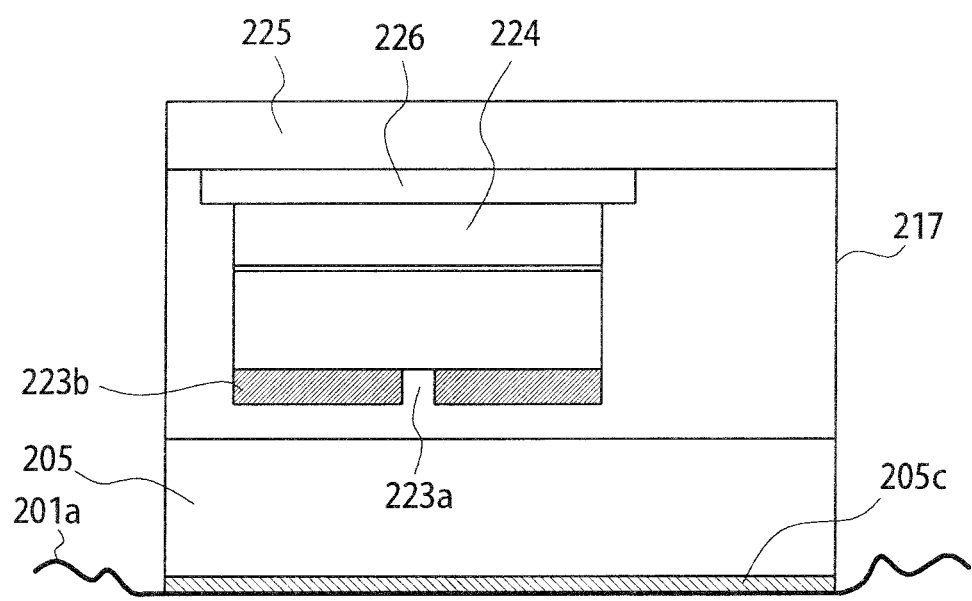
FIG. 23 is a schematic view illustrating an optical probe unit of the near-field optical microscope according to the second embodiment, the optical probe unit being improved in adhesion to a surface of a sample.

FIG. 23 is a schematic view illustrating further another configuration of the optical probe unit 217 illustrated in FIG. 19. In FIG. 23, the optical probe unit 217 includes the ultrahigh-wavenumber transmitting medium 205 which has a surface 205c subjected to treatment for enhancing adherence to the sample 201. This configuration enhances the adherence between the optical probe unit 217 and the sample 201, which enables observation with high precision. For example, in a case of observing a living cell, the sample surface 205b of the ultrahigh-wavenumber transmitting medium 205 may be coated with polylysine, to thereby improve adherence between a sample surface 205c thus treated and the living cell.

The near-field optical probe 204, the ultrahigh-wavenumber transmitting medium 205, and the objective 203 bear a relation in performance similar to that shown in the graph of FIG. 12. Each variable associated with the light emission intensity of the near-field light source in FIG. 12 corresponds to the light receiving sensitivity of the near-field optical probe 204. The near-field optical probe 204 is generally designed for irradiation light of a predetermined frequency, and the amount of light capable of passing through the aperture 223a reduces as the frequency of the irradiation light becomes lower than the predetermined frequency. On the other hand, as the frequency becomes higher, the amount of light passing through the aperture 223a increases in itself. Despite that, the transmittance of the optical material inside the probe 204 may be reduced, or the light receiving sensitivity of the light receiving part 224 may be reduced, with the result that the light receiving sensitivity as the near-field optical probe 204 is reduced. However, as long as the band which attains light receiving sensitivity of the near-field optical probe 204 overlaps with at least part of the operating band in which the ultrahigh-wavenumber transmitting medium 205 exhibits high resolution, signal light generated at the surface 201a of the sample can be received with high sensitivity, to thereby attain high resolution as a near-field optical microscope. Further, similarly to the first embodiment, as long as the band in which the optical system of the objective 203 exhibits high transmittance overlaps with at least part of the operating band in which the ultrahigh-wavenumber transmitting medium 205 exhibits high resolution, signal light generated by the surface 201a of the sample can be detected with high efficiency, to thereby attain high resolution as a near-field optical microscope.

As described above, in order to allow the near-field optical microscope to operate as an optical device that exhibits high resolution, the transmission band (in which the near-fie)d optical probe 204 exhibits high light receiving sensitivity) of the near-field optical probe 204 needs to overlap with at least part of the operating band in which the ultrahigh-wavenumber transmitting medium 205 exhibits high resolution (normalized resolution). A band to be used as the transmission band may be, for example, a band that renders transmittance equal to or larger than −3 db with respect to a peak intensity.

Further, as illustrated in FIG. 18, the objective 203, which is provided for the optical microscopic observation, also serves as part of the light irradiating part for use in the sample observation to be made by the optical probe unit 217. Similarly to the first embodiment, the objective 203 is shared by the optical microscope and the optical probe unit 217, so that the entire system can be reduced in size. As necessary, another light source may additionally be provided inside the optical system of the optical microscope for the purpose of meeting the need to provide irradiation light exclusively to the optical probe unit 217, to thereby attain a configuration in which the sample 201 can be irradiated with light via the objective 203.

Figure 24:
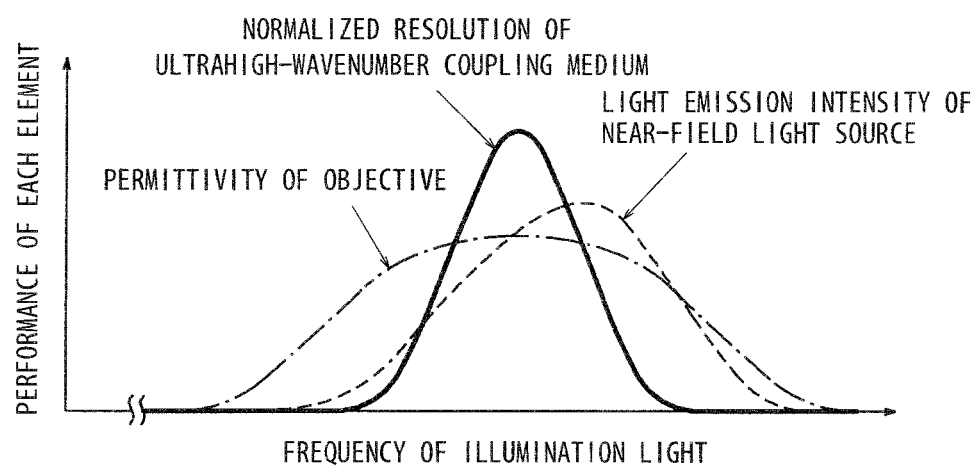
FIG. 24 is a graph showing performance of a near-field optical probe, an ultrahigh-wavenumber transmitting medium, and an objective, with respect to the frequency of illumination light.

As illustrated in FIG. 24, the objective 203 is generally designed to transmit all the wavelengths of visible light. However, if the frequency becomes too high, the light is hindered to pass through optical materials such as glass forming the objective 203. On the contrary, if the frequency becomes too low, the refractive index of the optical material deviates from a designed value, which may lead to a reduction in an amount of effective transmission, or performance degradation as an objective due to an increase in aberration.

Therefore, in order to allow the near-field optical microscope to operate as an optical device that exhibits high resolution, the transmission band of the optical system of the illuminating part may preferably overlaps with at least part of the operating band in which the ultrahigh-wavenumber transmitting medium 205 exhibits high resolution. In particular, the objective 203 forming the optical system of the illuminating part with respect to the optical probe unit 217 includes a large number of lenses, and hence multilayer coating is applied thereto in order to increase transmission within an intended wavelength range, with the result that the transmission band thereof is limited. Even if the near-field optical microscope is supposedly used in a band in which the transmittance of the objective 203 is low, its normal operation still can be secured by using a high-output light source. However, in this case, there arise problems such as an increase in size of the light source, heat generation due to irradiation light, and an increase of noise light.

As an example of sharing the objective 203, a case where the sample 201 is subjected to fluorescence observation is described. As illustrated in FIG. 19, excitation light is irradiated through the objective 203 to be absorbed by the sample 201 (fluorochrome), so that the sample 201 generates fluorescence as response light, which is detected by the optical probe unit 217. At this time, the excitation light that has passed through the sample 201 generally becomes noise light and hinders the fluorescence observation. Further, in general, the excitation light has a strong intensity that is $10^4$ to $10^6$ times larger than fluorescence, and hence the trans-illumination as illustrated in FIG. 19 is rarely employed for fluorescence observation. However, as illustrated in FIG. 24, the ultrahigh-wavenumber transmitting medium exhibits a strong frequency selectivity, so as to function as a strong filter capable of reflecting and absorbing excitation light while transmitting fluorescence, which makes it possible to efficiently perform fluorescence observation by trans-illumination.

(Third Embodiment)

Figure 26:
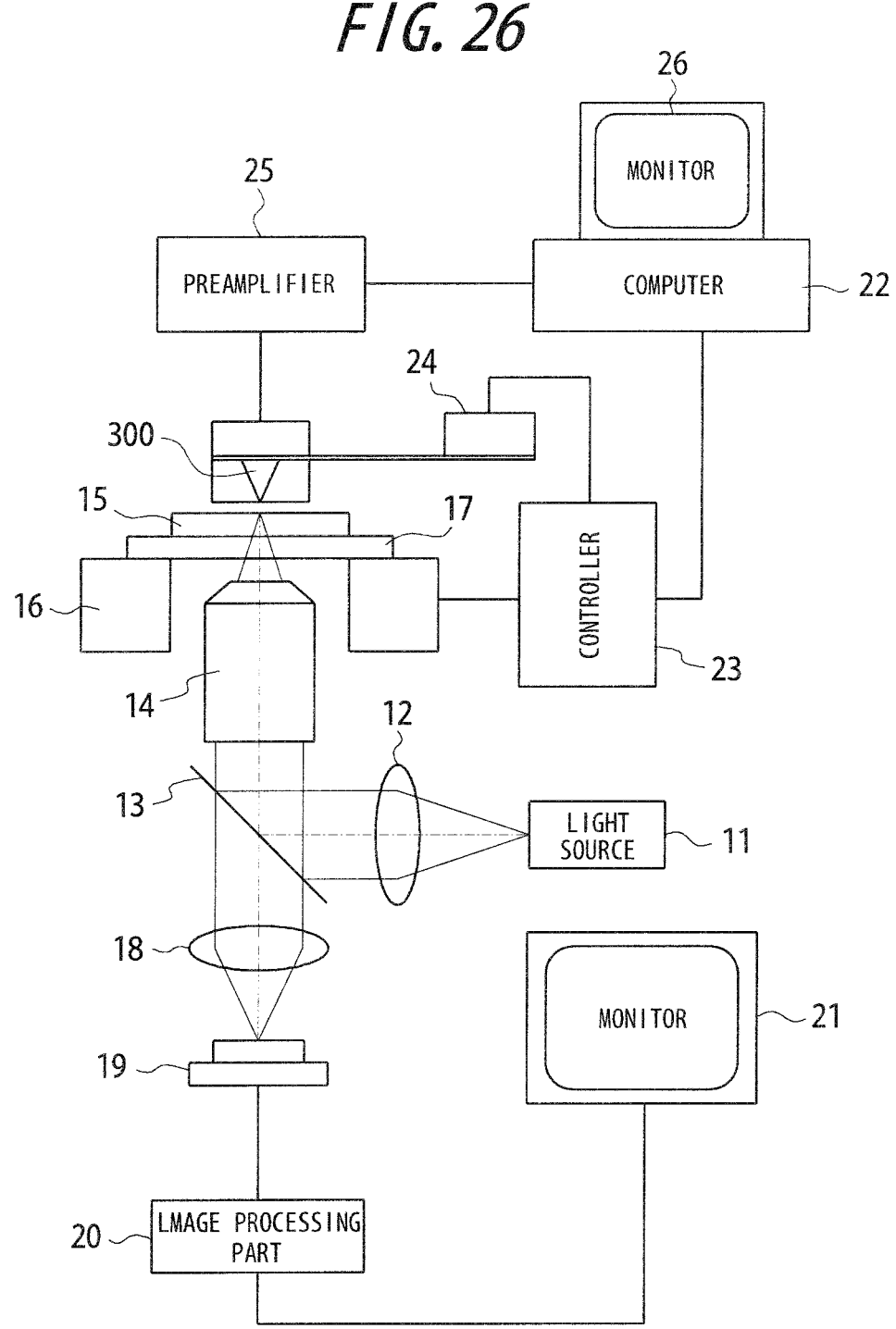
FIG. 26 is a schematic diagram illustrating a system configuration of a scanning near-field optical microscope which employs a near-field optical probe according to a third embodiment.

FIG. 26 is a schematic diagram illustrating a system configuration of a scanning near-field optical microscope which uses a near-field optical probe according to a third embodiment. The scanning near-field optical microscope includes an optical microscope and a near-field optical microscope. Illumination light emitted from a light source 11 passes through a collimating lens 12 to be converted into substantially parallel light (planar wave), which is then reflected by abeam splitter 13 to be focused by an objective 14 onto a sample 15 such as a living cell. As a result, response light is radiated from a predetermined position on the sample 15. The sample 15 is placed on a sample stage 17 which is driven one-dimensionally or two dimensionally by a sample stage actuator 16.

The response light radiated from the sample 15 includes reflected light, scattered light, diffracted light, or light emitted by the fluorochrome in the sample 15 upon excitation by the illumination light, and hence the response light bears optical information such as a reflectance, a light scattering coefficient, and a diffraction efficiency distribution in the sample 15, or biochemical information such as the spatial distribution of the fluorochrome in the sample 15. Part of the response light is caused to enter again the objective 14, and then passes through the beam splitter 13 to be focused by an imaging lens 18 onto an imaging element 19. An output of the imaging element 19 is subjected to image processing in an image processing part 20, and supplied to an optical microscope observation monitor 21. As a result, an image of the sample 15 obtained by the optical microscope is displayed on the optical microscope observation monitor 21, which allows real-time observation of the state of the sample 15.

Further, of the response light radiated from the sample 15, response light radiated to the opposite side of the objective 14 with respect to the sample 15 is subjected to detection by a near-field optical probe 300 so that near-field light forming part thereof can be detected. A configuration of the near-field optical probe 300 is described later in detail.

The near-field optical probe 300 is configured to be capable of observing a desired position on the sample by using a probe actuator controlled by a computer 22 and a controller 23. Then, while maintaining a distance between the near-field optical probe 300 and a surface of the sample 15 constant in a direction along an optical axis, the sample 15 is two-dimensionally scanned in a plane orthogonal to the optical axis, with near-field light being subjected to photoelectric conversion. It should be noted that, in order to two-dimensionally scan the sample 15 by the near-field optical probe 300, the near-field optical probe 300 may be two-dimensionally driven by the probe actuator 24. Alternatively, the near-field optical probe 300 may be driven (horizontally scanned) by the probe actuator 24 under the control of the computer 22 and the controller 23, while driving (vertically scanning) the sample stage 17 in a one-dimensional direction by the sample stage actuator 16, in a direction orthogonal to the vertical scanning direction. Still alternatively, in order to perform positional control of the near-field optical probe 300 with higher precision, an interatomic force acting between the near-field optical probe 300 and the sample 15 may be detected so as to feed back the detected interatomic force to the probe actuator 24, to thereby perform positional control.

An output signal obtained by the photoelectric conversion in the near-field optical probe 300 is amplified by a preamplifier 25 such as a lock-in amplifier, and then the amplified signal is subjected to image processing by the computer 22 to be output to a near-field monitor 26. In this manner, light intensity distribution information of the near-field light on the surface of the sample 15 is displayed as a two-dimensional image, on the near-field monitor 26.

Here, the near-field optical probe 300 is capable of detecting, as the light intensity distribution information of the sample 15, information having a spatial frequency higher than the spatial frequency corresponding to the wavelength of irradiation light. Accordingly, as compared to an image to be obtained from the imaging element 19 in the optical microscope using the objective 14, an image of higher resolution, that is, fine optical information can be obtained.

In the following, the near-field optical probe 300 illustrated in FIG. 26 is described.

Figure 27:
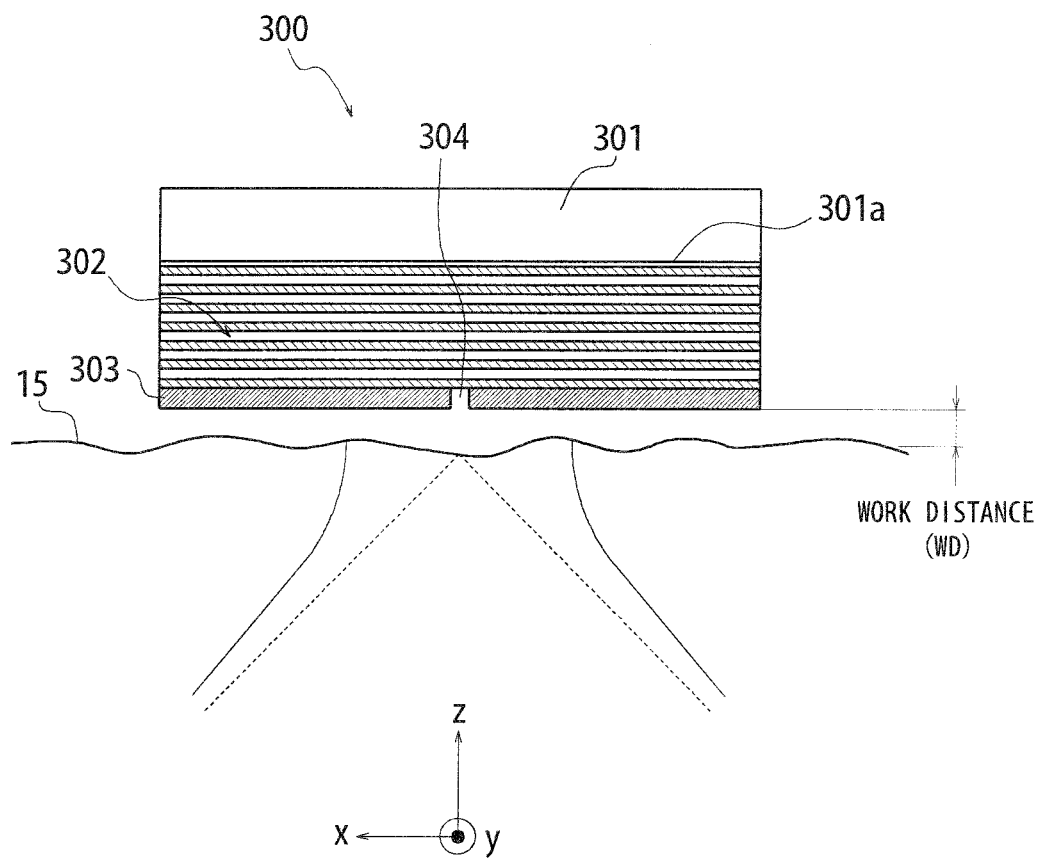
FIG. 27 is a schematic view illustrating a basic configuration of the near-field optical probe of FIG. 26.

FIG. 27 is a schematic view illustrating a basic configuration of the near-field optical probe 300. The near-field optical probe 300 includes a light receiving part 301 formed of a known high-sensitive semiconductor light receiving element such as, for example, an avalanche photodiode, a PIN photodiode, or a Schottky photodiode, an ultrahigh-wavenumber transmitting medium 302 arranged on a light receiving surface 301a of the light receiving part 301, and a light shielding member 303 disposed on a surface of the ultrahigh-wavenumber transmitting medium 302. The light shielding member 303 has a minute aperture 304 formed therein for receiving near-field light, the aperture having a diameter (for example, 50 nm) smaller than the wavelength of the irradiation light. The near-field optical probe 300 is arranged in such manner that the aperture 304 is opposed, across a work distance (WD), to a portion at which illumination light is focused onto the sample 15.

In FIG. 27, on the surface of the sample 15, illumination light is focused by an illuminating optical system including the objective 14 (see FIG. 26). Here, the illumination light 31 is focused on one point on the surface of the sample 15 in terms of geometric optics. In practice, however, the illumination light 31 has a finite beam waist due to the wave nature of light. It should be noted that, in FIG. 27, a geometric-optical outer rim of the illumination light 31 is illustrated by broken lines, while an outer rim of the illumination light with a beam waist is illustrated by solid lines.

Next, description is given of a relation among the light receiving surface 301a of the light receiving part 301, an optical axis of the ultrahigh-wavenumber transmitting medium 302, and the aperture 304, in the near-field optical probe 300.

As described later, in the ultrahigh-wavenumber transmitting medium 302, unlike in an isotropic medium, light is distributed within a relatively small angle centering mainly around an optical axis direction. In particular, light is distributed within an even smaller angle in a case where the elliptical shape of the equal-frequency curve (surface) is formed in a flat shape as illustrated by a thin solid line of FIG. 36A, or in a case where the shape of the hyperbolic curve is formed such that the absolute value of the gradient of the asymptotic line is set to a smaller value so that the asymptotic line becomes substantially parallel to the $k_z$-axis (an asymptotic curved surface becomes substantially parallel to the $k_x y_y$ plane), depending on the material design. In this case, the positional relation between the aperture 304 and the light receiving surface 301a needs to be carefully determined. Specifically, light that has entered the aperture 304 is distributed within a relatively small angle centering around the optical axis direction. In view of this, as illustrated in FIG. 28A, the light receiving part 301 and the aperture 304 may be arranged in such a manner that an optical axis O of the ultrahigh-wavenumber transmitting medium 302 coincides with a straight line connecting the aperture 304 and at least part of the light receiving surface 301a of the light receiving part 301, to thereby increase the detection sensitivity of the near-field optical probe 300.

Figure 28:
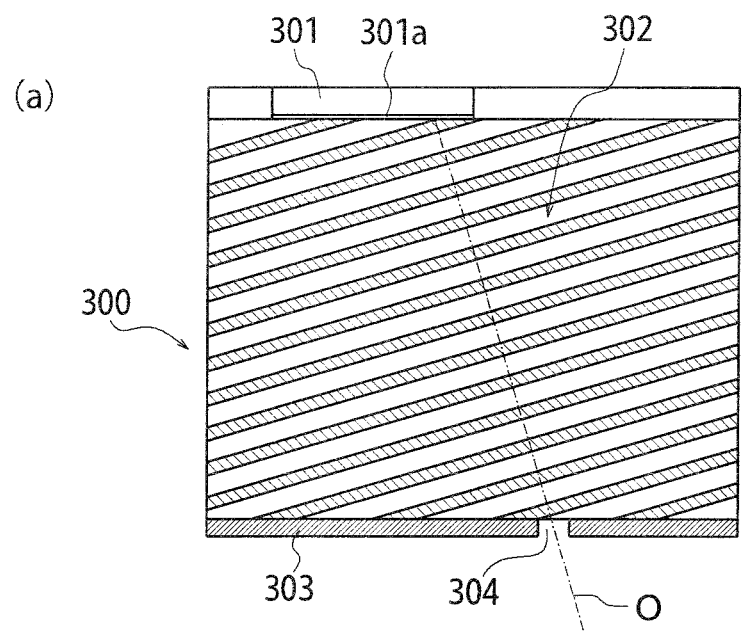
FIGS. 28A and 28B each are a view for illustrating a relation between a light receiving surface and an optical axis of an ultrahigh-wavenumber transmitting medium in the near-field optical probe of FIG. 26.
Figure 28:
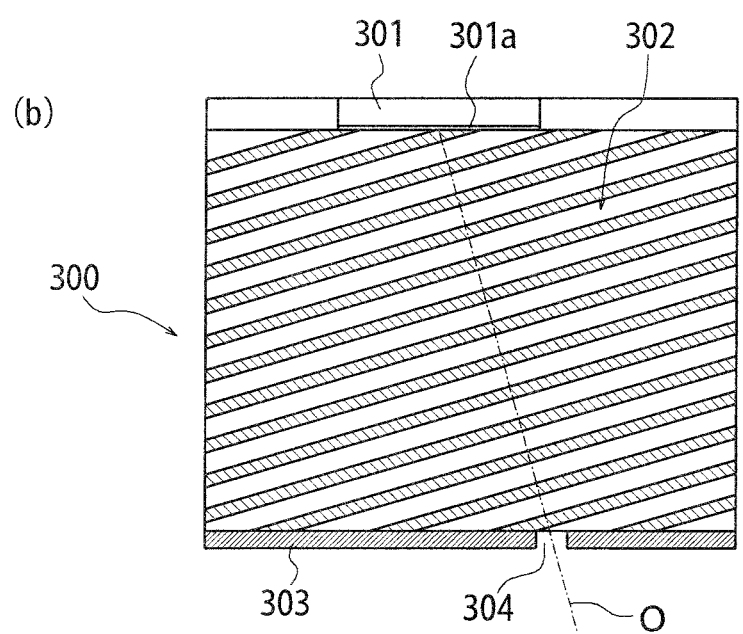

More preferably, as illustrated in FIG. 28B, it may be configured such that the light receiving surface 301a of the light receiving part 301 is arranged as being substantially centered on the optical axis O of the ultrahigh-wavenumber transmitting medium 302 passing through the aperture 304. With this configuration, the detection sensitivity of the near-field optical probe 300 can be improved. In other words, light that has leaked through the aperture 304 into the ultrahigh-wavenumber transmitting medium 302 travels in a direction close to the optical axis O of the ultrahigh-wavenumber transmitting medium 302, and hence, when the light receiving surface 301a is arranged as being substantially centered on the optical axis O passing through the aperture 304, more energy of the light that has leaked through the aperture 304 into the ultrahigh-wavenumber transmitting medium 302 can be transmitted to the light receiving part 301, to thereby increase the detection sensitivity of the near-field optical probe 300. It should be noted that, in the case where the light receiving sensitivity of the light receiving part 301 varies depending on the position on the light receiving surface 301a, it may be preferably configured that the point at which the light receiving sensitivity becomes highest is positioned on the optical axis O passing through the aperture 304.

Next, description is given of shapes of the near-field optical probe 300.

Figure 29:
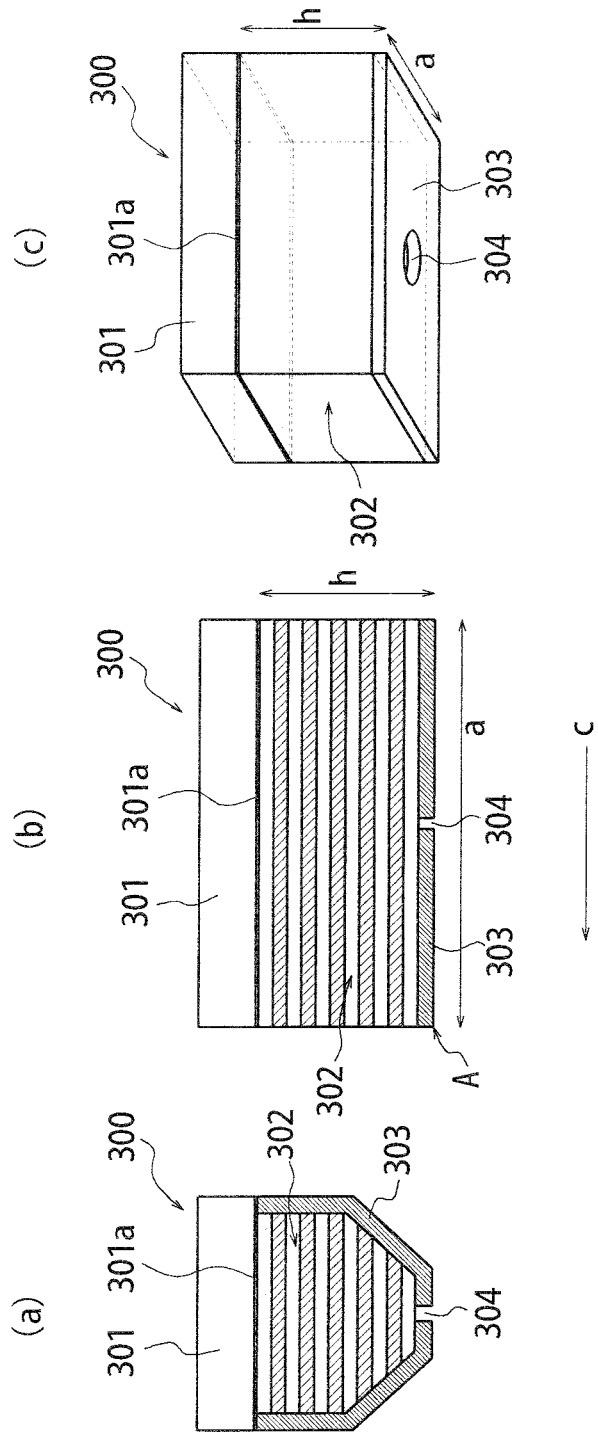
FIGS. 29A to 29C each are a view for illustrating shapes of the near-field optical probe of FIG. 26.

FIGS. 29A to 29C are views each schematically illustrating a shape of the near-field optical probe 300. The near-field optical probe 300 illustrated in FIG. 29A has a light receiving surface 301a of the light receiving part 301 in a circular shape or a polygonal shape, and the ultrahigh-wavenumber transmitting medium 302 formed on the light receiving surface 301a so as to conform to the shape of the light receiving part 301. The ultrahigh-wavenumber transmitting medium 302 has a tip end portion formed in a tapered shape, which is brought into closest proximity to the sample when observing the sample, and the tip end portion has the aperture 304 formed by the light shielding member 303. It should be noted that the light shielding member 303 is formed to cover the entire surfaces of the ultrahigh-wavenumber transmitting medium, except for an interface with respect to the light receiving surface 301a of the light receiving part 301 and the aperture 304.

The near-field optical probe 300 illustrated in FIGS. 29B and 29C has the light shielding member 303 in a planar shape, which is brought into closest proximity to the sample when observing the sample, and a minimum dimension a of the planar shape with the aperture 304 in the center is set to be larger than a distance h from the aperture 304 to the light receiving part 301. In other words, a tip end portion to be brought into closest proximity to the sample is not pointed. This shape produces an effect of preventing damage from being caused to the aperture 304 or to the near-field optical probe 300 when the tip end portion collides against the sample.

Specifically, the near-field optical probe 300 is moved, for example, in a direction indicated by an arrow C of FIG. 29b, so as to scan the surface of the sample. At this time, an edge portion A of the light shielding member 303 is most likely to collide against a convex portion of the sample. However, even if the edge portion A is damaged due to the collision, the edge portion A is away from the aperture 304, and hence the aperture 304 may not be damaged at a normal scanning rate. Further, the mechanical strength of the entire near-field optical probe 300 is not determined only by the minimum dimension a of the planar surface of the light shielding member 303, and may vary depending on the distance h from the aperture 304 to the light receiving part 301, as long as the rigidity of the light shielding member 303 or of the ultrahigh-wavenumber transmitting medium 302 remains unchanged. For example, even if the minimum dimension a is very large, when the distance h is even larger, the entire shape is formed long and thin, which reduces mechanical resistance to the collision against the sample.

Therefore, the minimum dimension a of the planar surface of the light shielding member 303 facing the sample may preferably be larger than at least the distance h from the aperture 304 to the light receiving part 301 in order to increase the mechanical strength. For example, in the case where the planar surface of the light shielding member 303 is square in shape, the minimum dimension a corresponds to the length of a side of the square. When the planar surface is circular in shape, the minimum dimension a corresponds to the diameter of the circle. Further, in the case where the planar surface of the light shielding member 303 is in a rectangular shape as illustrated in FIG. 29C, the minimum dimension a thereof corresponds to the length of the short side. In other words, in order to increase the mechanical strength, depending on the shape of the planar surface of the light shielding member 303, the planar surface facing the sample, it is preferred to select one of the various lengths included in the shape thereof, as the minimum dimension a with the aperture 304 in the center, in such a manner that the minimum dimension a becomes larger than the distance h.

Further, when the mechanical strength is increased as described above, in the use of the near-field optical probe 300, there is no need to perform high-precision control on the position of the near-field optical probe 300 in the direction of height (direction of the distance h) in order to allow the near-field optical probe 300 to scan the surface of the sample without colliding against the sample, leading to an advantage that scanning control can be performed with ease. It should be noted that in a case where the light shielding member 303 facing the sample is made planar, edge portions may be chamfered so as to prevent damage more effectively.

Next, description is given of the arrangement of the ultrahigh-wavenumber transmitting medium 302 and the light shielding member 303 forming the near-field optical probe 300, with reference to FIGS. 30A to 30D.

Figure 30:
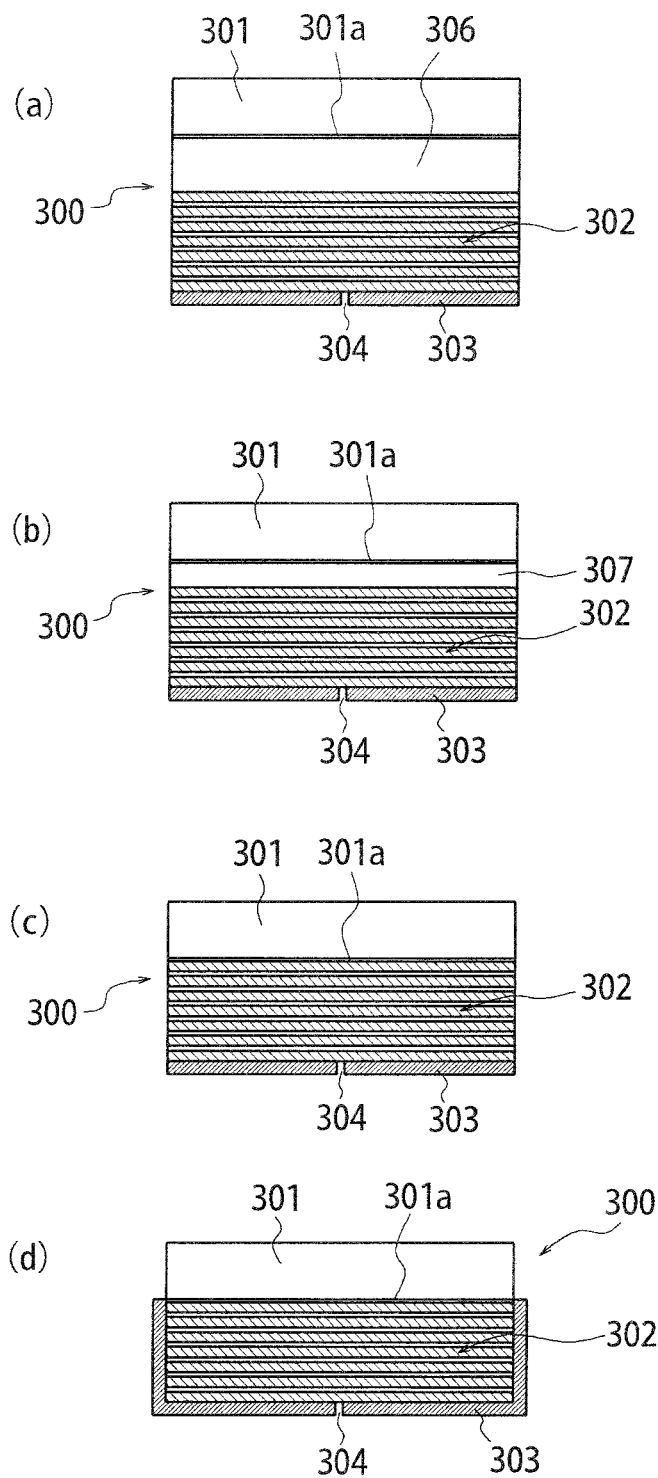
FIGS. 30A to 30D each are a view for illustrating an arrangement of an ultrahigh-wavenumber transmitting medium and a light shielding member forming the near-field optical probe of FIG. 26.

The near-field optical probe 300 illustrated in FIG. 30A has an intermediate layer 306 formed of a dielectric material, which is interposed between the light receiving part 301 and the ultrahigh-wavenumber transmitting medium 302. As illustrated in the drawing, the ultrahigh-wavenumber transmitting medium 302 is provided above the light receiving surface 301a of the light receiving part 301 across the intermediate layer 306, which leads to an advantage of allowing a greater degree of freedom when forming the ultrahigh-wavenumber transmitting medium 302. It should be noted that, in this case, the near-field light that has leaked in through the aperture 304, which may be slightly attenuated through the intermediate layer 306, can be effectively transmitted through the ultrahigh-wavenumber transmitting medium 302, to thereby allow efficient detection to be performed. It should be noted that the intermediate layer 306 described above can be interposed between the ultrahigh-wavenumber transmitting medium 302 and the light shielding member 303. In this case, there is an advantage of allowing a greater degree of freedom when forming the light shielding member 303. It is needless to say that the intermediate layer 306 may be interposed between the light receiving part 301 and the ultrahigh-wavenumber transmitting medium 302, and also between the ultrahigh-wavenumber transmitting medium 302 and the light shielding member 303.

The near-field optical probe 300 illustrated in FIG. 30B has the ultrahigh-wavenumber transmitting medium 302 bonded onto the light receiving surface 301a of the light receiving surface 301a through the adhesion layer 307. With this configuration, the space between the aperture 304 and the light receiving part 301, with the exception of the thin adhesion layer 307, can be filled with the ultrahigh-wavenumber transmitting medium 302. With this configuration, the detection sensitivity for near-field light can be improved.

The near-field optical probe 300 illustrated in FIG. 30C has the ultrahigh-wavenumber transmitting medium 302 directly formed on the light receiving surface 301a of the light receiving part 301. In other words, a wide variety of photodiodes can be employed to form the light receiving part 301 as described above. In this case, the light receiving part is generally formed on a substrate in the semiconductor process, and hence the substrate having the light receiving part formed thereon is subjected to sputtering or vapor deposition, to thereby form the ultrahigh-wavenumber transmitting medium 302 formed of a metal-dielectric multilayer film.

As described above, the ultrahigh-wavenumber transmitting medium 302 is directly formed on the light receiving surface 301a of the light receiving part 301, and hence there is no gap, no adhesive layer, or no intermediate layer interposed between the light receiving part 301 and the ultrahigh-wavenumber transmitting medium 302. Accordingly, the detection sensitivity for near-field light can be significantly increased. Further, the light receiving part 301 having the ultrahigh-wavenumber transmitting medium 302 formed thereon can be subjected to sputtering or vapor deposition so as to form the light shielding member 303, and the aperture 304 can be formed thereafter by using a focused ion beam. In this manner, the space between the aperture 304 and the light receiving part 301 is completely filled with the ultrahigh-wavenumber transmitting medium 302, making it possible to further improve the detection sensitivity for near-field light.

The near-field optical probe 300 illustrated in FIG. 30D is similar in configuration to that of FIG. 30C, except in that the light shielding member 303 further covers the entire circumference along the side surfaces of the ultrahigh-wavenumber transmitting medium 302. In other words, there is no gap formed between the light receiving part 301 and the ultrahigh-wavenumber transmitting medium 302, and between the ultrahigh-wavenumber transmitting medium 302 and the light shielding member 303. Further the ultrahigh-wavenumber transmitting medium 302 is completely covered, except for the aperture 304 and the light receiving surface 301a, with the light shielding member 303, so as to make a sealed structure. With this configuration, in addition to preventing undesired attenuation of near-field light that has leaked in through the aperture 304, near-field light that needs to be received is prevented from leaking out through a side surface or the like of the ultrahigh-wavenumber transmitting medium 302, while preventing the entrance of noise light from outside. Accordingly, the detection efficiency for near-field light can be further improved.

As described above, in the near-field optical probe 300 according to the third embodiment of the present invention, the ultrahigh-wavenumber transmitting medium 302 and the light shielding member 303 having the aperture 304 smaller in dimension than the wavelength of the irradiation light are arranged above the light receiving surface 301a of the light receiving part 301, so that the light receiving part 301 receives near-field light that has leaked in through the aperture 304 and passed through the ultrahigh-wavenumber transmitting medium 302. Accordingly, near-field light can be detected with high sensitivity. In this manner, in the scanning near-field optical microscope, there may be obtained, as light intensity distribution information of the sample, detailed optical information having a higher spatial frequency than the spatial frequency corresponding to the wavelength of the irradiation light.

(Fourth Embodiment)

Next, description is given of a near-field optical probe according to the fourth embodiment of the present invention. The resolution of the near-field optical probe is substantially determined according to the size of the aperture for allowing near-field light to leak therein. Accordingly, a significantly high resolution can be attained if a very small aperture can be formed and near-field light can be observed in a state where the aperture is in close contact with a surface of a sample.

However, in practice, the aperture needs to have a predetermined dimension in order to transmit a predetermined optical energy through the aperture. Further, for the purpose of scanning a sample, for example, the aperture needs to be spaced apart at a certain distance from the surface of the sample. Further, the light shielding member forming the aperture needs to have a thickness large enough to hinder the transmission of irradiation light. As a result, there is a trade-off relation in that, due to the thickness of the light shielding member, near-field light that should be detected by the near-field optical probe is attenuated even when passing through the aperture.

The diameter of the aperture and the distance between the light shielding member and the sample both may be reduced to about 10 nm at minimum for the current technology level. On the other hand, the thickness of the light shielding member greatly depends on a material forming the light shielding member and the wavelength of the irradiation light. For visible light, the thickness of the light shielding member may basically be 50 nm or larger, and preferably be 100 nm or larger, in the case of metal. Near-field light is exponentially attenuated as the distance from the light source (scattering body in the case of scattering light) to substantially disappear at a distance equal to the wavelength of propagating light having the same frequency. Therefore, in the case where the thickness of the light shielding member is 100 nm, the energy of near-field light in a visible light band is reduced to one severalth to one several tenths thereof when passing through the aperture.

In view of the above, it is important not only to eliminate the intermediate layer and the adhesive layer, but also to prevent near-field light from being attenuated at the aperture 304 in the above-mentioned near-field optical probe 300 according to the third embodiment, in order to improve detection efficiency for near-field light. In the near-field optical probe according to the fourth embodiment of the present invention, the aperture 304 in the near-field optical probe 300 according to the third embodiment is filled with the ultrahigh-wavenumber transmitting medium.

Figure 31:
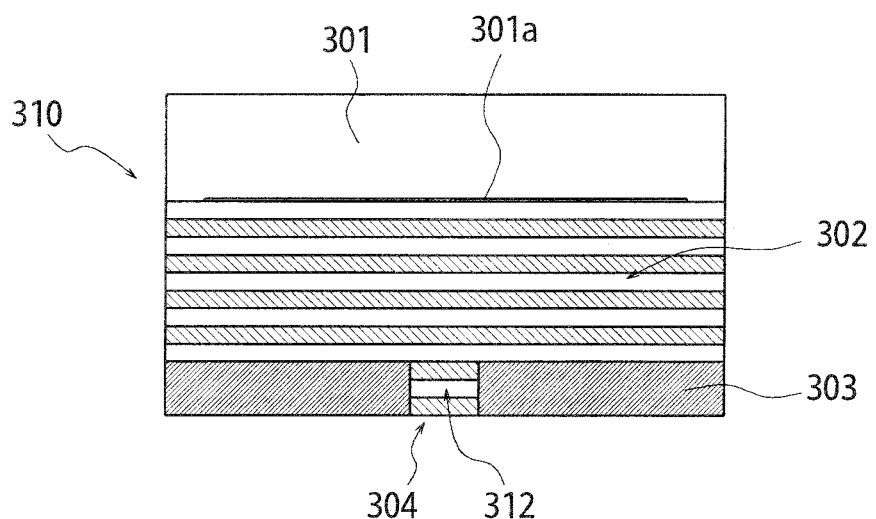
FIGS. 31A and 31B are schematic views illustrating two exemplary configurations of a near-field optical probe according to a fourth embodiment.
Figure 31:
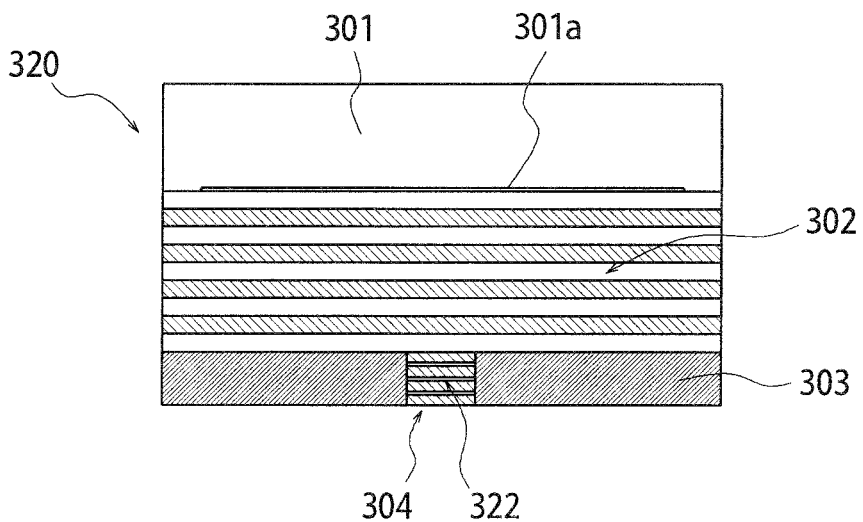

FIGS. 31A and 31B are schematic views illustrating two exemplary configurations of the near-field optical probe according to the fourth embodiment. The near-field optical probe 310 illustrated in FIG. 31A is similar in configuration to the near-field optical probe according to the third embodiment, except in that the aperture 304 is filled with an ultrahigh-wavenumber transmitting medium 312, which is the same in configuration to the ultrahigh-wavenumber transmitting medium 302. With this configuration, near-field light that has reached the aperture 304 from the surface of the sample can be transmitted to the light receiving surface 301a of the light receiving part 301 without being reduced in theory, to thereby attain a very-high-efficiency near-field optical probe.

The near-field optical probe 320 illustrated in FIG. 31B is similar in configuration to the near-field optical probe 310 of FIG. 31A, except in that the aperture 304 is filled with an ultrahigh-wavenumber transmitting medium 322, which is different in configuration to the ultrahigh-wavenumber transmitting medium 302. In other words, in the configuration of the near-field optical probe according to the third embodiment, the space between the light receiving part 301 and the aperture 304 is different in size from the space inside the aperture 304, and is also different from each other in terms of distance over which near-field light is transmitted. In view of this, in the near-field optical probe 320 according to this embodiment, the ultrahigh-wavenumber transmitting medium 322 filling inside the aperture 304 is configured to allow near-field light to efficiently pass through a small region, namely, the aperture 304, while the ultrahigh-wavenumber transmitting medium 302 filling the space between the light receiving part 301 and the aperture 304 is configured, as described above, to allow near-field light to be transmitted through a larger space along a longer distance. In this manner, each space is filled with the ultrahigh-wavenumber transmitting medium 302 and 322 of different type, and the media are efficiently connected to each other through an interface therebetween, to thereby increase light transmission efficiency as a whole, making it possible to realize a near-field optical probe which is higher in light receiving sensitivity.

(Fifth Embodiment)

Next, description is given of a near-field optical probe according to a fifth embodiment of the present invention. The near-field optical probe exemplified in the third and fourth embodiments described above employs an ultrahigh-wavenumber transmitting medium formed by using an anisotropic medium which renders hyperbolic dispersion or ellipsoidal dispersion. However, the near-field optical probe according to the present invention may also be configured by using a medium other than the above-mentioned ultrahigh-wavenumber transmitting medium. Such a medium includes, for example, an ultrahigh-wavenumber transmitting medium formed by a medium exhibiting a negative value for a real part of the permittivity or of the permeability, that is, an isotropic medium having a negative permittivity or a negative permeability.

The imaging effect to be obtained by a medium that exhibits negative permittivity (permeability) is generally called perfect lens (or superlens). The operating principle thereof is described in, for example, J. B. Pendry, Physical Review Letters Vol. 85, p. 3966-3969 (2000). When the permittivity and the permeability are both negative, the refractive index becomes also negative, which makes the medium to function as an ultrahigh-wavenumber transmitting medium. Alternatively, even when only one of the permittivity and the permeability is negative, the medium still functions as an ultrahigh-wavenumber transmitting medium with respect to a specific polarization state. In this specification, those media as described above are collectively referred to as negative medium.

In the negative medium, an evanescent wave is amplified in an energy transmission direction. In the near-field optical probe according to the present invention, when the negative medium is disposed in a space between the aperture and the light receiving part or in part of the space, there is produced an effect that an evanescent light is amplified in the negative medium, which allows near-field light in the vicinity of the aperture to be transmitted to the light receiving part with high efficiency. In the case of using a negative medium to perform imaging, it is necessary, as disclosed in J. B. Pendry, Physical Review Letters Vol. 85, p. 3966-3969 (2000), to ensure consistency in impedance and consistency in phase between components which are different in wavenumber. However, in the case of the near-field optical probe, there is no need to form a point image, and hence it is only necessary to efficiently transmit or amplify a component which is high in wavenumber.

FIGS. 32A to 32E are schematic views illustrating five exemplary configurations of the near-field optical probe according to the fifth embodiment. A near-field optical probe 330 illustrated in FIG. 32A is similar in configuration to the near-field optical probe according to the third embodiment, except in that an ultrahigh-wavenumber transmitting medium 331 formed of a negative medium is provided between the light receiving part 301 and the aperture 304, and to the aperture 304, respectively. The near-field optical probe 330 illustrated in FIG. 32B is similar in configuration to FIG. 32A, except in that the ultrahigh-wavenumber transmitting medium 302 formed by an anisotropic medium is employed as the ultrahigh-wavenumber transmitting medium provided between the light receiving part 301 and the aperture 304, as in the case of the third embodiment. In the near-field optical probe 330 illustrated in FIG. 32C, in contrast to FIG. 32B, the ultrahigh-wavenumber transmitting medium 331 formed of a negative medium is employed as the ultrahigh-wavenumber transmitting medium between the light receiving part 301 and the aperture 304, while the ultrahigh-wavenumber transmitting medium 302 formed of an anisotropic medium is employed as the ultrahigh-wavenumber transmitting medium filling the aperture 304.

Further, the near-field optical probe 330 illustrated in FIG. 32D is similar in configuration to FIG. 32C, except in that an air layer 332 is interposed between the light receiving part 301 and the ultrahigh-wavenumber transmitting medium 331 formed of a negative medium. In the case of employing the configuration of FIG. 32D, as is also described in J. B. Pendry, Physical Review Letters Vol. 85, p. 3966-3969 (2000), there is an ideal transmission distance based on the thickness of the lens for performing imaging by using the ultrahigh-wavenumber transmitting medium 331 formed of a negative medium. Accordingly, in the case where the distance between the aperture 304 and the light receiving surface 301a is equal to the ideal distance, light that has leaked in through the aperture 304 is converged onto the light receiving surface 301a as illustrated by the broken lines.

Further, the near-field optical probe 330 illustrated in FIG. 32E is similar in configuration to FIG. 32D, except in that the air layer 332 is interposed between the light receiving part 301 and the ultrahigh-wavenumber transmitting medium 331 formed of a negative medium, and between the ultrahigh-wavenumber transmitting medium 331 and the light shielding member 303, respectively. The ideal distance based on the thickness of the lens for performing imaging by using the ultrahigh-wavenumber transmitting medium 331 may be divided in two in this way. Even in this case, light that has leaked in through the aperture 304 is converged onto the light receiving surface 301a as illustrated by the broken lines.

The air layers 332 illustrated in FIGS. 32D and 32E each may be filled with a dielectric material. For example, in a case of using, as a negative medium, a medium having a refractive index of −n (here, n>0), the air layer 332 may preferably be filled with a dielectric material having a refractive index of n, so that light may be converged better on the light receiving surface 301a. Further, the closer the negative material and the dielectric material are in impedance value, the less amount of light is lost (or becomes stray light) due the reflection at the interference between the negative medium and the dielectric member.

However, the purpose of the near-field optical probe 330 is to transmit optical energy in the vicinity of the aperture 304 to the light receiving part 301. Accordingly, the near-field optical probe 330 does not necessarily need to satisfy the above-mentioned relation for imaging. However, if the above-mentioned relation for imaging is satisfied, optical energy can be efficiently focused on a small region on the light receiving surface 301a. In this manner, it can be expected to see improvements in performance such as improvements in light receiving efficiency and a reduction in size of the light receiving part 301. It should be noted that, in the configurations of FIGS. 32A to 32E, the ultrahigh-wavenumber transmitting medium filling the aperture 304 may be changed in filling rate so as to fill the aperture completely or partially depending on the observation condition or desired transmission properties. Further, in FIGS. 32A, 32C, 32D, and 32E, the ultrahigh-wavenumber transmitting medium in the aperture 304 may be omitted.

(Sixth Embodiment)

Figure 33:
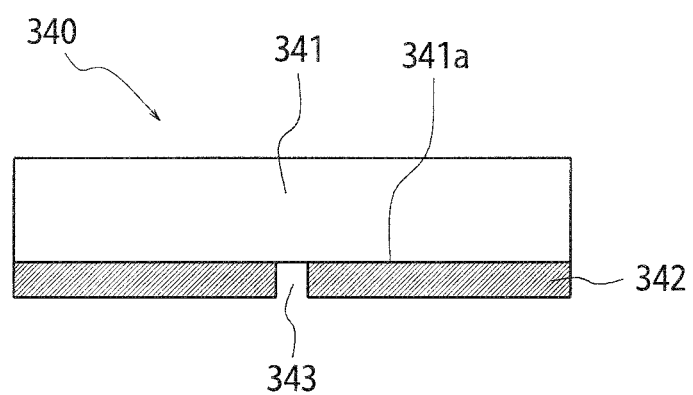
FIG. 33 is a schematic view illustrating a configuration of a near-field optical probe according to a sixth embodiment.

FIG. 33 is a schematic view illustrating a configuration of a near-field optical probe according to a sixth embodiment of the present invention. The near-field optical probe 340 includes a light receiving part 341 with a light receiving surface 341a, the light receiving part 341 being similar in configuration to the light receiving part of the near-field optical probe in the above-mentioned embodiments, the light receiving surface 341a having a light shielding member 342 formed thereon, the light shielding member 342 having a minute aperture 343 formed therein which has a diameter smaller than the wavelength of the irradiation light.

With this configuration, near-field light that has reached the aperture 343 can be transmitted to the light receiving part 341 without loss of energy, which significantly increases the detection efficiency and detection sensitivity for near-field light. In other words, it may be ideal that the transmission efficiency of the ultrahigh-wavenumber transmitting medium is 100% with respect to an arbitrary wavenumber $k_T$. However, in reality, it is necessary to give consideration to light absorption in metal, dielectric loss in dielectric material, surface reflectance, or light scattering due to interface irregularities. Therefore, the elimination of the ultrahigh-wavenumber transmitting medium may also prevent the attenuation (absorption) or loss of light due to the ultrahigh-wavenumber transmitting medium from occurring, and correspondingly, near-field light that has leaked in through the aperture 343 can be efficiently transmitted to the light receiving part 341.

(Seventh Embodiment)

Figure 34:
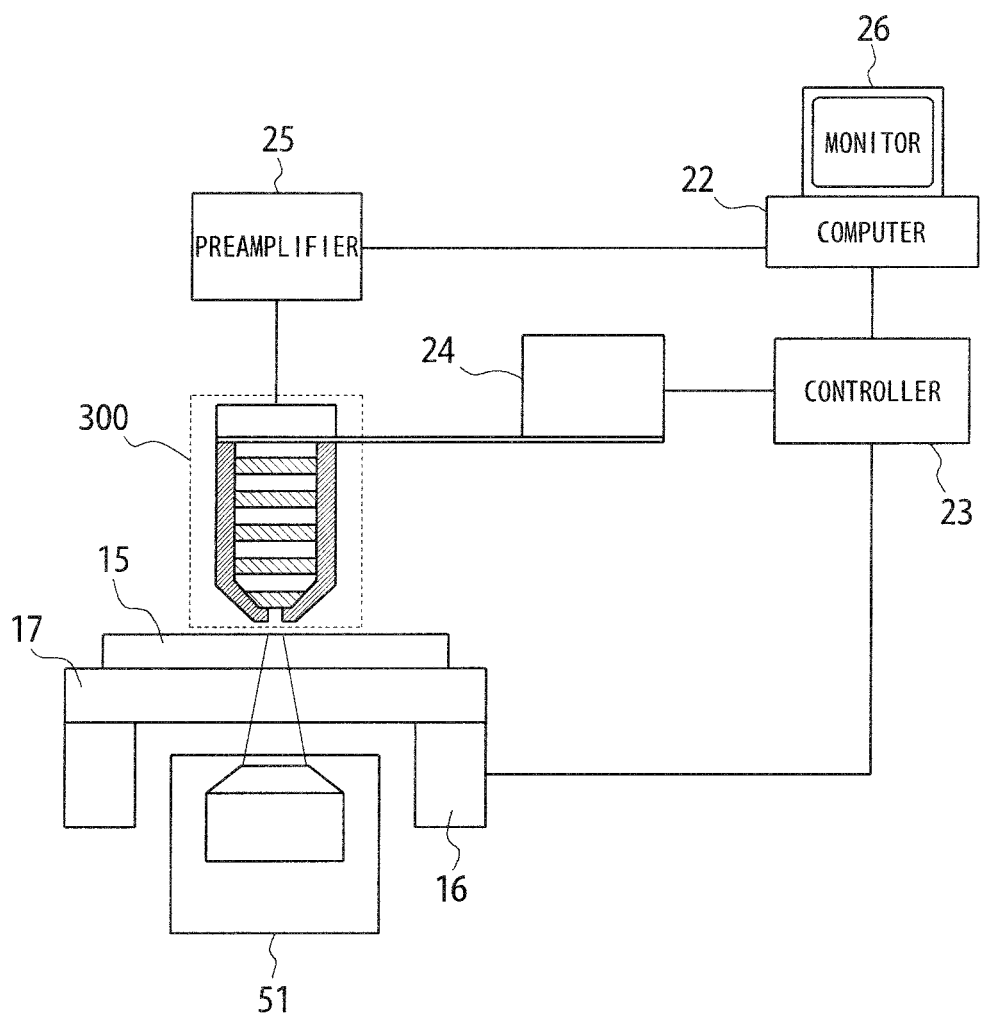
FIG. 34 is a schematic diagram illustrating a system configuration of a scanning near-field optical probe according to a seventh embodiment.

FIG. 34 is a schematic diagram illustrating a system configuration of a scanning near-field optical probe according to a seventh embodiment of the present invention. The scanning near-field optical probe is similar in configuration to the scanning near-field optical microscope illustrated in FIG. 26, except in that the element serving as the optical microscope is eliminated, and employs, as a probe, the near-field optical probe 300 configured as illustrated in FIG. 29A, to thereby perform observation of the sample 15. For this purpose, illuminating means 51 including an illumination lens is provided, to thereby focus illumination light on to the sample 15. It should be noted that other configurations are similar to those of the scanning near-field optical microscope of FIG. 26. Accordingly, the same constituent elements are denoted by the same reference symbols, and the description thereof is omitted.

According to the scanning near-field optical microscope illustrated in FIG. 34, similarly to the scanning near-field optical microscope illustrated in FIG. 26, an image of higher resolution including high-definition optical information can be obtained, as compared to an image to be obtained by the optical microscope.

(Eighth Embodiment)

Figure 35:
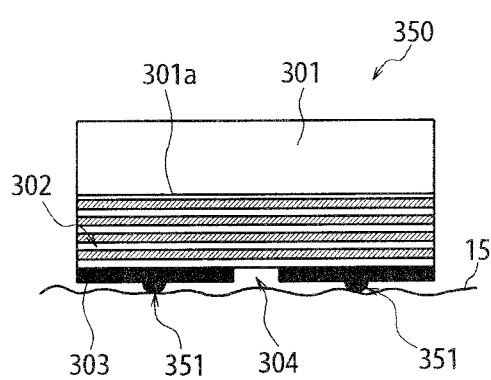
FIGS. 35A to 35D each are a schematic diagram illustrating a system configuration of a near-field optical probe according to an eighth embodiment.
Figure 35:
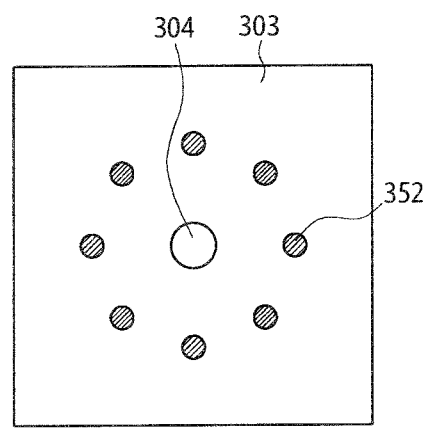
Figure 35:
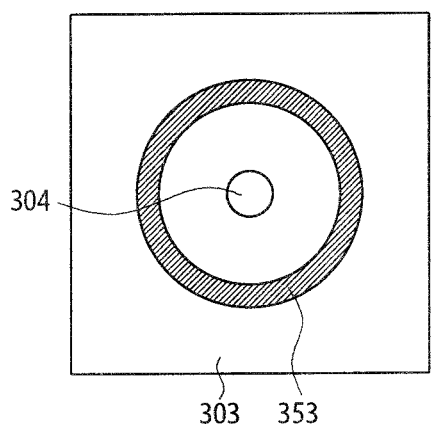
Figure 35:
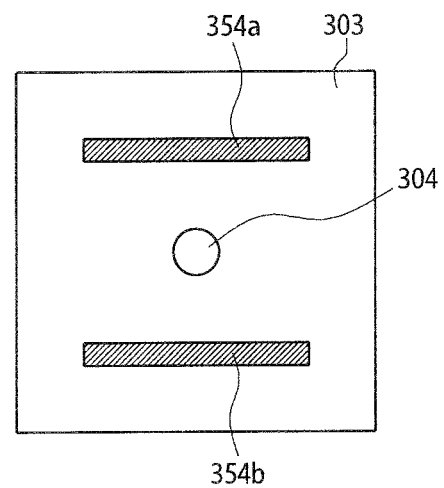

FIGS. 35A to 35D are schematic diagrams each illustrating a system configuration of a near-field optical probe according to an eighth embodiment. The near-field optical probe 350 illustrated in FIG. 35A is similar in configuration to the near-field optical probe of FIG. 27, except in that protruding portions 351 are formed on a surface on the sample side of the light shielding member 303. To form the protruding portions 351, as illustrated in FIGS. 35B to 35D which are views from the sample side, a plurality of hemispherical protrusions 352 may be formed around the aperture 304 (see FIG. 35B), a ring-shaped protrusion 353 may be formed so as to completely surround the aperture 304 (see FIG. 35C), or two parallel protrusions 354a and 354b extending in a direction parallel to the scanning direction of the sample 15 may be formed across the aperture 304 (see FIG. 35D). It should be noted that the protruding portions 351 may be formed of the same material as the light shielding member 303, or may be formed of a different material from the light shielding member 303.

As described above, the protruding portions 351 may be formed on a surface on the sample side of the light shielding member 303 so that the protruding portions 351 come into contact with the sample 15, to thereby always keep a constant distance between the aperture 304 and the sample 15, with the result that light receiving sensitivity as the near-field optical probe 350 can be maintained high.

In other words, in the near-field optical probe configured as illustrated in FIG. 27, the ultrahigh-wavenumber transmitting medium 302, the light shielding member 303, the aperture 304, and the light receiving part 301 are designed so as to be capable of detecting, in the most efficient way, light scattered from the surface of the sample 15 which is at a predetermined distance from the aperture 304. Therefore, in order to observe the sample by using the near-field optical probe with sufficiently high resolution, the distance between the aperture of the near-field optical probe and the sample needs to be kept as large as the size of the aperture.

On the other hand, if the aperture 304 is brought too close to the sample 15, the near-field optical probe may come into contact with the sample 15, with the result that damage is caused in the vicinity of the aperture 304 or the sample 15 is partially exfoliated and the exfoliation closes up the aperture 304, which may hinder accurate observation to be performed. Further, if the distance between the aperture 304 and the sample 15 changes during observation (scanning), the amount of light passing through the aperture to be detected by the light receiving part 301 is changed, which may hinder correct observation. Therefore, the distance between the aperture 304 and the sample 15 needs to be stably kept as large as the size of the aperture 304, and more preferably, to a value slightly smaller than the size of the aperture 304.

In the near-field optical probe 350 according to this embodiment, the protruding portions 351 provided to the light shielding member 303 come into contact with the sample 15, so that the distance between the aperture 304 and the sample 15 is always kept constant, to thereby maintain high light receiving sensitivity as the near-field optical probe 350. In particular, as illustrated in FIG. 35B, in the case where the protruding portions 351 are formed of the hemispherical protrusions 352, the contact area with the sample can be reduced, to thereby suppress abrasion that occurs due to the contact on the sample 15 side. Further, the ring-shaped protrusion 353 formed as the protruding portions 351 as illustrated in FIG. 35C may be used in the case of scanning the sample 15 which is susceptible to exfoliation, so as to prevent an exfoliated part of the sample 15 closes up the aperture 304. Further, as illustrated in FIG. 35D, in the case where the protruding portions 351 are formed of the two parallel protrusions 354a and 354b, the protrusions 354a an 354b can be prevented from coming into contact with a region to be observed on the sample 15.

It should be noted the configuration exemplified in FIG. 35A, other than the protruding portions 351, is similar to that of the near-field optical probe illustrated in FIG. 27, and the above-mentioned protruding portions 351 may effectively be applied to the near-field optical probes of other configurations described in the above-mentioned embodiments.

Here, description is given of the optical performance of the ultrahigh-wavenumber transmitting medium according to the present invention. The ultrahigh-wavenumber transmitting medium 105 is formed of at least two different materials, so as to exhibit extremely high resolution with respect to a predetermined frequency. Even a slightest change in the permittivity (permeability) of each of the materials in response to a change in frequency leads to a significant change in the effective permittivity (permeability) of the ultrahigh-wavenumber transmitting medium 106, 205, and 302. Therefore, the ultrahigh-wavenumber transmitting medium 106, 205, and 302 can only exhibit high resolution in a narrow band.

As described above, the ultrahigh-wavenumber transmitting medium 106, 205, and 302 are capable of transmitting optical information in the vicinity of the surfaces 107a, 201a, and 301a of the samples 107, 201, and 301 to the surface 205a on the probe side (a surface on the light source 102 side in the first embodiment). These ultrahigh-wavenumber transmitting medium 106, 205, and 302 each may be formed of an artificial structure called meta-material, which is a medium having a negative effective permittivity, permeability, or refractive index. This configuration enables transmission or amplification of an evanescent wave, which is otherwise so attenuated that it cannot be transmitted in air.

On the other hand, the ultrahigh-wavenumber transmitting medium 106, 205, and 302 each may be formed of a medium having a strong anisotropy. Such anisotropy can be developed by employing a structure having, for example, metal and a dielectric material that are alternately laminated at intervals smaller than the wavelength of light. Alternatively, the ultrahigh-wavenumber transmitting medium may be formed of a medium having an effective refractive index of an extremely large value using a meta-material. Further, even if the permittivity has a positive value both in the xy plane and in the z-axis direction, the diffraction limit can still be alleviated, though to a limited extent, as long as the permittivity is large in the z-axis direction.

Next, description is given of dispersion properties of an anisotropic medium capable of forming the ultrahigh-wavenumber transmitting medium 106, 205, or 302. It should be noted that, the permittivity $\epsilon$ (each component of the permittivity tensor $\hat{\epsilon}$) and the permeability $\mu$ (each component of the permeability tensor $\hat{\mu}$) are each hereinafter represented by a ratio (relative permittivity and relative permeability) with respect to the permittivity $\epsilon_0$ and the permeability $\mu_0$ in vacuum, respectively. However, $\hat{\epsilon}$ means that "^ (hat)" is placed above $\epsilon$. Similarly, $\hat{\mu}$ means that "^ (hat)" is placed above $\mu$.

In an anisotropic medium which electrically exhibits one-axis anisotropy, the optical axis direction is defined as the z-axis. The term "optical axis" relates to the electromagnetic properties of the medium, and is completely different from the term "optical axis" used in an optical system. Described in this specification is a case where the permittivity or the permeability has an one-axis anisotropy, that is, has only one axis of symmetry, and this axis of symmetry is referred to as optical axis. However, any medium can be employed even if there is a slight difference in $\epsilon$ in the x-axis direction and in the y-axis direction as long as the medium similarly has a property as the ultrahigh-wavenumber transmitting medium. For example, in a case where the equal-frequency curve on the $k_x$-$k_z$ plane and the equal-frequency curve on the $k_y$-$k_z$ plane both render ellipses each having a short axis on the $k_z$-axis with a semimajor axis in a length of 5 $k_0$ or more, or in a case where the equal-frequency curve on the $k_x$-$k_z$ plane and the equal-frequency curve on the $k_y$-$k_z$ plane both render hyperbolic curves, these cases may be regarded as representing a ultrahigh-wavenumber transmitting medium. All the directions in a plane orthogonal to the z-axis serving as the optical axis are equivalent, and hence an arbitrary-axis in this plane is defined as x-axis, while a direction perpendicular to the x-axis and the z-axis is defined as y-axis. With the coordinate system defined as describe above, the permittivity tensor of a medium which exhibits electric one-axis anisotropy is expressed as follows.

$$\hat{\epsilon} = \begin{pmatrix} \epsilon_T & 0 & 0 \\ 0 & \epsilon_T & 0 \\ 0 & 0 & \epsilon_z \end{pmatrix} \quad (1)$$

Consideration is now given to the propagation of a transverse magnetic (TM) wave in this anisotropic medium. The TM wave is an electromagnetic wave which has a magnetic field directed in the y-axis direction. In a wave equation for the TM wave, when a monochromatic plane wave having a wavenumber vector k and an angular frequency $\omega$ is assumed, the dispersion relation is obtained as follows.

$$\frac{k_T^2}{\epsilon_z} + \frac{k_z^2}{\epsilon_T} = \mu_y k_0^2 \quad (2)$$

where $$k_T = \sqrt{k_x^2 + k_y^2} \quad (3)$$

Expression (3) represents an absolute value of a vector which is obtained by projecting the wavenumber vector k onto the xy plane. It should be noted that $k_0$ is a wavenumber of a light wave which has an angular frequency $\omega$ and propagates in vacuum, which is expressed as follows.

$$k_0 = \frac{\omega}{c} \quad (4)$$

Figure 36:
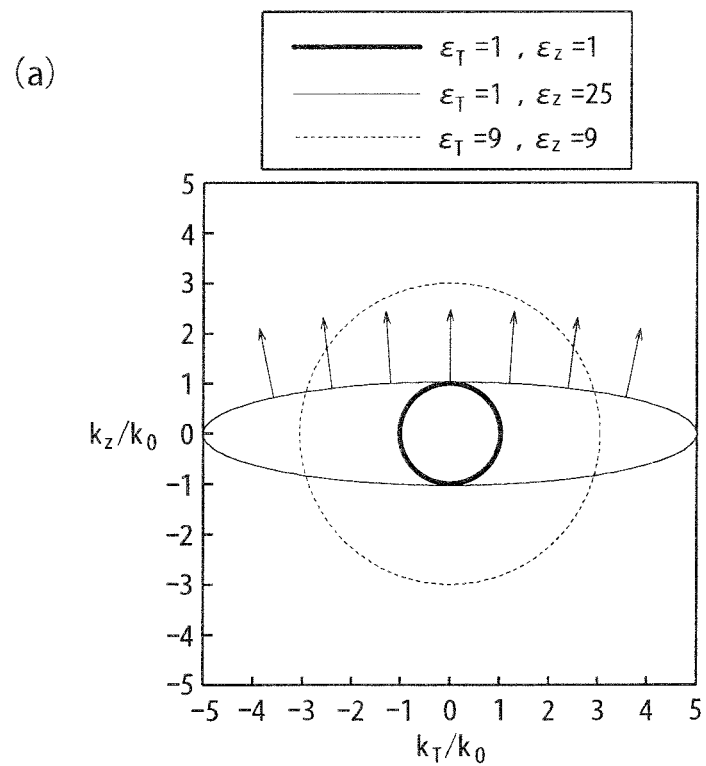
FIGS. 36A and 36B are views each illustrating an equal-frequency curve of an anisotropic medium.
Figure 36:
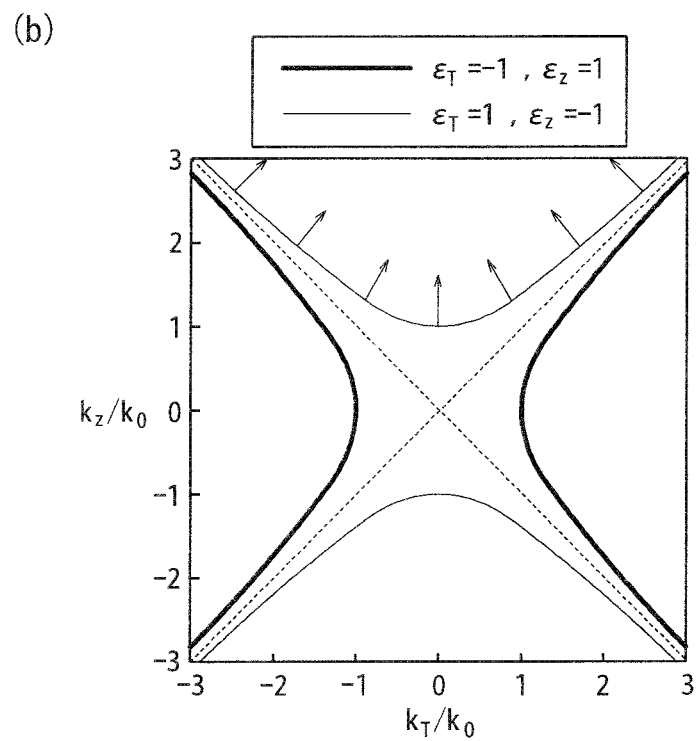

FIGS. 36A and 36B illustrate equal-frequency curves that render loci of $k_T$ and $k_Z$ satisfying Expression (2) when various values are given for $\epsilon_T$ and $\epsilon_Z$. FIG. 36A illustrates equal-frequency curves each obtained when $\epsilon_T=1$ and $\epsilon_Z=1$ (dispersion in vacuum), when $\epsilon_T=9$ and $\epsilon_Z=9$ (hereinafter, referred to as high refractive index), and when $\epsilon_T=1$ and $\epsilon_Z=25$ (hereinafter, referred to as normal anisotropy), respectively. The equal-frequency curve, or equal frequency curved surface, represents a wavenumber vector that may be assumed by an electromagnetic wave propagating in a medium, with respect to a certain frequency. The wavenumber vector is generally a three-dimensional vector, and therefore has three components ($k_x$, $k_y$, $k_z$) and the locus of the wavenumber vector which is allowed to exist as an electromagnetic wave renders a curved surface. On the other hand, as illustrated in FIGS. 36A and 36B, when only two components $k_t$ and $k_z$ of the wavenumber vector are focused, a pair of values acceptable as those two components can be illustrated as curves in a plane.

When an anisotropic medium is employed as the ultrahigh-wavenumber transmitting medium and the optical axis (z-axis) thereof is aligned with the transmission direction of an image, the degree of definition of information to be transmitted (spatial frequency) is represented by $K_T$. In FIG. 36A, in the case of the dispersion in vacuum, there is a value for $k_Z$ corresponding to $k_T$ when $|k_T| \leq k_0$, which means that a light wave which bears such optical information is capable of propagating in the z direction. However, when $|k_T| > k_0$, there is no value for $k_z$ corresponding thereto. Therefore, a light wave which bears such information cannot propagate in the z direction (does not contribute to an image to be formed). Expression (2) shows that, in this case, $k_Z$ is a pure imaginary number, that is, represents an evanescent wave which exponentially attenuates in the z direction. As described above, a phenomenon in which a transmitted image becomes different from the original object (light source) because of the loss of optical information of high spatial frequency is called diffraction limit, which is one of the elements to impose a limit on the resolution of the optical microscope.

In FIG. 36A, in the case of a normal anisotropy, $k_Z$ has a value corresponding to $k_T$ in a range of $|k_T| \leq 5\ k_0$, which means that an optical wave bearing such optical information is capable of propagating in the z direction. Accordingly, the upper limit of the transmittable spatial frequency increases five times more than the case of vacuum, to thereby improve the resolution of the optical system.

Each point on the equal-frequency curve represents a wavenumber vector of an electromagnetic wave transmittable as a wave, and hence the group velocity of the electromagnetic wave is defined at each point. When the electromagnetic wave is treated mathematically, the group velocity coincides with the direction of the normal of the equal-frequency curve. In FIG. 36A, the direction of the group velocity is indicated by each arrow. In the case of a normal anisotropic material in which the range of a transmittable $k_T$ is increased, it can be identified that many points on the equal-frequency curve have a group velocity in a direction close to the optical axis (z-axis). Such a tendency becomes more noticeable as the ellipse is increased in length in the $k_T$ direction. Accordingly, the light receiving part and the aperture are arranged in such manner that the optical axis of the ultrahigh-wavenumber transmitting medium coincides with a straight line connecting between the aperture and at least part of the light receiving surface of the light receiving part.

On the other hand, an optical material (dielectric material) such as glass or plastics has a refractive index of about 1.3 to 2.1 with respect to visible light, and there exists no optical material having a refractive index larger than 3 in nature. The equal-frequency curve with respect to a high refractive ratio illustrated in FIG. 36A represents a dielectric material having a refractive index of 3. In this case, the upper limit of a transmittable $k_T$ is three times as large as in the case of vacuum. In a case of a known immersion lens or solid immersion lens, its high refractive index increases the effective numerical aperture (NA), to thereby improve the resolution of the microscope. However, the improvement in resolution to be attained by such a high refractive index material can only be made to the extent of the refractive index of a material to be used as the medium, and the resolution three times larger as compared to the imaging in vacuum cannot be obtained.

In contrast, if a medium that shows dielectric constant anisotropy deriving from an artificial structure is employed, an effective permittivity $\epsilon_Z$ in the z-axis direction is increased to be significantly larger than 9 (which is a value capable of improving the resolution three times), which attains a resolution higher than the case of using a high refractive index material.

Here, when the wavelength of irradiation light (illumination light) which is generally used in an optical microscope is defined as $\lambda$, the limit of the resolution thereof is said to be about $\lambda/2$. The means that, in the case of performing imaging by using a lens capable of transmitting light having a wavenumber of $|k_T| \leq k_0$, a minimum distance between two light sources which allows the images formed by the two light sources on an object surface to be identified two point images is about $\lambda/2$.

On the other hand, a minimum dimension of a structure observable with a microscope is considered to be inversely proportional to the upper limit of the wavenumber $k_T$ transmittable from the object surface to the image surface. Therefore, an optical element capable of transmitting all the light having a wavenumber in a range of $|k_T| \leq 5\ k_0$ may be employed, to thereby attain an extremely high-performance microscopic observation apparatus capable of optically observing a fine structure as small as one-tenth of the wavelength.

FIG. 36B illustrates the equal-frequency curve expressed by Expression (2) for the case where two components $\epsilon_T$ and $\epsilon_Z$ which appear in the permittivity tensor are different from each other in sign. In other words, illustrated are a case where $\epsilon_T<0$ and $\epsilon_Z>0$ (hereinafter, referred to as negative-positive anisotropy) and a case where $\epsilon_T>0$ and $\epsilon_Z<0$ (hereinafter, referred to as positive-negative anisotropy) The dotted lines in FIG. 36B render asymptotes of the hyperbolic curves. The asymptotes are each expressed by Expression (5) in the case of positive-negative anisotropy, and by Expression (6) in the case of negative-positive anisotropy. As described above, the x-axis and the y-axis are equivalent, and hence, in a three-dimensional space, the hyperbolic curves form a hyperboloid of revolution and the asymptotes form a conical surface. Such surfaces are hereinafter referred to as hyperboloid and asymptotic curved surface, including a case where $\epsilon$ is slightly different in the x-axis direction and in the y-axis direction and curved surfaces corresponding to the hyperbolic curves and the asymptotes thereof do not form a body of revolution.

$$k_z = \pm \sqrt{\frac{\varepsilon_T}{|\varepsilon_z|}}\, k_T \qquad (5)$$

$$k_z = \pm \sqrt{\frac{|\varepsilon_T|}{\varepsilon_z}}\, k_T \qquad (6)$$

In FIG. 36B, the directions of the group velocities of light waves with respect to the positive-negative anisotropy are indicated by arrows. The directions of the group velocities are distributed, with the direction of the optical axis being the center, in a range up to the normal direction of the two asymptotes expressed by Expression (5). Accordingly, the light receiving part needs to be disposed on the optical axis passing through the aperture. A material design may be made in such a manner that the coefficient of the asymptote expressed by Expression (5) is reduced to a smaller value so that the asymptote approximates to the $k_x$-axis (asymptotic curved surface approximates to the $k_x k_y$ plane), to thereby further converge the optical wave to the optical axis direction so as to be efficiently detected by a smaller light receiving part. Further, most of the light wave propagates at an angle close to a normal of the asymptotic curved surface. Therefore, the light receiving part and the aperture are arranged in parallel to the normal of the asymptotic curved surface, and in such a manner that the optical axis of the ultrahigh-wavenumber transmitting medium coincides with a straight line connecting between the aperture and at least part of the light receiving surface of the light receiving part.

In the case of positive-negative anisotropy, $k_Z$ has a value of a real number corresponding to an arbitrary value (where the value is a real number) of $k_T$, and hence, in theory, it is possible to allow any light wave bearing optical information to propagate no matter how high the spatial frequency of the optical information is.

On the other hand, in the case of negative-positive anisotropy, in contrast to the light wave propagation in vacuum, the light wave becomes an evanescent wave ($k_Z$ is a pure imaginary number) when $|k_T|<1$, and hence all the optical information in a range of $|k_T|\geq 1$ is transmitted. For this reason, in the case of performing imaging via a medium that shows negative-positive anisotropy, optical information corresponding to $|k_T|<1$ is lost, which makes it difficult to attain favorable imaging performance because.

However, in the case of causing light wave that has passed through the aperture smaller in diameter than the wavelength to propagate, the light wave contains a small amount of optical information corresponding to $|k_T|<1$ after passing through the aperture, and most of the optical information forming the light wave has a high spatial frequency in a range of $|k_T|\geq 1$. Accordingly, there is produced a relatively little effect due to the loss of the spatial frequency component of $|k_T|<1$ in a medium that shows negative-positive anisotropy, and hence optical information can be transmitted favorably. In this case, the propagation direction, for the most part, is in the normal direction of the asymptotic curved surface of the hyperbolic curve centering around the axis direction. A material design may be made in such a manner that the asymptotic curved surface further approximates to the xy plane, to thereby further converge the propagation light in the optical axis direction. The light receiving part and the aperture are arranged in such a manner that the optical axis of the ultrahigh-wavenumber transmitting medium coincides with a straight line connecting between the aperture and at least part of the light receiving surface of the light receiving part. Further, it is effective to dispose the light receiving surface on a line extending from the aperture in the normal direction of the asymptotic curved surface of the hyperboloid.

As described above, when an anisotropic medium is employed to form the ultrahigh-wavenumber transmitting medium, the dispersion property thereof produces effects as follows. That is, in the case a known immersion lens or solid immersion lens, the resolution as an optical system can be improved only about three times. On the other hand, in the case where a medium exhibiting anisotropy in effective permittivity is employed and optical information is transmitted in a direction of the optical axis thereof, it is possible to cause a light wave which has a wavenumber in a range of 0 $k_0$ to 5 $k_0$ in a plane perpendicular to the optical axis to propagate, to thereby improve the resolution of the optical system five times. Further, a medium which exhibits further strong anisotropy in effective permittivity and has components of the permittivity tensor that are different from each other in sign in the optical axis direction and in a plane perpendicular to the optical axis may be employed, to thereby further improve the resolution of the optical system, which eliminates the theoretical limitations on the resolution.

As described above, there are roughly two types of anisotropy, namely, negative-positive anisotropy and positive-negative anisotropy, in the case where the permittivity tensor has components which are different in sign. Then, a medium showing negative-positive anisotropy may be used for a device such as a near-field optical probe which focuses light waves that have passed through the aperture, and a medium showing positive-negative anisotropy may be used, not only for a near-field optical probe, but also as an imaging element for a general imaging device.

In the above, the TM wave has been described. However, the same applies just as much as to the TE wave (which refers to an electromagnetic wave in a state where the electric field is directed in the y-axis direction), with the permittivity and the permeability being interchanged with each other. In other words, when the effective permittivity has anisotropy and the z-axis is defined as the optical axis direction thereof, the permeability tensor is expressed by Expression (7), and hence the dispersion relation with respect to the TE wave is expressed by Expression (8).

$$\hat{\mu} = \begin{pmatrix} \mu_T & 0 & 0 \\ 0 & \mu_T & 0 \\ 0 & 0 & \mu_z \end{pmatrix} \qquad (7)$$

$$\frac{k_T^2}{\mu_z} + \frac{k_z^2}{\mu_T} = \varepsilon_y k_0^2 \qquad (8)$$

Accordingly, the negative-positive anisotropy is realized when $\mu_T>0$ and $\mu_Z<0$, and the positive-negative anisotropy is realized when $\mu_T<0$ and $\mu_Z>0$.

The description above of the TM wave has been made on the assumption that $\mu_y>0$ in Expression (2). However, even if $\mu<0$, it is possible to transmit light as long as strong anisotropy is secured. Specifically, as is apparent from the above-mentioned description, based on the premise that $\mu_y<0$, light satisfying $|k_T|\geq 1$ is transmittable in the case where the permittivity has positive-negative anisotropy, that is, in the case where $\varepsilon_T>0$ and $\varepsilon_Z<0$. Meanwhile, light having an arbitrary $k_T$ is transmittable in the case where the permittivity has negative-positive anisotropy, that is, in the case where $\varepsilon_T<0$ and $\varepsilon_Z>0$. The same applies to the TE wave, and based on the premise that $\varepsilon_y<0$, light satisfying $|k_T|\geq 1$ is transmittable in the case where the permeability has positive-negative anisotropy, that is, in the case where $\mu_T>0$ and $\mu_Z<0$, while light having an arbitrary $k_T$ is transmittable in the case where the permeability has negative-positive anisotropy, that is, in the case where $\mu_T<0$ and $\mu_Z>0$.

Figure 37:
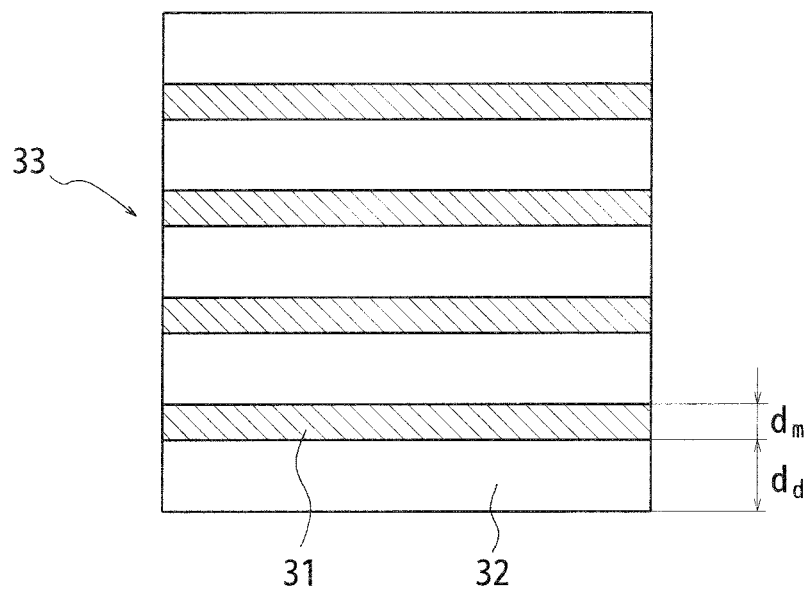
FIG. 37 is a conceptual diagram of a structure illustrating an example of an artificial structure for imparting anisotropy to an effective permittivity.

In the following, description is given of an artificial structure for imparting anisotropy to the effective permittivity. FIG. 37 is a conceptual diagram of an example of the structure. This structure is formed of a metal-dielectric multilayer film 33 having metal 31 and a dielectric material 32 alternately laminated. In FIG. 37, in the case where the permittivity of metal 31 is defined as $\varepsilon_m$, and the permittivity of a dielectric material 32 is defined as $\varepsilon_d$, which are alternately laminated with thicknesses $d_m$ and $d_d$, respectively, the metal-dielectric multilayer film 33 as a whole may be electromagnetically regarded as a uniform anisotropic medium if the thicknesses $d_m$ and $d_d$ are both sufficiently smaller than the wavelength of the irradiation light. Then, the effective permittivity tensor of this anisotropic medium is given by the following expression.

$$\varepsilon_T = \frac{\varepsilon_d d_d + \varepsilon_m d_m}{d_d + d_m}, \varepsilon_z = \frac{\varepsilon_d \varepsilon_m (d_d + d_m)}{\varepsilon_m d_d + \varepsilon_d d_m} \qquad (9)$$

In Expression (9), in an optical frequency band including visible light, (the real part of) the permittivity $\varepsilon_m$ of the metal 31 in most cases assumes a negative value, and (the real part of) the permittivity $\varepsilon_d$ of the dielectric material assumes a positive real number. Therefore, by appropriately selecting the thicknesses $d_m$ and $d_d$ of the layers to be laminated, the components of the effective permittivity of the metal-dielectric multilayer film 33 can be changed to either positive or negative, FIG. 38 shows an example of the component of the effective permittivity of the metal-dielectric multilayer film 33.

Figure 38:
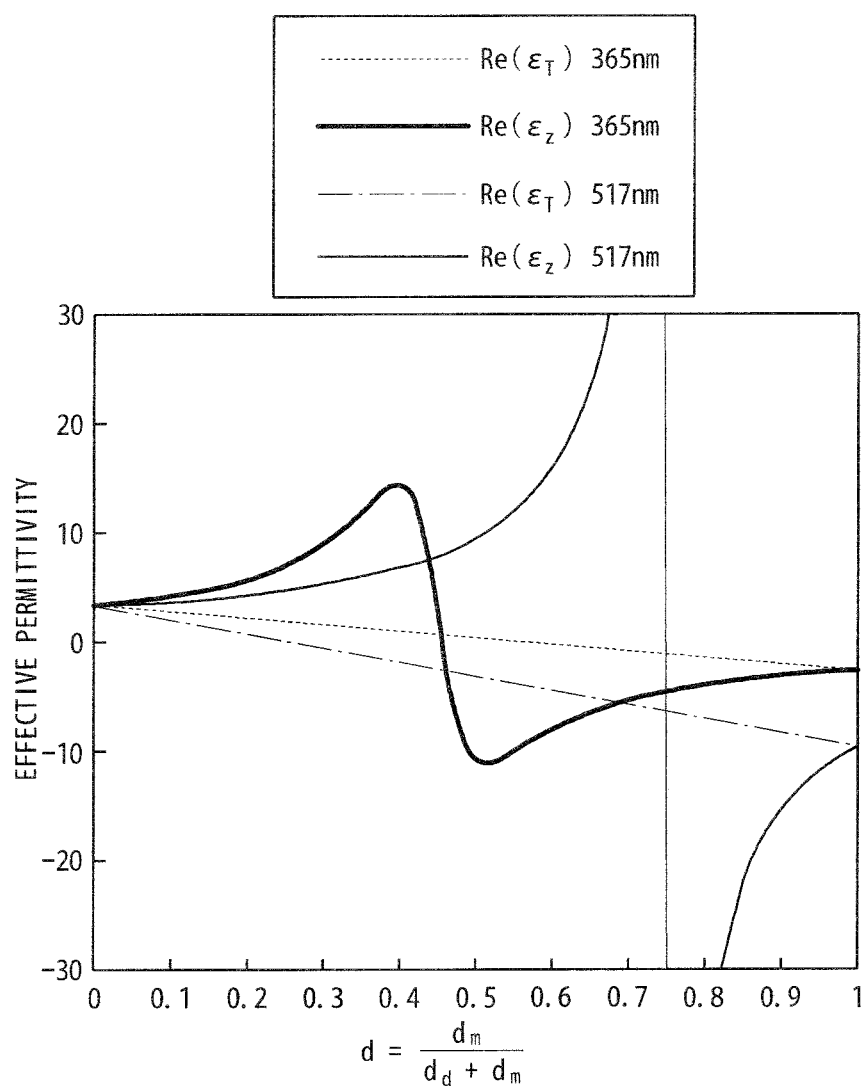
FIG. 38 is a graph showing an example of a component of the effective permittivity of a metal-dielectric multilayer film of FIG. 37.

FIG. 38 exemplifies components Re ($\varepsilon_T$) and Re ($\varepsilon_Z$) of the effective permittivity in the case where the metal 31 and the dielectric material 32 of the metal-dielectric multilayer film 33 illustrated in FIG. 37 are each formed of silver and aluminum oxide, respectively, and the ratio d of the metal 31 to the entire thickness of the metal-dielectric multilayer film 33 is changed according to Expression (10) below. It should be noted that the wavelength of the irradiation light is set to 365 nm or 517 nm.

$$d = \frac{d_m}{d_d + d_m} \quad (10)$$

In the case of FIG. 38, $Re(\epsilon_T)>0$ and $Re(\epsilon_Z)$ is attained in a range of $0.47 \leq d \leq 0.55$ when the wavelength of the irradiation light is 365 nm, and $Re(\epsilon_T)<0$ and $Re(\epsilon_Z)>0$ in a range of $0.26 \leq d \leq 0.74$ when the wavelength of the irradiation light is 517 nm. In this manner, the material for forming the metal 31 and the dielectric material 32 can be appropriately selected, to thereby set a certain component or all the components of the permittivity tensor to a positive value or a negative value with respect to light of a predetermined wavelength (frequency).

Figure 39:
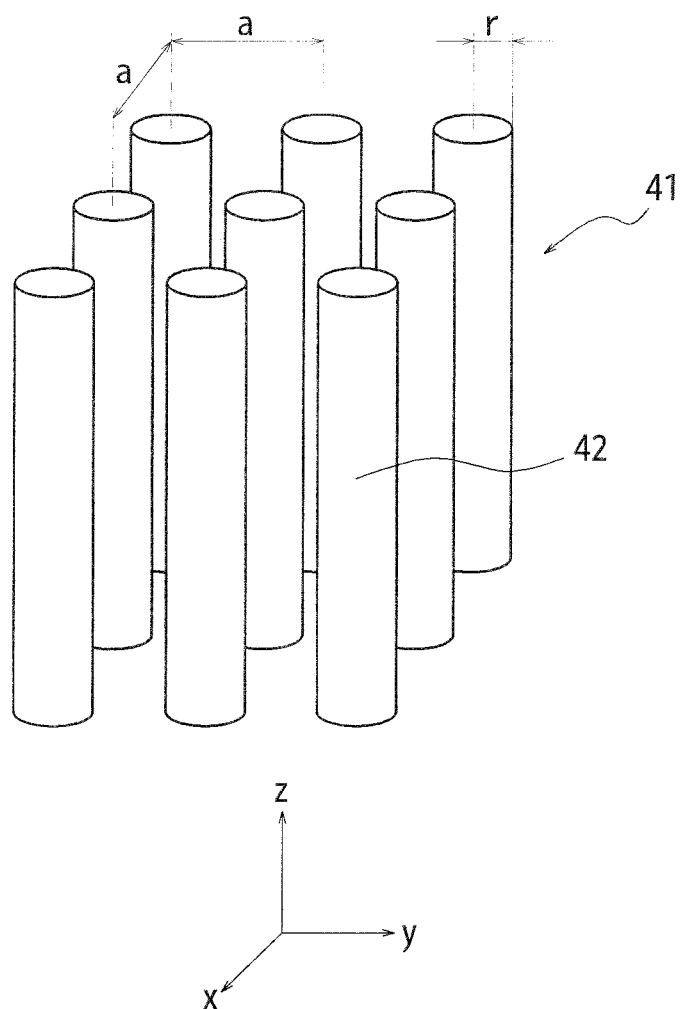
FIG. 39 is a conceptual diagram illustrating another example of an artificial structure for imparting anisotropy to an effective permittivity.

FIG. 39 is a conceptual diagram illustrating another example of an artificial structure for imparting anisotropy to the effective permittivity. This structure has an artificial anisotropic medium formed of an metal nano-rod array 41, in which metal nano rods 302 each being in a columnar shape having a section smaller than the wavelength of the irradiation light (the radius thereof is defined as r and the length thereof is sufficiently larger than the wavelength) are arranged in a square grid at intervals a smaller than the wavelength. In this case, similar to FIGS. 36A and 36B, when r,a<<λ (λ is a wavelength of the irradiation light), it is allowed to regard the material as a uniform medium having anisotropy, in terms of electromagnetic performance.

As is apparent from the configuration of a metal nano-rod array 41 illustrated in FIG. 39, the optical axis as the anisotropic medium coincides with the z-axis (direction same as the axis of symmetry of the metal nano-rod array 42). Here, if the metal nano-rod 42 is sufficiently long, a current flows in the optical axis direction (free electrons in the metal are capable of moving), and hence an electric response depending on the type of metal may be obtained. In this case, when the electric conductivity of a metal material forming the metal nano-rod 42 is defined as σ and a plasma frequency is defined as $\omega_P$, components in the optical axis of the permittivity is given by the following expressions, assuming that the metal nano-rod array 41 is a uniform anisotropic medium.

$$\varepsilon_z = 1 - \frac{\omega_P^2}{\omega(\omega + i\Gamma)} \quad (11)$$

where $$\Gamma = \frac{\varepsilon_0 a^2 \omega_P^2}{\pi r^2 \sigma}$$

As apparent from Expression (11), in the case of the metal nano-rod array 42, the effective permittivity in the optical axis direction can be changed to either positive or negative by appropriately selecting the type of metal ($\omega_P$ and σ), the array structure (a and r), or the angular frequency ω.

On the other hand, in the frequency band of light, most of the materials in nature do not produce any magnetic response, regardless of whether the material is formed of metal or a dielectric material. For this reason, the above-mentioned structure of a multilayer film or a nano rod cannot impart anisotropy to the permeability. However, in recent years, there is proposed a medium capable of changing the permeability in the frequency band of light by using an artificial structure, which makes it possible to change the real part of the effective permeability to a negative value. As an example thereof, there is known a split ring resonator, which is a kind of an artificial structure called meta-material.

The present invention is in no way limited only to the above-mentioned embodiments, and various modification and alteration can be made thereto. For example, in the configuration according to the second embodiment illustrated in FIG. 17, the scanner and the probe controller may be omitted in the case of following up one point on the sample.

Figure 32:
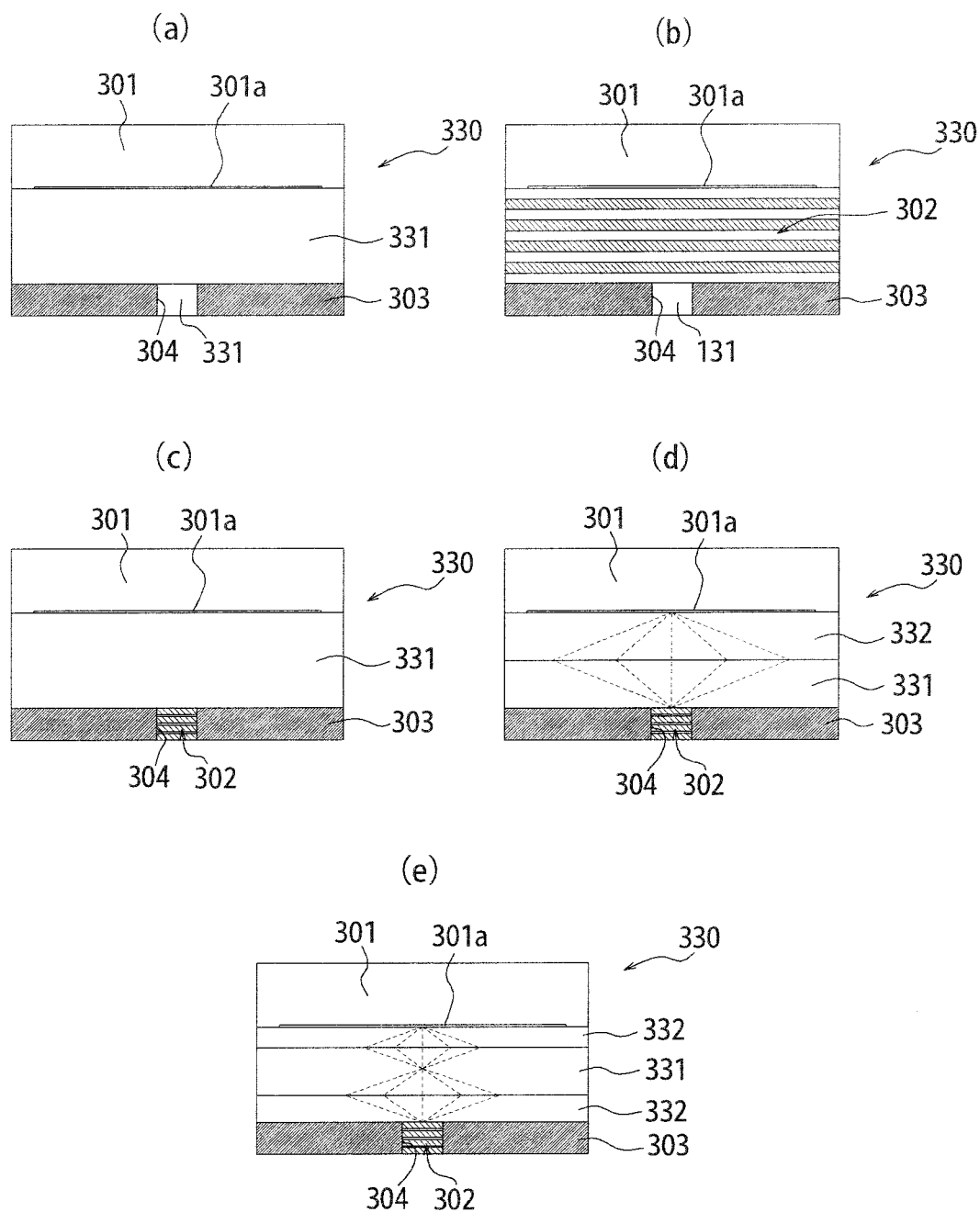
FIGS. 32A to 32E are schematic views illustrating five exemplary configurations of a near-field optical probe according to a fifth embodiment.

For example, in FIG. 32, as described with reference to the fourth embodiment and the fifth embodiment, the aperture may be provided with the ultrahigh-wavenumber transmitting medium. With this configuration, the attenuation of near-field light in the aperture can be prevented, to thereby obtain a near-field optical probe which is higher in efficiency and sensitivity. Further, though the scanning field optical microscope illustrated in FIG. 34 employs the near-field optical probe configured as illustrated in FIG. 29A, it is needless to say that other near-field optical probes according to the present invention can also be employed.

The invention claimed is:
1. A near-field optical microscope, comprising:
   a light irradiating part for emitting illumination light toward a sample;
   a light receiving part for receiving light;
   a microstructure for generating or selectively transmitting near-field light, the microstructure being disposed on at least any one of an emission side of the light irradiating part and an incident side of the light receiving part; and
   an ultrahigh-wavenumber transmitting medium for transmitting near-field light, the ultrahigh-wavenumber transmitting medium exhibiting anisotropy in one of permittivity and permeability.
2. A near-field optical microscope according to claim 1, wherein the microstructure is disposed on the emission side of the light irradiating part and generates near-field light; and
   wherein the ultrahigh-wavenumber transmitting medium transmits the near-field light generated in the microstructure and emits the near-field light to the sample as the illumination light.
3. A near-field optical microscope according to claim 1, wherein the ultrahigh-wavenumber transmitting medium is disposed between the sample and the microstructure;
   wherein the microstructure is disposed on the incident side of the light receiving part and allows the near-field light to pass therethrough; and
   wherein the light receiving part detects the near-field light that has passed through the microstructure.
4. A near-field optical microscope according to claim 1, wherein the microstructure has an aperture that is smaller than a wavelength of the illumination light.
5. A near-field optical microscope according to claim 1, wherein, during operation, a distance between the microstructure and the ultrahigh-wavenumber transmitting medium is maintained equal to or smaller than a wavelength of the illumination light.
6. A near-field optical microscope according to claim 1, wherein, during operation, the ultrahigh-wavenumber transmitting medium is disposed so as to be brought into contact with the sample.

7. A near-field optical microscope according to claim 1, further comprising a scanning part for changing the microstructure in position with respect to the ultrahigh-wavenumber transmitting medium.

8. A near-field optical microscope according to claim 1, wherein the light irradiating part and the microstructure are integrally formed as a near-field light source.

9. A near-field optical microscope according to claim 8, further comprising a scanning part for changing the near-field light source in position with respect to the ultrahigh-wavenumber transmitting medium.

10. A near-field optical microscope according to claim 9, wherein the near-field light source, the ultrahigh-wavenumber transmitting medium, and the scanning part are integrally formed.

11. A near-field optical microscope according to claim 2, further comprising an optical microscope,
wherein the light receiving part has an objective;
wherein the optical microscope includes the objective; and
wherein the microstructure and at least part of the ultrahigh-wavenumber transmitting medium are arranged within a field of view of the optical microscope.

12. A near-field optical microscope according to claim 11, further comprising an optical microscope illuminating part for transilluminating the sample, the optical microscope illuminating part being disposed on a side opposite to the near-field optical microscope across the sample.

13. A near-field optical microscope according to claim 12, wherein the optical microscope illuminating part is disposed inside a near-field excitation unit which includes the near-field light source, the ultrahigh-wavenumber transmitting medium, and a scanning part for changing the near-field light source in position with respect to the ultrahigh-wavenumber transmitting medium.

14. A near-field optical microscope according to claim 12, wherein the aperture is formed in part of a light shielding member; and
wherein the near-field light source has a transmission region for causing optical microscope illumination light emitted by the optical microscope illuminating part to pass therethrough, the transmission region being formed in a surface on a side opposite to the ultrahigh-wavenumber transmitting medium.

15. A near-field optical microscope according to claim 12, further comprising a shielding part for shielding the optical microscope illumination light emitted by the optical microscope illuminating part, the shielding part being disposed between the light irradiating part and the optical microscope illuminating part.

16. A near-field optical microscope according to claim 1, wherein the ultrahigh-wavenumber transmitting medium has a treated surface that has been subjected to treatment for enhancing adhesion to the sample.

17. A near-field optical microscope according to claim 11, wherein at least one of a light emission band of the light irradiating part, a transmission band of an optical system of the light receiving part, and a transmission band of the objective overlaps with part of an operating band in which the ultrahigh-wavenumber transmitting medium exhibits high resolution.

18. A near-field optical microscope according to claim 8, wherein, during operation, the near-field light source is caused to rotate, with respect to the ultrahigh-wavenumber transmitting medium, around a rotational axis defined by a straight line connecting between the microstructure and an observed point on the sample.

19. A near-field optical microscope according to claim 18, wherein the light receiving part further includes a signal light detecting part for integrally detecting, during operation, signal light over a period of time taken for ¼ or more of a rotation of the near-field light source.

20. A near-field optical microscope according to claim 8, wherein the near-field light source emits one of circularly-polarized light and elliptically-polarized light.

21. A near-field optical microscope according to claim 1, further comprising a polarization converting element for converting light emitted from the light irradiating part into one of circularly-polarized light and elliptically-polarized light.

22. A near-field optical microscope according to claim 8, comprising at least two of the near-field light sources, wherein, during operation, a plurality of the near-field light sources are caused to emit light at mutually different timings.

23. A near-field optical microscope according to claim 4, comprising at least two of the apertures.

24. A near-field optical microscope according to claim 1, wherein the microstructure and the ultrahigh-wavenumber transmitting medium are integrally formed.

25. A near-field optical microscope according to claim 1, wherein the ultrahigh-wavenumber transmitting medium has a negative value for a real part of at least one component of one of an effective permittivity tensor and an effective permeability tensor.

26. A near-field optical microscope according to claim 1, wherein the ultrahigh-wavenumber transmitting medium has a value equal to or more than 25 for a real part of at least one component of one of an effective permittivity tensor and an effective permeability tensor.

27. A near-field optical microscope according to claim 1, wherein the microstructure and the light receiving part are integrally formed.

28. A near-field optical microscope according to claim 1, further comprising:
an illuminating part for transilluminating the sample; and
a scanning part for integrally moving the illuminating part, the microstructure, and the light receiving part, to thereby change a position thereof with respect to the ultrahigh-wavenumber transmitting medium.

29. A near-field optical microscope according to claim 28, wherein the microstructure, the light receiving part, the ultrahigh-wavenumber transmitting medium, and the scanning part are integrally formed.

30. A near-field optical microscope according to claim 28, wherein the microstructure has an aperture;
wherein the aperture is formed of a light shielding member; and
wherein the microstructure has a transmission region for allowing illumination light emitted by the illuminating part to pass therethrough, the transmission region being formed in a surface on a side opposite to the ultrahigh-wavenumber transmitting medium.

31. A near-field optical microscope according to claim 28, wherein the light receiving part and the illuminating part are arranged on the same plane.

32. A near-field optical microscope according to claim 28, further comprising a shielding part for shielding illumination light emitted by the illuminating part, the shielding part being disposed between the light receiving part and the illuminating part.

33. A sample observation method, comprising the steps of:
bringing a ultrahigh-wavenumber transmitting medium for transmitting near-field light into close contact with a sample, the ultrahigh-wavenumber transmitting medium exhibiting anisotropy in one of permittivity and permeability;

illuminating the sample with light; and receiving light emitted from the ultrahigh-wavenumber transmitting medium which is in close contact with the sample, through a microstructure.

34. A sample observation method according to claim 33, wherein a distance between the ultrahigh-wavenumber transmitting medium and the microstructure is maintained to be equal to or smaller than a wavelength of the light with which the sample is illuminated.

35. A sample observation method according to claim 33, further comprising the step of changing the microstructure in position with respect to the ultrahigh-wavenumber transmitting medium.

36. A near-field optical probe, comprising:
a light shielding member having an aperture smaller than a wavelength of irradiation light;
a light receiving part for receiving light entering through the aperture; and
an ultrahigh-wavenumber transmitting medium disposed at least between the aperture and the light receiving part, the ultrahigh-wavenumber transmitting medium exhibiting anisotropy in one of permittivity and permeability.

37. A near-field optical probe according to claim 36, wherein the ultrahigh-wavenumber transmitting medium has a negative value for a real part of at least one component of one of an effective permittivity tensor and an effective permeability tensor.

38. A near-field optical probe according to claim 36, wherein the ultrahigh-wavenumber transmitting medium has a value equal to or more than 25 for a real part of at least one component of one of an effective permittivity tensor and an effective permeability tensor.

39. A near-field optical probe according to claim 36, wherein the ultrahigh-wavenumber transmitting medium is capable of transmitting light having a wavenumber of 0 to $5 k_0$ in absolute value in a plane perpendicular to a propagating direction of the light when the irradiation light propagating in vacuum has a wavenumber of $k_0$.

40. A near-field optical probe according to claim 36, wherein the ultrahigh-wavenumber transmitting medium has an optical axis that coincides with a straight line connecting between the aperture and at least part of a light receiving surface of the light receiving part.

41. A near-field optical probe according to claim 36, wherein the aperture and a light receiving surface of the light receiving part are arranged in a normal direction of an asymptotic curved surface of an equal-frequency curve of the ultrahigh-wavenumber transmitting medium.

42. A near-field optical probe according to claim 40, wherein the optical axis coincides with a straight line connecting between the aperture and an approximate center of the light receiving surface of the light receiving part.

43. A near-field optical probe according to claim 36, wherein the light shielding member has a flat surface; and
wherein the surface centering around the aperture has a minimum dimension larger than a distance between the aperture and the light receiving part.

44. A near-field optical probe according to claim 36, wherein the ultrahigh-wavenumber transmitting medium is disposed as being in contact with a light receiving surface of the light receiving part.

45. A near-field optical probe according to claim 44, wherein the ultrahigh-wavenumber transmitting medium is integrally formed on the light receiving part.

46. A near-field optical probe according to claim 36, wherein the light shielding member is disposed as being in close contact with the ultrahigh-wavenumber transmitting medium.

47. A near-field optical probe according to claim 36, wherein the ultrahigh-wavenumber transmitting medium is covered, except for the aperture, with the light shielding member.

48. A near-field optical probe according to claim 36, wherein the ultrahigh-wavenumber transmitting medium is arranged such that the aperture is filled therewith.

49. A near-field optical probe, comprising:
a light shielding member having an aperture smaller than a wavelength of irradiation light;
a light receiving part for receiving light entering through the aperture; and
an ultrahigh-wavenumber transmitting medium disposed at least between the aperture and the light receiving part, the ultrahigh-wavenumber transmitting medium having a negative value for a real part of one of permittivity and permeability.

50. A near-field optical probe, comprising:
a light receiving part; and
a light shielding member disposed on the light receiving part, the light shielding member having an aperture smaller than a wavelength of irradiation light.

51. A near-field optical probe according to claim 36, wherein the light shielding member includes a protruding part for maintaining a distance between the aperture and the sample to a predetermined value.

52. A scanning near-field optical microscope, wherein the near-field optical probe according to claim 1 is employed as a probe.

* * * * *